(12) United States Patent
Manson et al.

(10) Patent No.: US 12,415,606 B2
(45) Date of Patent: Sep. 16, 2025

(54) AIRCRAFT SEAT ASSEMBLY

(71) Applicant: RECARO Aircraft Seating GmbH & Co. KG, Schwäbisch Hall (DE)

(72) Inventors: Tim Manson, Wembley (GB); Christophe Ducreux, Aix-en-Provence (FR)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 125 days.

(21) Appl. No.: 17/802,039

(22) PCT Filed: Feb. 19, 2021

(86) PCT No.: PCT/EP2021/054217
§ 371 (c)(1),
(2) Date: Aug. 24, 2022

(87) PCT Pub. No.: WO2021/170507
PCT Pub. Date: Sep. 2, 2021

(65) Prior Publication Data
US 2023/0182903 A1    Jun. 15, 2023

(30) Foreign Application Priority Data
Feb. 26, 2020  (DE) ............... 10 2020 105 072.0

(51) Int. Cl.
*B64C 11/06*   (2006.01)
*B64D 11/06*   (2006.01)

(52) U.S. Cl.
CPC ...... *B64D 11/0604* (2014.12); *B64D 11/0601* (2014.12); *B64D 11/0641* (2014.12)

(58) Field of Classification Search
CPC ............ B64D 11/0604; B64D 11/0601; B64D 11/0641
See application file for complete search history.

(56) References Cited

U.S. PATENT DOCUMENTS 9,718,550 B2 *   8/2017  Ko ...................... B65G 47/917
10,370,108 B1 *  8/2019  Williams ........... B64D 11/0606
(Continued)

FOREIGN PATENT DOCUMENTS

AU   2014240780 A1 *  11/2015  ............... B60N 2/01
DE   60 2005 000 106 T2    9/2005
(Continued)

OTHER PUBLICATIONS

German Search Report dated Feb. 3, 2021 issued in corresponding German Patent Application No. DE 10 2020 105 072.0 (and English translation).
(Continued)

*Primary Examiner* — Assres H Woldemaryam
(74) *Attorney, Agent, or Firm* — Posz Law Group, PLC

(57) ABSTRACT

An aircraft seat arrangement includes aircraft seat devices which are arranged in an aircraft cabin section. The aircraft seat devices are designed to be at least partially different from one another and each have an aircraft seat which is designed as a full-flat seat. The aircraft seat devices in the aircraft cabin section differ in at least one comfort category, wherein the aircraft seat devices for the at least one comfort category each have a mutually different value which is caused by a different arrangement of the aircraft seats and by the at least partially different design of the aircraft seat devices.

19 Claims, 10 Drawing Sheets

(56) References Cited

U.S. PATENT DOCUMENTS

Figure 1:
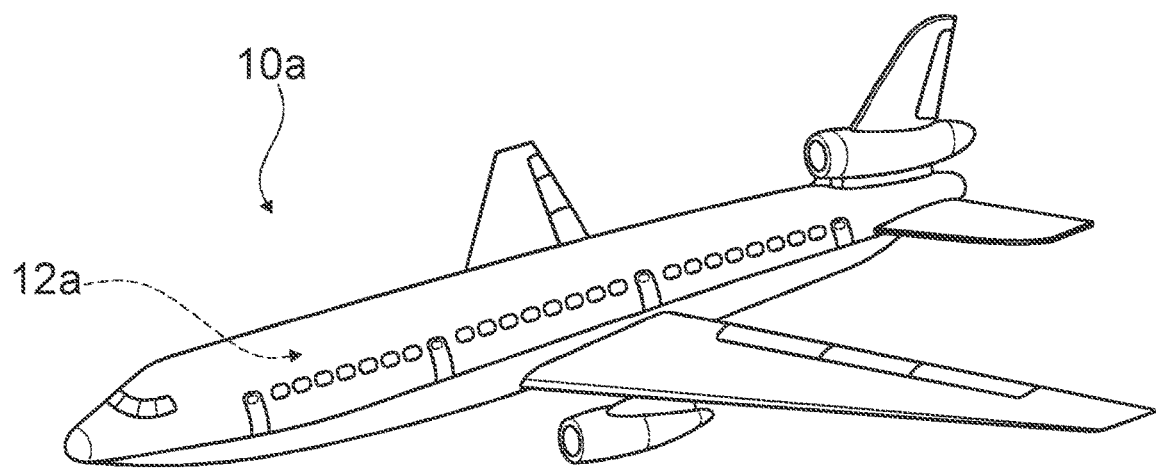

| | | | |
|---|---|---|---|
| 10,773,804 B2* | 9/2020 | Valdes De La Garza | B64D 11/0601 |
| 11,034,452 B2* | 6/2021 | Scoley | B64D 11/0636 |
| 2003/0218095 A1* | 11/2003 | Saint Jalmes | B64D 11/00 244/118.5 |
| 2004/0195451 A1* | 10/2004 | Bentley | B64D 11/06 244/118.6 |
| 2005/0189451 A1 | 9/2005 | Mercier | |
| 2006/0086864 A1* | 4/2006 | Beroth | B64D 11/0606 244/122 R |
| 2007/0034742 A1* | 2/2007 | Jaeger | B64D 11/0601 244/118.6 |
| 2007/0040434 A1* | 2/2007 | Plant | B64D 11/0641 297/354.13 |
| 2007/0241232 A1* | 10/2007 | Thompson | B64D 11/0601 244/118.6 |
| 2008/0042010 A1* | 2/2008 | Watanabe | B64D 11/06 244/118.6 |
| 2008/0073463 A1* | 3/2008 | Guering | B64D 11/00 244/118.6 |
| 2008/0088160 A1* | 4/2008 | Johnson | B64D 11/06 297/344.21 |
| 2010/0038484 A1* | 2/2010 | Ersan | B64D 11/06 244/118.6 |
| 2010/0038485 A1* | 2/2010 | Harcup | B64D 11/0601 244/118.6 |
| 2010/0065684 A1* | 3/2010 | Ruiter | B64D 11/0641 244/118.6 |
| 2010/0308164 A1* | 12/2010 | McKeever | B64D 11/0641 244/118.6 |
| 2012/0146372 A1* | 6/2012 | Ferry | B64D 11/0606 297/232 |
| 2012/0223186 A1* | 9/2012 | Henshaw | B64D 11/0601 244/118.6 |
| 2012/0223557 A1* | 9/2012 | Henshaw | B60N 2/01 297/232 |
| 2012/0305705 A1* | 12/2012 | Vergnaud | B64D 11/0647 244/118.6 |
| 2013/0032668 A1* | 2/2013 | Foucher | B60N 2/01 244/118.6 |
| 2013/0105627 A1* | 5/2013 | Orson | B64D 11/0601 244/118.5 |
| 2013/0106156 A1* | 5/2013 | Orson | B64D 11/0641 297/217.3 |
| 2014/0035330 A1* | 2/2014 | Henshaw | B60N 2/01 297/217.3 |
| 2014/0283296 A1* | 9/2014 | Jerome | B64D 11/0604 5/12.1 |
| 2014/0306500 A1* | 10/2014 | Dryburgh | B64D 11/0601 297/232 |
| 2015/0069805 A1 | 3/2015 | Henshaw | |
| 2015/0166182 A1* | 6/2015 | Ducreux | B64D 11/06 244/118.6 |
| 2015/0166183 A1* | 6/2015 | Henshaw | B64D 11/064 244/118.6 |
| 2015/0166184 A1 | 6/2015 | Dryburgh et al. | |
| 2015/0225086 A1* | 8/2015 | Darbyshire | B64D 11/06 244/118.6 |
| 2015/0329208 A1* | 11/2015 | Eakins | G06F 30/15 703/1 |
| 2016/0059966 A1* | 3/2016 | Dryburgh | B64D 11/06 244/118.6 |
| 2016/0083094 A1* | 3/2016 | Clucas | B64D 11/06 244/118.6 |
| 2016/0297528 A1* | 10/2016 | Sankrithi | B64C 1/064 |
| 2017/0036765 A1* | 2/2017 | Braca | B64D 11/064 |
| 2017/0081030 A1* | 3/2017 | Clucas | B64D 11/0601 |
| 2017/0088267 A1* | 3/2017 | Dowty | B64D 11/0606 |
| 2017/0129611 A1* | 5/2017 | Morgan | B64D 11/06 |
| 2017/0259921 A1* | 9/2017 | Valdes De La Garza | B64D 11/0638 |
| 2017/0297719 A1* | 10/2017 | Lorsignol | B64D 11/0601 |
| 2018/0029712 A1* | 2/2018 | Sieben | B64D 11/0601 |
| 2018/0079508 A1* | 3/2018 | Carlioz | B64D 11/0604 |
| 2018/0265201 A1* | 9/2018 | Carlioz | B64D 11/0007 |
| 2018/0281959 A1* | 10/2018 | Braca | B64D 11/0601 |
| 2018/0281964 A1* | 10/2018 | Carlioz | B64D 11/0604 |
| 2019/0077512 A1* | 3/2019 | Bentley | B64D 11/0601 |
| 2019/0225340 A1* | 7/2019 | Lee | B64C 1/10 |
| 2019/0233116 A1* | 8/2019 | Braca | B64D 11/0639 |
| 2019/0308731 A1* | 10/2019 | Pozzi | B64D 11/0601 |
| 2019/0352011 A1* | 11/2019 | Aung | B60N 2/885 |
| 2020/0307797 A1* | 10/2020 | Henshaw | B64D 11/0606 |
| 2021/0027209 A1* | 1/2021 | Sankrithi | G06Q 10/02 |
| 2022/0332420 A1* | 10/2022 | Miedema | B64D 11/0601 |

FOREIGN PATENT DOCUMENTS

| | | | | |
|---|---|---|---|---|
| EP | | 2944571 A1 * | 11/2015 | B60N 2/01 |
| WO | | 2019/179638 A1 | 9/2019 | |
| WO | WO-2019179635 A1 * | | 9/2019 | B64D 11/0601 |

OTHER PUBLICATIONS

International Search Report of the International Searching Authority mailed May 11, 2021 in corresponding International application No. PCT/EP2021/054217 (English Translation Only).

International Preliminary Report on Patentability of the International Searching Authority mailed Aug. 30, 2022 for the corresponding international application No. PCT/EP2021/054217 (English Translation Only).

European Office Action dated Oct. 8, 2024 issued for the corresponding European Patent Application No. 21709625.4 (and English translation).

* cited by examiner

AIRCRAFT SEAT ASSEMBLY

CROSS REFERENCE TO RELATED APPLICATIONS

This application is a U.S. National Stage Application of PCT/EP2021/054217 filed on Feb. 19, 2021, which claims priority from and incorporates by reference German Patent Application DE 10 2020 105 072.0 filed on Feb. 26, 2020.

PRIOR ART

The invention relates to an aircraft seat arrangement.

An aircraft seat arrangement has already been proposed comprising a plurality of aircraft seat devices which are arranged in an aircraft cabin section and are designed to be at least partially different from one another and each have an aircraft seat, which is designed as a full-flat seat.

It is the object of the invention in particular to provide an arrangement of the type in question with improved properties in respect of compactness and variability. The object is achieved according to the invention.

Advantages of the Invention

The invention is based on an aircraft seat arrangement comprising a plurality of aircraft seat devices which are arranged in an aircraft cabin section and are designed to be at least partially different from one another and each have an aircraft seat which is designed as a full-flat seat.

It is proposed that the aircraft seat devices in the aircraft cabin section differ in at least one comfort category, wherein the aircraft seat devices for the at least one comfort category each have a mutually different value which is caused by a different arrangement of the aircraft seats and by the at least partially different design of the aircraft seat devices. By means of a refinement according to the invention, an advantageously compact and variable arrangement of the plurality of aircraft seat devices can be achieved. By means of the refinement according to the invention, the plurality of aircraft seat devices can advantageously be simply combined with one another. Furthermore, by means of the refinement according to the invention, the plurality of aircraft seat devices can be positioned particularly advantageously with respect to one another. Efficient use can advantageously be made of an available space as a result. Furthermore, as a result, the aircraft seats can form an advantageously large lying surface in the lying position. Furthermore, by means of the refinement according to the invention, aircraft seat devices, in particular arranged next to one another, of the plurality of aircraft seat devices can advantageously be positioned variably with respect to one another. Particularly advantageously, it is possible to create different regions which meet individual requirements of passengers, in particular passengers traveling alone or passengers traveling in pairs. By means of the refinement according to the invention, different comfort categories can advantageously be achieved for different passenger needs. The aircraft seat arrangement is preferably configured for use in a cabin of an aircraft. The aircraft cabin is preferably intended for all passengers to be in during a flight, in particular irrespective of a reserved seat class. Examples of seat classes include economy class, premium economy class, business class and first class. The aircraft cabin preferably has at least one aircraft cabin section, in particular along an aircraft longitudinal axis. The at least one aircraft cabin section is preferably delimited along an aircraft longitudinal axis by at least one separating element, in particular a partition or a curtain, and/or by at least one aircraft cabin module, in particular a kitchen module or a toilet module. A seat class can be arranged in particular in a plurality of aircraft cabin sections. The aircraft cabin preferably has an aircraft cabin center axis. The aircraft cabin center axis is preferably in each case at the same distance from opposite outer walls of the aircraft cabin. The aircraft cabin center axis is preferably oriented parallel to a rolling axis of the aircraft. The aircraft cabin center axis is preferably oriented parallel to the floor of the aircraft cabin. An "aircraft longitudinal axis" is intended to be understood in particular as meaning an axis which extends in the direction of a greatest extent of the aircraft cabin and which is arranged within the aircraft cabin. The aircraft longitudinal axis is oriented in particular parallel to the aircraft cabin center axis. In at least one operating state, the aircraft preferably has a flight direction. The flight direction, in particular in an ideal operating state, is preferably oriented parallel to the aircraft cabin center axis and/or to an aircraft longitudinal axis. The aircraft cabin preferably has at least one aircraft cabin aisle. The at least one aircraft cabin aisle preferably extends at least substantially along an aircraft longitudinal axis. The aircraft seat devices preferably each form an aircraft seat region. An "aircraft seat region" is intended to be understood here as meaning in particular a region which is available to a passenger in the aircraft cabin, in particular while the passenger is sitting or lying on the aircraft seat. The aircraft seat devices are preferably configured to be installed on the floor of the aircraft cabin. "Configured" is intended to be understood as meaning in particular specially designed and/or equipped. That an object is configured for a certain function is intended to be understood as meaning in particular that the object carries out and/or performs this certain function in at least one use and/or operating state. The aircraft seat devices preferably each have an aircraft seat which is configured to provide a sitting place for a passenger in the aircraft. A "different arrangement of the aircraft seats" is intended to be understood as meaning in particular that the aircraft seats of the plurality of aircraft seat devices have mutually different sitting directions and/or lying directions and/or that the aircraft seats of the plurality of aircraft seat devices are at different, in particular minimum or maximum, distances from an aisle of the aircraft cabin. Furthermore, a "different arrangement of the aircraft seats" is intended to be understood as meaning in particular a different positioning of the aircraft seats within corresponding aircraft seat regions. "Different sitting directions and/or lying directions" is intended to be understood as meaning in particular that sitting directions of the aircraft seat devices and/or lying directions of the aircraft seat devices are at an angle of greater than zero with respect to one another, wherein the sitting directions and/or the lying directions are oriented parallel to the aircraft cabin floor. Preferably, sitting directions of the aircraft seat devices and/or lying directions of the aircraft seat devices, in particular which differ in the at least one comfort category, are oriented anti-parallel or not parallel to one another. The aircraft seat devices of the plurality of aircraft seat devices are preferably arranged consecutively along an aircraft longitudinal axis and/or next to one another transversely with respect to an aircraft longitudinal axis. An arrangement, in particular a sequence, of the aircraft seat devices of the plurality of aircraft seat devices with respect to one another can preferably vary. As a result, an advantageously variable aircraft seat device with aircraft seat devices which can be combined in a versatile manner can thereby be provided. "Designed to be different from one another" is intended to be understood as meaning in particular that the aircraft seat devices have differently shaped, differently arranged and/or differently functioning identical components in the corresponding aircraft seat regions. In this connection, a "component of an aircraft seat device" is intended to be understood as meaning in particular an aircraft seat, a console, an ottoman, an enclosure, a separating unit, a table unit, a screen and/or an illuminating means. "Identical" is intended to be understood as meaning in particular that the aircraft seat devices each involve the same component. "Differently shaped" is intended to be understood as meaning in particular that a shape, in particular an outer contour, of the identical components of the aircraft seat devices differs, in particular as viewed perpendicularly to a plane which is oriented parallel to the aircraft cabin floor. However, it is not intended to be understood as meaning in particular any changed shape of components of the aircraft seat devices due to environmental conditions, for example a curved contour of an outer wall of the aircraft cabin. "Designed to be at least partially different from one another" is intended to be understood as meaning in particular that an individual aircraft seat device of the plurality of aircraft seat devices, which is designed to be different from at least one further aircraft seat device of the plurality of aircraft seat devices, can be repeatedly present in the aircraft seat arrangement, and therefore in particular a plurality of identically designed aircraft seat devices can be present in the aircraft seat arrangement. A "comfort category" is intended to be understood as meaning in particular a category which describes, in particular quantifies, a property for comfort of a passenger sitting and/or lying on the aircraft seat. The at least one comfort category is configured in particular to compare and/or to differentiate comfort between at least two of the plurality of aircraft seat devices. In principle, at least two aircraft seat devices, but in particular not all aircraft seat devices, have to differ in the at least one comfort category in the aircraft cabin section. In particular, the aircraft seat devices do not have to differ from one another in all values, in particular for a plurality of comfort categories. Preferably, in particular at least two, preferably at least three, and particularly preferably at least four differently designed aircraft seat devices of the plurality of aircraft seat devices in the aircraft cabin section differ in at least one comfort category, wherein the aircraft seat devices for the at least one comfort category each have a value which differs from one another and is caused by the different arrangement of the aircraft seats and by the at least partially different design of the aircraft seat devices. A "value" is intended to be understood as meaning preferably a physical variable which quantitatively describes the comfort category. In principle, it is conceivable for different reservation classes and/or price classes to be assigned to the plurality of aircraft seat devices depending on the at least one comfort category. As a result, an advantageously selective reservation of a desired aircraft seat device can be undertaken, with a different revenue advantageously being able to be obtained. The aircraft seat preferably comprises a seat bottom and the backrest. The aircraft seat preferably comprises a leg support. A "sitting direction" is intended to be understood as meaning in particular a direction which is oriented at least substantially parallel to the aircraft cabin floor, in particular at a deviation of 3 degrees with respect to the aircraft cabin floor, and at least substantially perpendicularly to a theoretical, flat backrest oriented perpendicularly to the aircraft cabin floor, wherein the direction corresponds to a normal on a front side of the backrest, wherein the front side of the backrest forms a supporting surface for a passenger's back in a conventional sitting position. "Lying direction" is intended to be understood as meaning in particular a direction which runs at least substantially parallel to the aircraft cabin floor, in particular at a deviation of 3 degrees with respect to the aircraft cabin floor, and along a common center axis of the backrest and of the seat bottom in the lying position. The lying direction preferably corresponds to the sitting direction. In principle, the aircraft seat can comprise further add-on parts, such as in particular a headrest or at least one armrest. The aircraft seat devices preferably each have at least one console. Particularly preferably, the at least one console is usable by two aircraft seat devices arranged directly adjacent to each other. The at least one console preferably forms at least one foot space, at least one depositing surface and/or at least one storage space, wherein the at least one depositing surface and/or the at least one storage space are/is configured in particular for a directly adjacent aircraft seat device. The aircraft seat devices preferably each have at least one ottoman. In principle, the at least one ottoman can be coupled to the at least one console. The at least one ottoman is preferably configured as a leg rest and/or footrest for a passenger. The aircraft seat devices preferably each have at least one enclosure. The at least one enclosure is preferably designed as a shell element. The aircraft seat is preferably adjustable, in particular electromechanically, between a sitting position and a lying position. The aircraft seat devices preferably each comprise at least one adjustment unit which is configured for adjusting the aircraft seat between the sitting position and the lying position. A "sitting position" is intended to be understood as meaning in particular a position of the aircraft seat, in which a passenger can sit upright on the aircraft seat. The backrest of the aircraft seat and the seat bottom of the aircraft seat are preferably substantially perpendicular to each other, in particular at an angle of between 90 degrees and 110 degrees, in the sitting position. The sitting position preferably forms a first end position of the aircraft seat, in which the aircraft seat is adjustable to the maximum. The sitting position is preferably designed as a TTL position. A "TTL position" is intended to be understood as meaning in particular an upright position of the aircraft seat that has to be assumed for safety reasons, in particular in a taxiing phase, in a takeoff phase and in a landing phase of the aircraft. A "lying position" is intended to be understood as meaning in particular a position of the aircraft seat that is configured to provide an at least substantially horizontal lying surface for a passenger, in particular so that the passenger can assume a sleeping posture during a flight. In the lying position of the aircraft seat, the passenger preferably lies at least substantially on the aircraft seat, in particular on the seat bottom and on the backrest. The lying position preferably forms a second end position of the aircraft seat, in which the aircraft seat is adjustable to the maximum. "At least substantially" is intended to be understood as meaning in particular that a deviation from a specified value is in particular less than 25%, preferably less than 10% and particularly preferably less than 5% of the predefined value. In principle, between the sitting position and the lying position it is possible to provide further positions which in particular form a combined sitting and lying position. A "full-flat seat" is intended to be understood as meaning in particular a seat which can be transferred, preferably electromechanically, from the sitting position into the lying position and, in the lying position, forms an at least substantially flat lying surface. The flat lying surface is preferably inclined at an angle of 3 degrees with respect to the aircraft cabin floor. Particularly preferably, in the lying position, at least the seat bottom of the aircraft seat and the backrest of the aircraft seat are oriented at least substantially parallel to the aircraft cabin floor on which the aircraft seat is installed. In the lying position, the seat bottom of the aircraft seat and the backrest of the aircraft seat preferably have a common supporting surface which is oriented at least substantially parallel to the aircraft cabin floor.

Furthermore, it is proposed that each of the plurality of aircraft seat devices in each case has direct access to an aircraft cabin aisle. By means of this refinement, advantageously easy and convenient access to an aircraft seat can be achieved. As a result, a particularly advantageously high degree of comfort for a passenger can be achieved. Furthermore, by means of this refinement, an advantageously high degree of comfort for the passenger can be achieved since, by means of direct access to an aircraft cabin aisle, passengers from adjacent aircraft seat regions are not disturbed and/or adversely affected. "Direct access" is intended to be understood as meaning in particular access from an aircraft cabin aisle to an aircraft seat region, in particular to an aircraft seat, wherein the access to the aircraft seat region, in particular to the aircraft seat, does not run through an adjacent aircraft seat region. Particularly preferably, the passenger can enter the aircraft seat region directly from the aircraft cabin aisle, in particular without crossing a further aircraft seat region. The direct access is preferably assigned just to one aircraft seat device of the plurality of aircraft seat devices. The direct access is preferably usable just by one aircraft seat device of the plurality of aircraft seat devices.

Furthermore, it is proposed that the at least one comfort category describes a living space, in particular a floor area, a bed length, a bed width, a foot space volume and/or a passage width, in at least one region. By means of this configuration, aircraft seat devices having comfort properties which are advantageously variable with respect to one another can be provided. As a result, an advantageously individual degree of comfort for different passenger needs can be achieved. A "living space" is intended to be understood as meaning in particular a space, in particular free space, which is usable personally by a passenger, in an aircraft seat region. Particularly preferably, the at least one comfort category is designed as a floor area of an aircraft seat device, as a depositing surface of an aircraft seat device, in particular a console, as a table surface of an aircraft seat device, as, in particular minimum or maximum, arm freedom for a passenger, in particular a delimiting, maximum angle of movement from the sitting direction in the sitting position, as an, in particular maximum, supporting surface of an aircraft seat for a passenger, in particular in the sitting position or in the lying position, as an, in particular maximum, bed length of an aircraft seat in the lying position, as an, in particular maximum, bed width of the aircraft seat in the lying position, as an, in particular maximum, foot space volume, as an aircraft seat orientation and/or as an, in particular minimum, passage width in at least one region of the aircraft seat device. The foot space volume is preferably delimited by a console. The console is preferably configured to span the foot space volume. An "aircraft seat orientation" is intended to be understood as meaning in particular the orientation of the sitting direction and/or of the lying direction with respect to an aircraft longitudinal axis and/or to the flight direction. The passage width is preferably designed as a minimum width of the direct access from an aircraft cabin aisle into the aircraft seat region, as measured directly adjacent to said aircraft cabin aisle and parallel to an aircraft longitudinal axis, and/or as a minimum width of the direct access in a region between the aircraft cabin aisle and a region which, as viewed in the sitting direction, is arranged directly behind the seat bottom. In principle, the at least one comfort category can also describe a quality, a noise level and/or an illumination. The quality can describe in particular a seat upholstery, for example a foam core or a spring core, or a contact material, for example material or leather. The noise can describe in particular shielding of the aircraft seat in relation to ambient noises from the aircraft cabin. The illumination can describe in particular a number of illuminating means and a property of the illuminating means.

In addition, it is proposed that in one seat column in the aircraft cabin section, at least three, in particular at least four, aircraft seat devices of the plurality of aircraft seat devices are arranged, which differ in design from one another and in particular are arranged directly one behind another. By means of this refinement, an advantageously variable positioning of differently designed aircraft seat devices of the plurality of aircraft seat devices can be made possible. As a result, aircraft seat devices which advantageously differ in their comfort categories can be provided within one seat column. As a result, an advantageously individual degree of comfort for different passenger needs can be achieved. A "seat column" is intended to be understood as meaning in particular a region in the aircraft cabin, in which at least one aircraft seat device of the plurality of aircraft seat devices is arranged and which is delimited by at least one aircraft cabin aisle, wherein an axis which is arranged perpendicular to an aircraft longitudinal axis and parallel to the aircraft cabin floor intersects in particular just one aircraft seat within this region. The seat column preferably extends in the flight direction. Preferably, at least two aircraft seat devices arranged one behind another are arranged in one seat column, said aircraft seat devices all being intersected by the same aircraft longitudinal axis and each having direct access to the same aircraft cabin aisle. "One behind another" is intended to be understood as meaning in particular consecutive along an aircraft longitudinal axis. "Arranged directly one behind another" is intended to be understood as meaning in particular that in each case no further object, in particular no further aircraft seat device of the plurality of aircraft seat devices, is arranged between the at least three aircraft seat devices of the plurality of aircraft seat devices. The at least three aircraft seat devices, which are designed to differ from one another, of the plurality of aircraft seat devices are preferably arranged directly consecutively in the flight direction.

Furthermore, it is proposed that in one seat column in the aircraft cabin section, a sitting direction of an aircraft seat device of the plurality of aircraft seat devices is arranged at least substantially parallel to an aircraft longitudinal axis, and a sitting direction of a further aircraft seat device of the plurality of aircraft seat devices is arranged angled with respect to the aircraft longitudinal axis, in particular at an angle of at least 18 degrees. By means of this refinement, an advantageously compact and variable arrangement of aircraft seat devices can be realized.

Furthermore, it is proposed that in the aircraft cabin section, a sitting direction of at least one aircraft seat device of the plurality of aircraft seat devices is directed away from a directly adjacent aircraft cabin aisle. By means of this refinement, the at least one aircraft seat device can be positioned particularly advantageously in the aircraft seat arrangement. Furthermore, by means of this refinement, an advantageously large private sphere for a passenger can be provided. An advantageously high degree of comfort can thereby be achieved.

In addition, it is proposed that in the aircraft cabin section, a sitting direction of at least one aircraft seat device of the plurality of aircraft seat devices is directed toward a directly adjacent aircraft cabin aisle. By means of this refinement, the at least one aircraft seat device can be positioned particularly advantageously in the aircraft seat arrangement. Furthermore, by means of this refinement, advantageously simple accessibility to the aircraft seat for a passenger can be ensured. An advantageously high degree of comfort can thereby be achieved.

Furthermore, it is proposed that the sitting directions of at least two aircraft seat devices which are in particular spaced apart from one another by at least one further aircraft seat device are arranged in one seat column in a manner angled with respect to an aircraft longitudinal axis by at least substantially the same angle in terms of value, wherein the sitting directions of the aircraft seat devices are formed in mirror image to an aircraft longitudinal axis. By means of this refinement, an advantageously variable and compact aircraft seat arrangement can be achieved. Furthermore, a plurality of aircraft seat devices can thereby be advantageously compactly combined with one another. An advantageously large number of aircraft seats can thereby be provided in the aircraft cabin section.

Furthermore, it is proposed that an aircraft seat of an aircraft seat device of the aircraft seat devices which are arranged in one seat column in the aircraft cabin section is arranged on an aisle side, wherein an aircraft seat of a further aircraft seat device of the aircraft seat devices which are arranged in the seat column is arranged facing away from the aisle. By means of this refinement, an advantageously variable and compact aircraft seat arrangement can be achieved. Furthermore, a plurality of aircraft seat devices can thereby be advantageously compactly combined with one another. An advantageously large number of aircraft seats can thereby be provided in the aircraft cabin section. "Arranged on the aisle side" is intended to be understood as meaning in particular that, in the sitting position, at least a large part of the aircraft seat is arranged on a side of the aircraft seat device facing the aircraft cabin aisle, as viewed in the flight direction. "At least a large part" is intended to be understood as meaning in particular at least 55%, preferably at least 65% and particularly preferably at least 75%. "Arranged facing away from the aisle" is intended to be understood as meaning in particular that, in the sitting position, at least a large part of the aircraft seat is arranged on a side of the aircraft seat device facing away from the aircraft cabin aisle, as viewed in the flight direction. The aircraft seat, which is arranged on the aisle side, is preferably at a smaller minimum distance from the aircraft cabin aisle than a further aircraft seat, which is arranged facing away from the aisle.

In addition, it is proposed that the aircraft seat arrangement has at least one seat grouping of at least three, in particular four, aircraft seat devices of the plurality of aircraft seat devices, which aircraft seat devices are arranged directly one behind another in one seat column in the aircraft cabin section and each have different sitting directions and/or whose aircraft seats are arranged on an aisle side or facing away from the aisle. By means of this refinement, a plurality of aircraft seat devices can advantageously be combined compactly and variably with one another. An advantageously large number of aircraft seats can thereby be provided in the aircraft cabin section. Furthermore, by means of this refinement, a repeatable sequence of the at least one seat grouping can be made possible. Furthermore, by means of this refinement, individual passenger needs can advantageously be taken into consideration, as a result of which a particularly advantageously high degree of comfort is made possible. A "seat grouping" is intended to be understood as meaning in particular an arrangement of the at least three, in particular four, aircraft seat devices arranged directly one behind another in one seat column in the aircraft cabin section. The at least one seat grouping preferably forms a sequence which is repeatable, in particular periodically. A plurality of identical seat groupings can be arranged directly one behind another, in particular along a longitudinal axis of the aircraft.

Furthermore, it is proposed that the sitting directions of the aircraft seat devices which are arranged directly one behind another within the at least one seat grouping are arranged in an alternating manner at least substantially parallel to and in an angled manner with respect to the aircraft longitudinal axis. By means of this refinement, an advantageously variable and compact aircraft seat arrangement can be achieved. Furthermore, a plurality of aircraft seat devices can thereby be advantageously combined compactly with one another. An advantageously large number of aircraft seats can thereby be provided in the aircraft cabin section. Preferably, as viewed in the flight direction, in front of and behind an aircraft seat device, the sitting direction of which is arranged at least substantially parallel to the aircraft longitudinal axis, a respective aircraft seat device is arranged, the sitting direction of which is arranged at an angle to the aircraft longitudinal axis. Preferably, as viewed in the flight direction, in front of and behind an aircraft seat device, the sitting direction of which is arranged at an angle to the aircraft longitudinal axis, a respective aircraft seat device is arranged, the sitting direction of which is arranged at least substantially parallel to the aircraft longitudinal axis.

Furthermore, it is proposed that in one seat column in the aircraft cabin section, two aircraft seat devices of the plurality of aircraft seat devices each have an aircraft seat which is arranged on an aisle side, and two further aircraft seat devices of the plurality of aircraft seat devices which, viewed in a flight direction, are arranged directly behind or in front of the two aircraft seat devices each have an aircraft seat which is arranged facing away from the aisle. By means of this refinement, an advantageously variable and compact aircraft seat arrangement can be achieved. In addition, a plurality of aircraft seat devices can thereby be advantageously combined compactly with one another.

In addition, it is proposed that in one seat column in the aircraft cabin section, at least three aircraft seat devices of the plurality of aircraft seat devices are arranged, wherein a sitting direction of an aircraft seat device of the at least three aircraft seat devices is arranged at least substantially parallel to an aircraft longitudinal axis, and sitting directions of two further aircraft seat devices of the at least three aircraft seat devices are arranged in an angled manner with respect to the aircraft longitudinal axis. By means of this refinement, an advantageously variable and compact aircraft seat arrangement can be achieved. Furthermore, a plurality of aircraft seat devices can thereby be advantageously combined compactly with one another. An advantageously large number of aircraft seats can thereby be provided in the aircraft cabin section. At least three of the aircraft seat devices are preferably arranged directly one behind another in one seat column in the aircraft cabin section, wherein sitting directions of two of the aircraft seat devices are arranged at least substantially parallel to an aircraft longitudinal axis, and a sitting direction of a further of the aircraft seat devices is arranged in an angled manner with respect to the aircraft longitudinal axis.

Furthermore, it is proposed that aircraft seats of the aircraft seat devices, the sitting directions of which are arranged in an angled manner with respect to the aircraft longitudinal axis, have different distances from an aircraft cabin aisle. By means of this refinement, an advantageously compact and variable arrangement of aircraft seat devices can be realized. "Different distances from an aircraft cabin aisle" is intended to be understood as meaning in particular that the aircraft seats are arranged on the aisle side or facing away from the aisle. Preferably, aircraft seats of the aircraft seat devices, the sitting directions of which are arranged at least substantially parallel to the aircraft longitudinal axis, are at different distances from the aircraft cabin aisle.

In addition, it is proposed that in at least one seat column in the aircraft cabin section, four aircraft seat devices of the plurality of aircraft seat devices, which differ from one another, are arranged directly one behind another, wherein sitting directions of two aircraft seat devices of the four aircraft seat devices are arranged at least substantially parallel to an aircraft longitudinal axis, wherein one aircraft seat of one aircraft seat device of the two aircraft seat devices is arranged on an aisle side and a further aircraft seat of a further aircraft seat device of the two aircraft seat devices is arranged facing away from the aisle, and sitting directions of two further aircraft seat devices of the four aircraft seat devices are arranged in an angled manner with respect to the aircraft longitudinal axis, wherein one aircraft seat of one aircraft seat device of the two further aircraft seat devices is arranged on the aisle side and a further aircraft seat of a further aircraft seat device of the two further aircraft seat devices is arranged facing away from the aisle. By means of this refinement, an advantageously compact and variable arrangement of the plurality of aircraft seat devices can be achieved. Furthermore, by means of this refinement, the plurality of aircraft seat devices can advantageously be simply combined with one another. Furthermore, by means of this refinement, the plurality of aircraft seat devices can be positioned particularly advantageously with respect to one another. As a result, an available space can advantageously be used efficiently. Furthermore, by means of this refinement, advantageously different comfort categories can be achieved for different passenger needs.

Furthermore, it is proposed that in the aircraft cabin section, two aircraft seat devices of the plurality of aircraft seat devices form a pair of seats in two seat columns which are arranged directly next to each other, wherein sitting directions of the two aircraft seat devices are arranged at least substantially parallel to an aircraft longitudinal axis, and aircraft seats of the two aircraft seat devices are arranged facing away from an aisle, wherein at least two of the pairs of seats are arranged in the two seat columns which are arranged directly next to each other. By means of this refinement, an advantageously variable aircraft seat arrangement can be provided. As a result, aircraft seat devices arranged next to one another of the plurality of aircraft seat devices can advantageously be positioned variably with respect to one another. Particularly advantageously, different regions can be created here which meet individual requirements of passengers, in particular passengers traveling by themselves or passengers traveling in pairs. A "pair of seats" is intended to be understood as meaning in particular an arrangement of precisely two aircraft seat devices which are arranged directly next to one another and in particular are not separated from one another by an aircraft cabin aisle. The two aircraft seat devices which are arranged directly next to one another are preferably formed in a mirror image with respect to one another, in particular via the aircraft cabin center axis. The two aircraft seat devices of the plurality of aircraft seat devices that form a pair of seats are preferably arranged flush with respect to one another in the flight direction, in particular as viewed in a plane parallel to the aircraft cabin floor. The two aircraft seat devices of the plurality of aircraft seat devices that form a pair of seats are preferably arranged in a central region of the aircraft cabin. A "central region" is intended to be understood as meaning in particular a region in the center of the aircraft cabin that is intersected by the aircraft cabin center axis. The central region is preferably delimited by two aircraft cabin aisles. Particularly preferably, two seat columns are arranged in the central region of the aircraft cabin.

In addition, it is proposed that an arrangement of aircraft seat devices of the plurality of aircraft seat devices in the aircraft cabin section in at least one seat column on a first aircraft cabin side is formed asymmetrically to an arrangement of aircraft seat devices of the plurality of aircraft seat devices in at least one seat column on a second aircraft cabin side, wherein the first aircraft cabin side is separated from the second aircraft cabin side by an imaginary aircraft cabin center plane which is oriented along the aircraft cabin center axis perpendicular to an aircraft cabin floor. By means of this refinement, an advantageously variable aircraft seat arrangement can be provided. As a result, different regions can be created which meet individual requirements of passengers. The aircraft cabin center axis is preferably arranged in the aircraft cabin center plane. The first aircraft cabin side and the second aircraft cabin side preferably each have an aircraft cabin aisle. In principle, it is conceivable for the aircraft cabin to have, in the aircraft cabin section, at least one partition along the aircraft cabin center axis, which separates the first aircraft cabin side from the second aircraft cabin side.

Furthermore, it is proposed that in at least one seat column, only such aircraft seat devices of the plurality of aircraft seat devices are arranged whose sitting directions are arranged in an angled manner with respect to the aircraft longitudinal axis. By means of this refinement, an advantageously compact aircraft seat arrangement can be achieved.

Furthermore, it is proposed that in at least one seat column only such aircraft seat devices of the plurality of aircraft seat devices are arranged whose sitting directions are arranged at least substantially parallel to the aircraft longitudinal axis. By means of this refinement, an advantageously compact aircraft seat arrangement can be achieved.

In addition, it is proposed that sitting directions of some of the plurality of aircraft seat devices in the aircraft cabin section are oriented at least substantially in an opposite direction to the flight direction. By means of this refinement, an advantageously variable aircraft seat arrangement can be achieved. Furthermore, by means of this refinement, viewing contact of passengers can advantageously be simplified. Preferably, at least four, in particular eight, aircraft seat devices formed differently from one another are arranged in the aircraft cabin section. It is conceivable here for each of the differently designed aircraft seat devices to be present in multiple form.

The aircraft seat arrangement according to the invention is not intended to be restricted here to the above-described use and embodiment. In particular, in order to perform a function described herein, the aircraft seat arrangement according to the invention may have a number of individual elements, components and units which differs from a number mentioned herein.

DRAWINGS

Further advantages emerge from the following description of the drawings. The drawings illustrate seven exemplary embodiments of the invention. The drawings, the description and the claims contain numerous features in combination. A person skilled in the art will expediently also consider the features individually and combine them to form further meaningful combinations.

Figure 2:
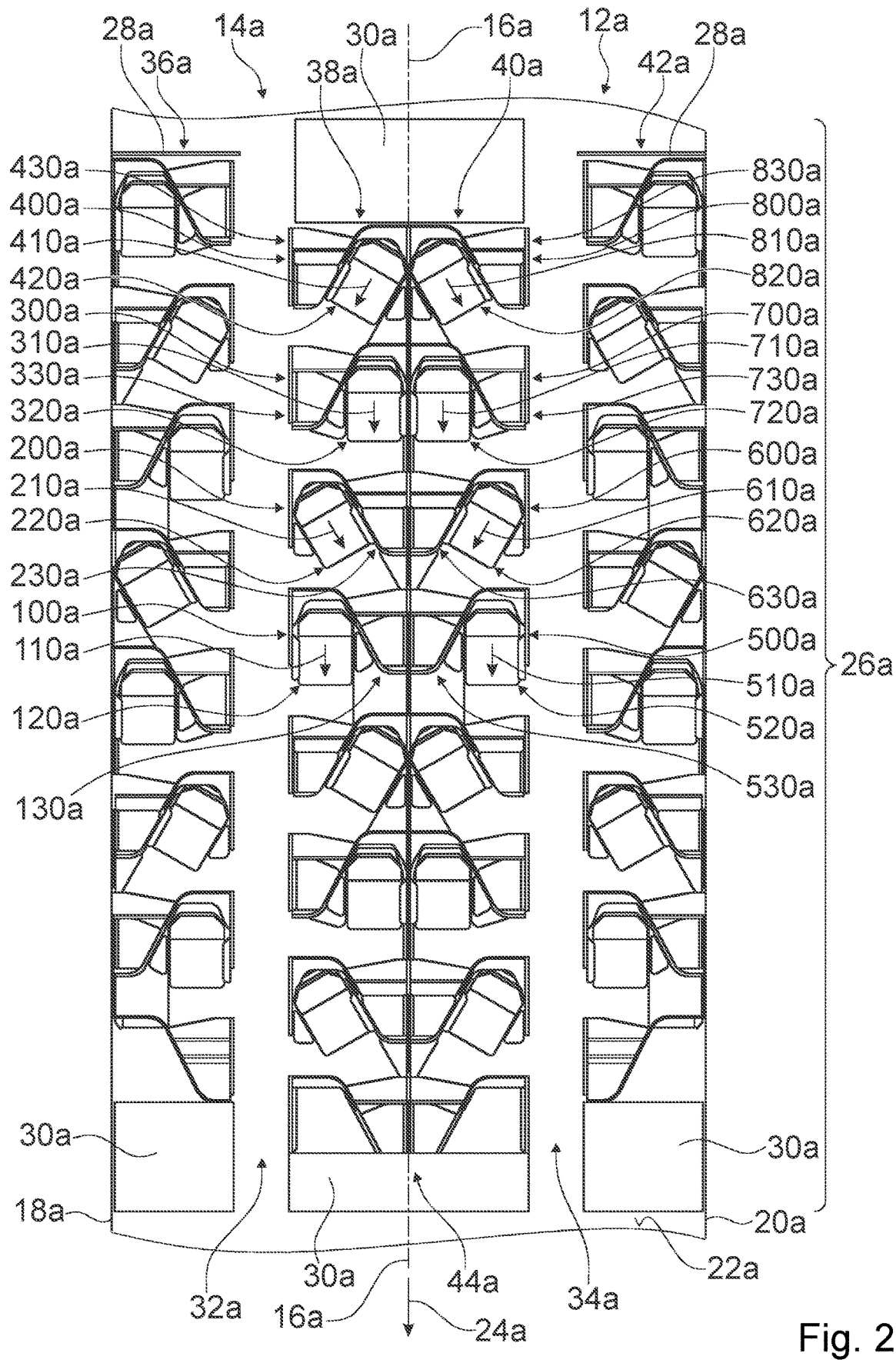
Figure 3:
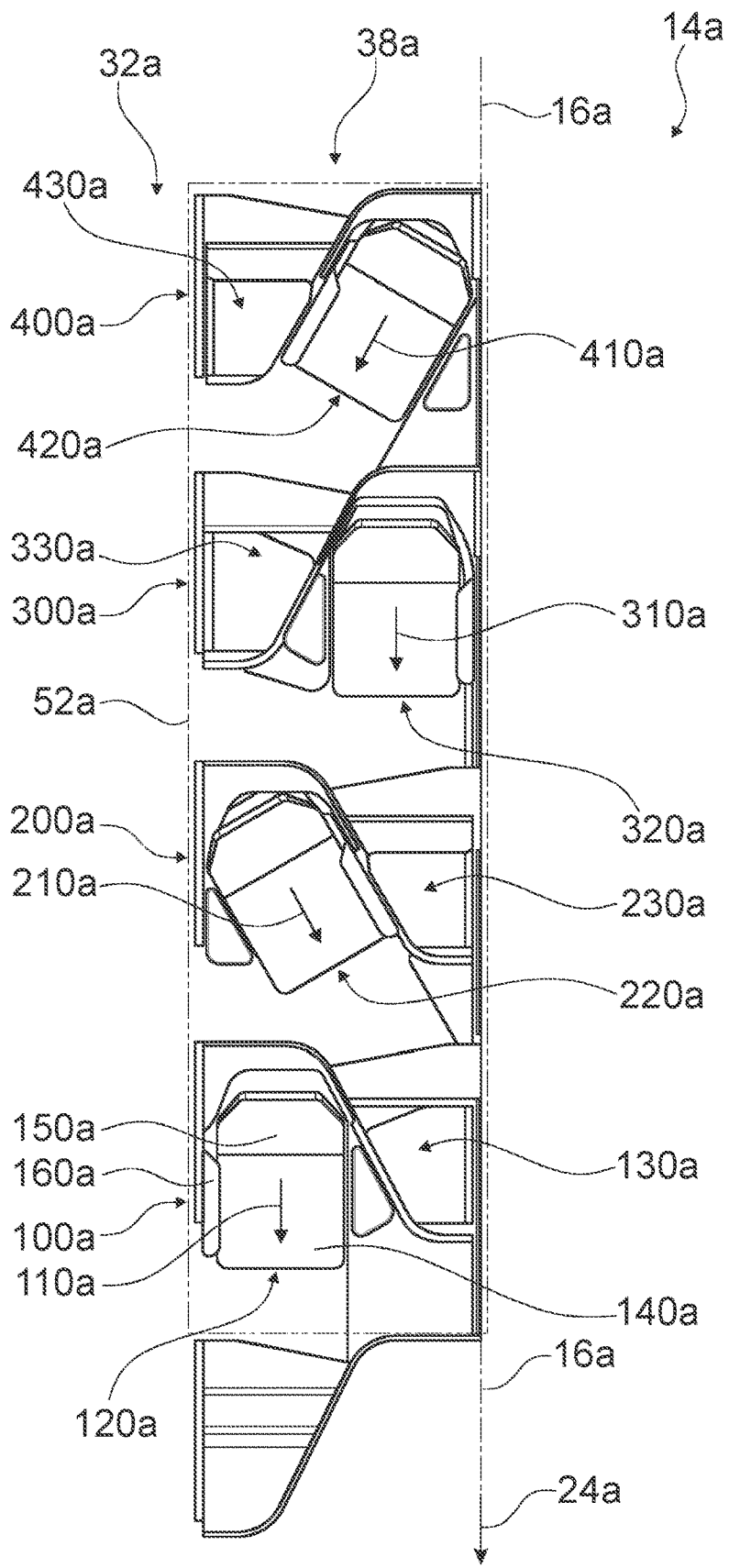
Figure 4:
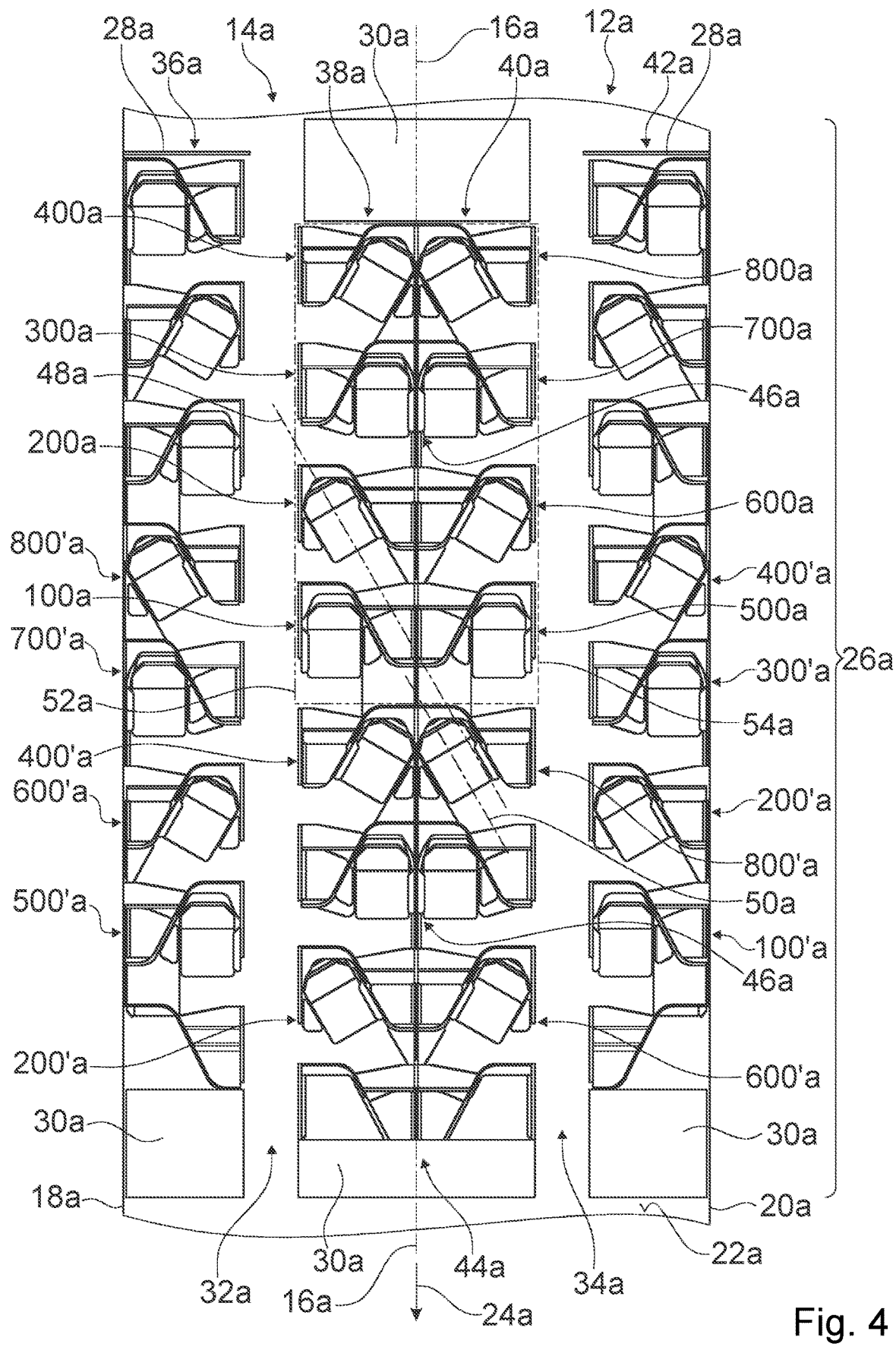
Figure 5:
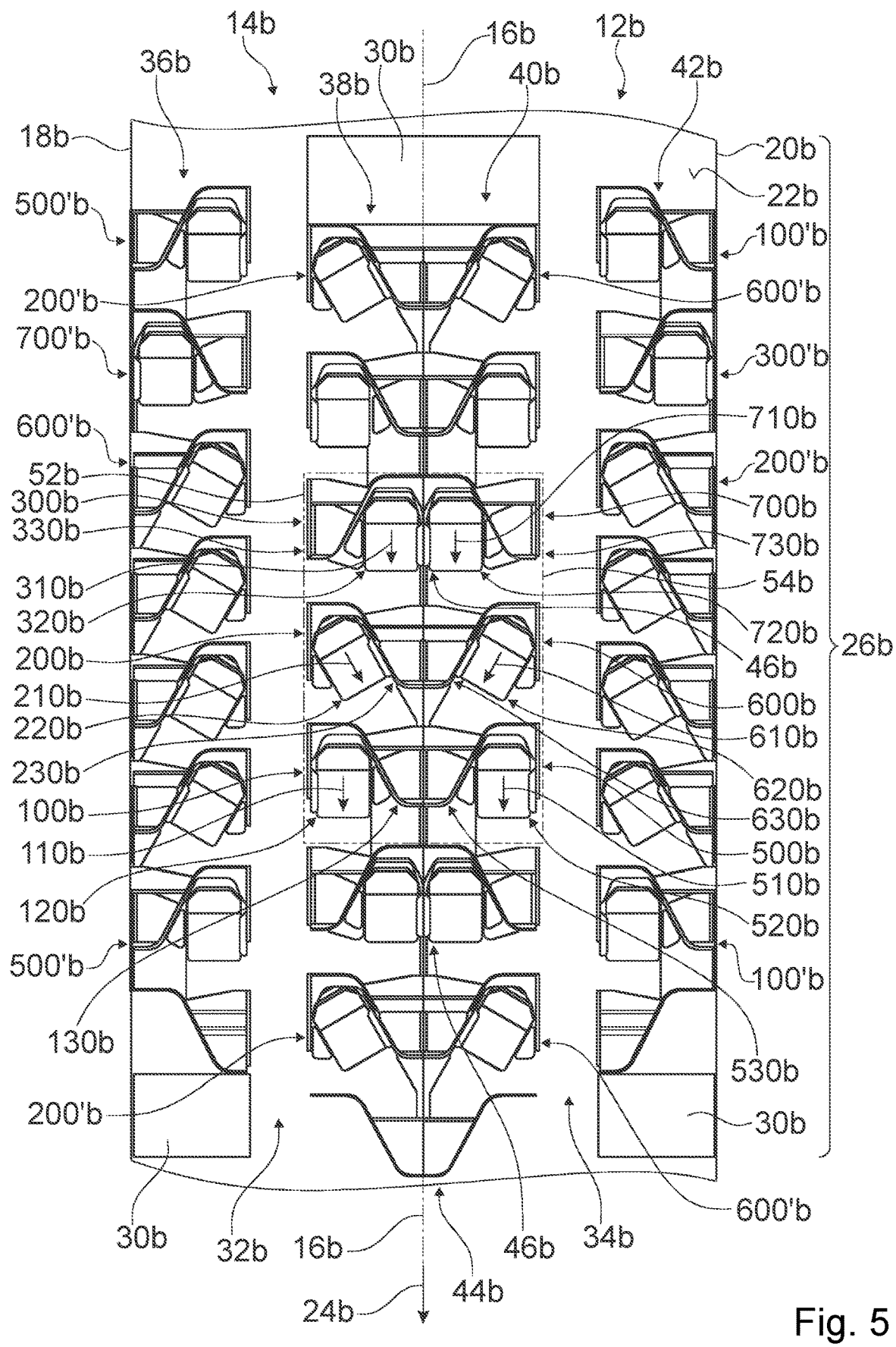
Figure 6:
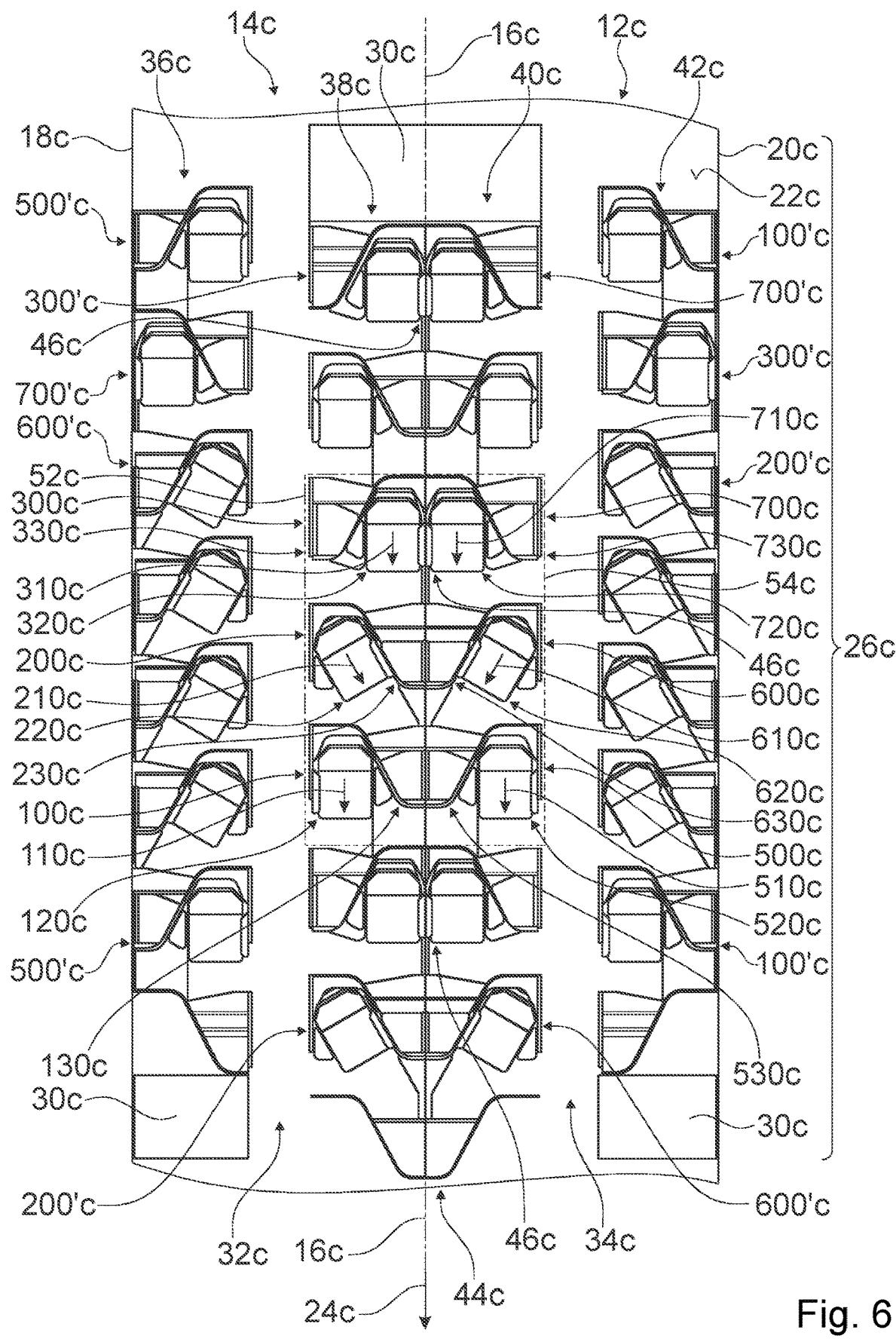
Figure 7:
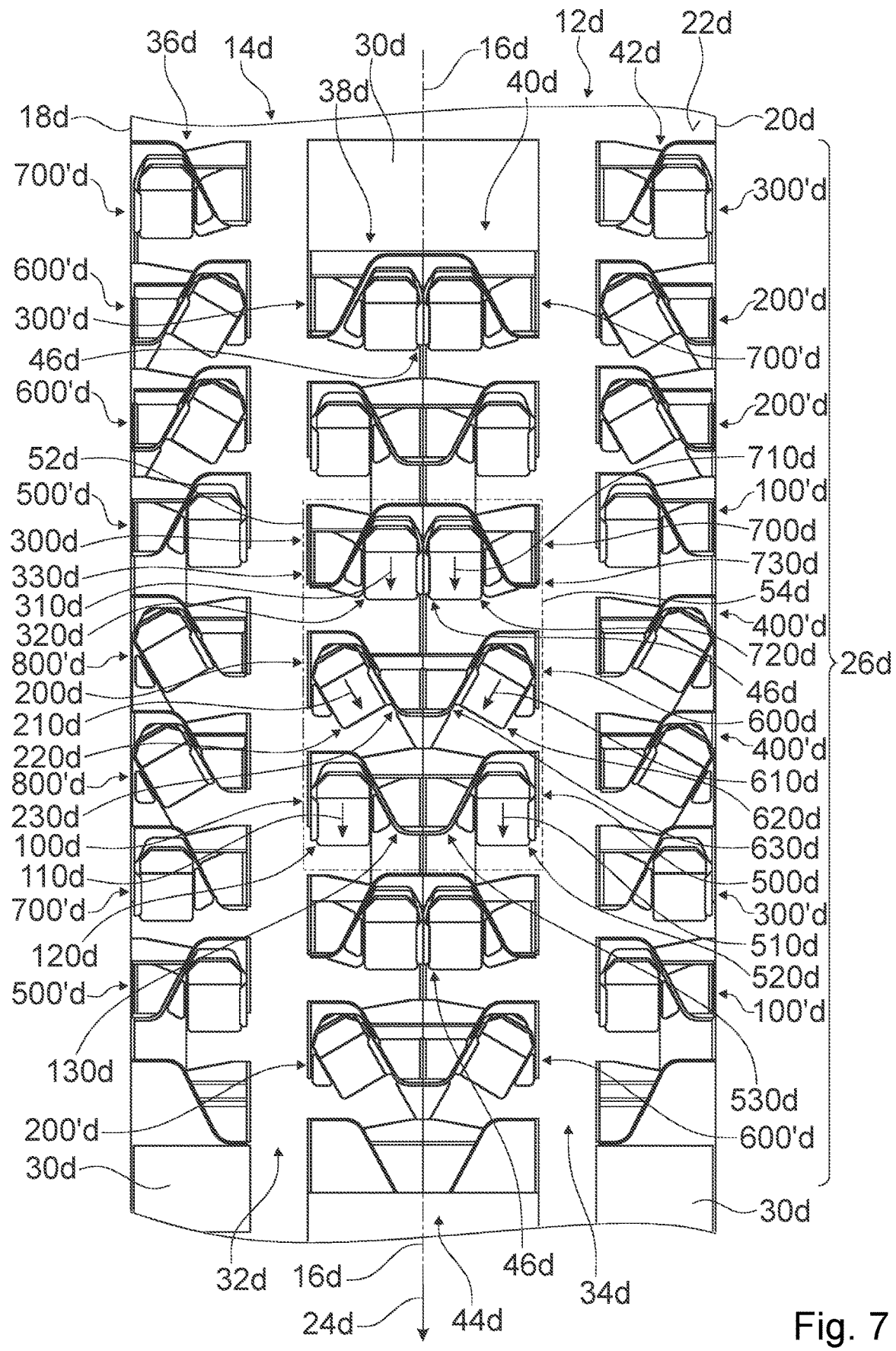
Figure 8:
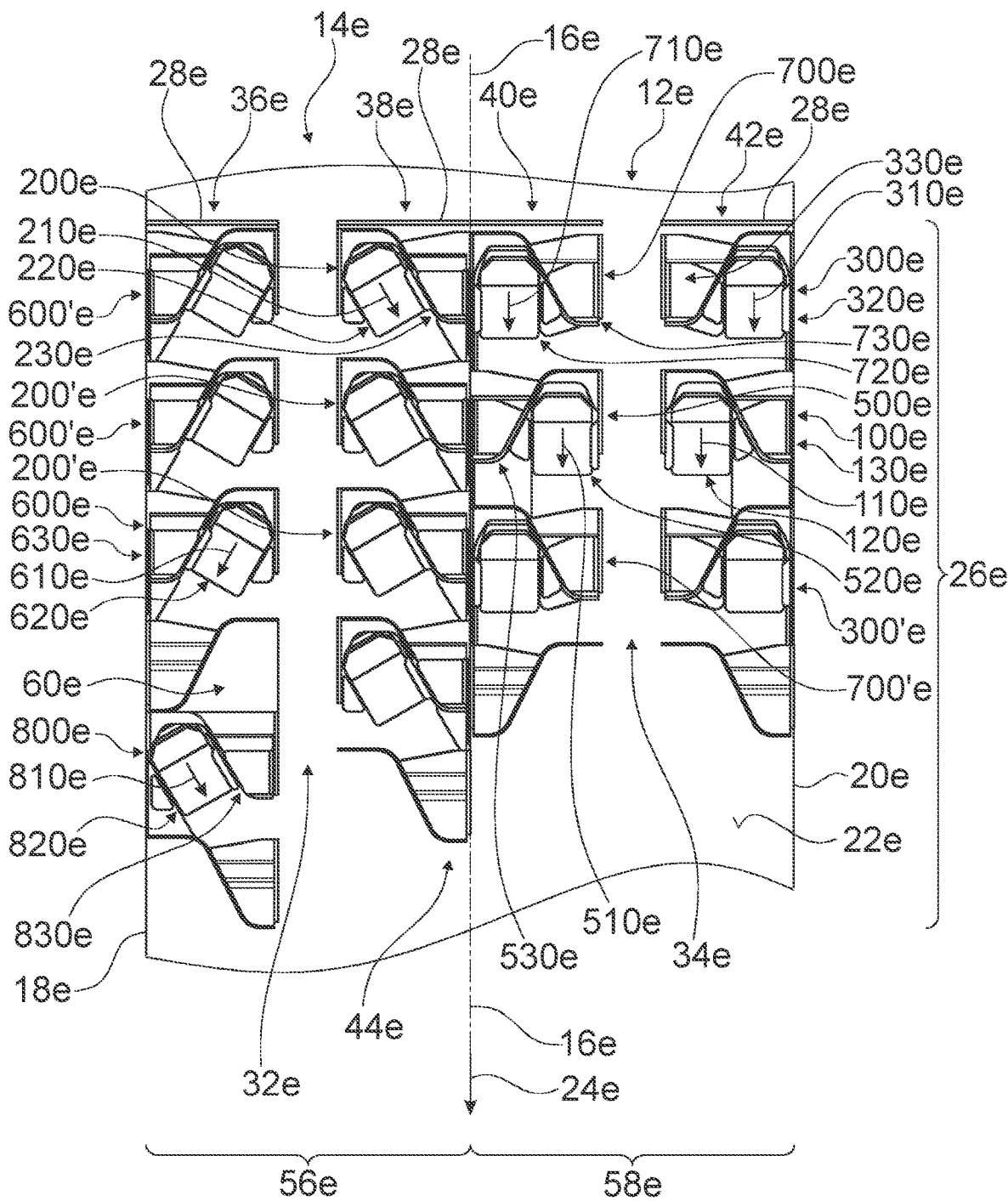
Figure 9:
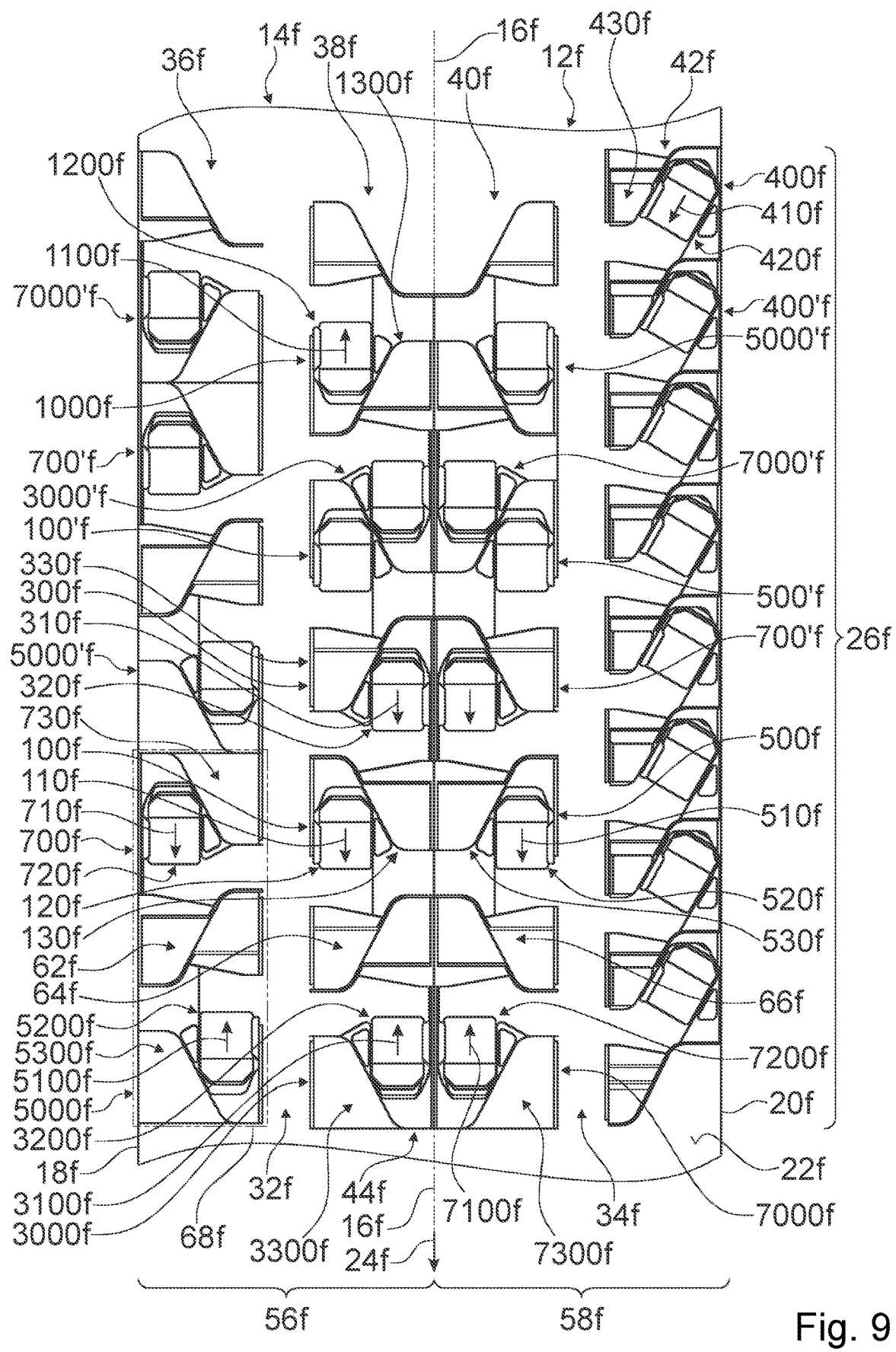
Figure 10:
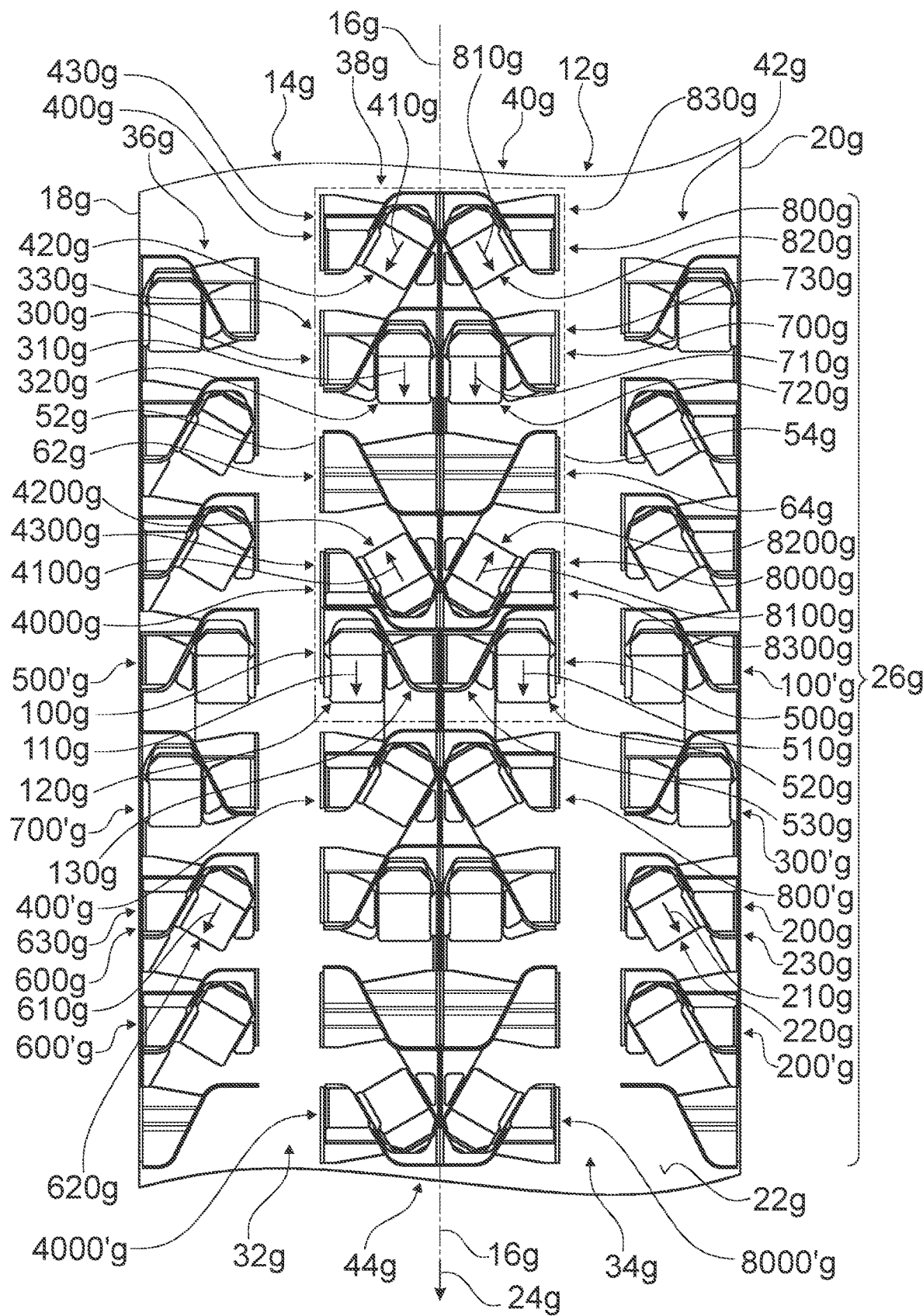

In the drawings:

FIG. 1 shows a schematic illustration of an aircraft in a first exemplary embodiment, FIG. 2 shows a schematic illustration of an aircraft seat arrangement according to the invention in the first exemplary embodiment, FIG. 3 shows a schematic illustration of a detail from the aircraft seat arrangement according to the invention in the first exemplary embodiment, FIG. 4 shows a schematic illustration of the aircraft seat arrangement according to the invention in the first exemplary embodiment, wherein the illustration apart from reference signs is identical to FIG. 2, FIG. 5 shows a schematic illustration of an aircraft seat arrangement according to the invention in a second exemplary embodiment, FIG. 6 shows a schematic illustration of an aircraft seat arrangement according to the invention in a third exemplary embodiment, FIG. 7 shows a schematic illustration of an aircraft seat arrangement according to the invention in a fourth exemplary embodiment, FIG. 8 shows a schematic illustration of an aircraft seat arrangement according to the invention in a fifth exemplary embodiment, FIG. 9 shows a schematic illustration of an aircraft seat arrangement according to the invention in a sixth exemplary embodiment, and FIG. 10 shows a schematic illustration of an aircraft seat arrangement according to the invention in a seventh exemplary embodiment.

DESCRIPTION OF THE EXEMPLARY EMBODIMENTS

FIG. 1 shows an aircraft 10a. The aircraft 10a has an aircraft cabin 12a. The aircraft 10a has an aircraft seat arrangement 14a. FIGS. 2 to 4 show the aircraft seat arrangement 14a in a first exemplary embodiment. The aircraft seat arrangement 14a is configured for use in the aircraft cabin 12a, partially illustrated, of the aircraft 10a. The aircraft cabin 12a is intended for all of the passengers to be in during a flight.

The aircraft cabin 12a has an aircraft cabin center axis 16a. The aircraft cabin center axis 16a is designed as an aircraft longitudinal axis. The aircraft cabin center axis 16a is in each case at the same distance from opposite aircraft cabin outer walls 18a, 20a of the aircraft cabin 12a. The aircraft cabin center axis 16a is oriented parallel to a rolling axis of the aircraft 10a. The aircraft cabin center axis 16a is oriented parallel to an aircraft cabin floor 22a of the aircraft cabin 12a. The aircraft 10a has a flight direction 24a in at least one operating state. In the present case, the flight direction 24a is oriented in idealized form parallel to the aircraft cabin center axis 16a.

The aircraft cabin 12a has an aircraft cabin section 26a along the aircraft cabin center axis 16a. In addition, the aircraft cabin 12a can have at least one further aircraft cabin section, in particular in front of or behind the aircraft cabin section 26a, as viewed in the flight direction 24a. In the present case, the aircraft cabin section 26a is delimited by a plurality of separating elements 28a and by a plurality of schematically illustrated aircraft cabin modules 30a along the aircraft cabin center axis 16a. In the present case, the separating elements 28a are each designed as a partition. In the present case, the aircraft cabin modules 30a are respectively designed as a kitchen module, as a toilet module, as a closet or as a front row monument.

The aircraft seat arrangement 14a comprises a plurality of aircraft seat devices 100a, 200a, 300a, 400a, 500a, 600a, 700a, 800a which are arranged in the aircraft cabin section 26a. The aircraft seat devices 100a, 200a, 300a, 400a, 500a, 600a, 700a, 800a are configured to be installed on the floor 22a of the aircraft cabin 12a. In the present case, the aircraft seat devices 100a, 200a, 300a, 400a, 500a, 600a, 700a, 800a are each designed as a business class seat device. The plurality of aircraft seat devices 100a, 200a, 300a, 400a, 500a, 600a, 700a, 800a are formed differently from one another.

The aircraft seat arrangement 14a comprises a first aircraft seat device 100a of the plurality of aircraft seat devices 100a, 200a, 300a, 400a, 500a, 600a, 700a, 800a. The first aircraft seat device 100a has a sitting direction 110a. The sitting direction 110a of the first aircraft seat device 100a is oriented in the flight direction 24a. The sitting direction 110a of the first aircraft seat device 100a corresponds to the flight direction 24a. The sitting direction 110a of the first aircraft seat device 100a is oriented at least substantially parallel to the aircraft cabin center axis 16a. The first aircraft seat device 100a has a lying direction. In the present case, the lying direction of the first aircraft seat device 100a corresponds to the sitting direction 110a of the first aircraft seat device 100a. In principle, it is also conceivable for a lying direction of an aircraft seat device to differ from a sitting direction of said aircraft seat device, in particular by an angle of at most 18 degrees. The lying direction of the first aircraft seat device 100a is oriented in the flight direction 24a. The lying direction of the first aircraft seat device 100a corresponds to the flight direction 24a. The lying direction of the first aircraft seat device 100a is oriented at least substantially parallel to the aircraft cabin center axis 16a.

The aircraft seat arrangement 14a comprises a second aircraft seat device 200a of the plurality of aircraft seat devices 100a, 200a, 300a, 400a, 500a, 600a, 700a, 800a. The second aircraft seat device 200a has a sitting direction 210a. The sitting direction 210a of the second aircraft seat device 200a has a directional component in the flight direction 24a. The sitting direction 210a of the second aircraft seat device 200a differs from the flight direction 24a. In the present case, the sitting direction 210a of the second aircraft seat device 200a is oriented in a manner angled by 30 degrees with respect to the aircraft cabin center axis 16a. The second aircraft seat device 200a has a lying direction. In the present case, the lying direction of the second aircraft seat device 200a corresponds to the sitting direction 210a of the second aircraft seat device 200a. The lying direction of the second aircraft seat device 200a has a directional component in the flight direction 24a. The lying direction of the second aircraft seat device 200a differs from the flight direction 24a. In the present case, the lying direction of the second aircraft seat device 200a is oriented in a manner angled by 30 degrees with respect to the aircraft cabin center axis 16a.

The aircraft seat arrangement 14a comprises a third aircraft seat device 300a of the plurality of aircraft seat devices 100a, 200a, 300a, 400a, 500a, 600a, 700a, 800a. The third aircraft seat device 300a has a sitting direction 310a. The sitting direction 310a of the third aircraft seat device 300a is oriented in the flight direction 24a. The sitting direction 310a of the third aircraft seat device 300a corresponds to the flight direction 24a. The sitting direction 310a of the third aircraft seat device 300a is oriented at least substantially parallel to the aircraft cabin center axis 16a. The third aircraft seat device 300a has a lying direction. In the present case, the lying direction of the third aircraft seat device 300a corresponds to the sitting direction 310a of the third aircraft seat device 300a. The lying direction of the third aircraft seat device 300a is oriented in the flight direction 24a. The lying direction of the third aircraft seat device 300a corresponds to the flight direction 24a. The lying direction of the third aircraft seat device 300a is oriented at least substantially parallel to the aircraft cabin center axis 16a.

The aircraft seat arrangement 14a comprises a fourth aircraft seat device 400a of the plurality of aircraft seat devices 100a, 200a, 300a, 400a, 500a, 600a, 700a, 800a. The fourth aircraft seat device 400a has a sitting direction 410a. The sitting direction 410a of the fourth aircraft seat device 400a has a directional component in the flight direction 24a. The sitting direction 410a of the fourth aircraft seat device 400a differs from the flight direction 24a. In the present case, the sitting direction 410a of the fourth aircraft seat device 400a is oriented in a manner angled by 30 degrees with respect to the aircraft cabin center axis 16a. The fourth aircraft seat device 400a has a lying direction. In the present case, the lying direction of the fourth aircraft seat device 400a corresponds to the sitting direction 410a of the fourth aircraft seat device 400a. The lying direction of the fourth aircraft seat device 400a has a directional component in the flight direction 24a. The lying direction of the fourth aircraft seat device 400a differs from the flight direction 24a. In the present case, the lying direction of the fourth aircraft seat device 400a is oriented in a manner angled by 30 degrees with respect to the aircraft cabin center axis 16a.

The first aircraft seat device 100a, the second aircraft seat device 200a, the third aircraft seat device 300a and the fourth aircraft seat device 400a are designed to be different from one another.

The aircraft seat arrangement 14a comprises a fifth aircraft seat device 500a of the plurality of aircraft seat devices 100a, 200a, 300a, 400a, 500a, 600a, 700a, 800a. The fifth aircraft seat device 500a is formed in a mirror image to the first aircraft seat device 100a via an aircraft longitudinal axis, in particular via the aircraft cabin center axis 16a. The fifth aircraft seat device 500a has a sitting direction 510a. The sitting direction 510a of the fifth aircraft seat device 500a is oriented in the flight direction 24a. The sitting direction 510a of the fifth aircraft seat device 500a corresponds to the flight direction 24a. The sitting direction 510a of the fifth aircraft seat device 500a is oriented at least substantially parallel to the aircraft cabin center axis 16a. The fifth aircraft seat device 500a has a lying direction. In the present case, the lying direction of the fifth aircraft seat device 500a corresponds to the sitting direction 510a of the fifth aircraft seat device 500a. The lying direction of the fifth aircraft seat device 500a is oriented in the flight direction 24a. The lying direction of the fifth aircraft seat device 500a corresponds to the flight direction 24a. The lying direction of the fifth aircraft seat device 500a is oriented at least substantially parallel to the aircraft cabin center axis 16a.

The aircraft seat arrangement 14a comprises a sixth aircraft seat device 600a of the plurality of aircraft seat devices 100a, 200a, 300a, 400a, 500a, 600a, 700a, 800a. The sixth aircraft seat device 600a is formed in mirror image to the second aircraft seat device 200a via an aircraft longitudinal axis, in particular via the aircraft cabin center axis 16a. The sixth aircraft seat device 600a has a sitting direction 610a. The sitting direction 610a of the sixth aircraft seat device 600a has a directional component in the flight direction 24a. The sitting direction 610a of the sixth aircraft seat device 600a differs from the flight direction 24a. In the present case, the sitting direction 610a of the sixth aircraft seat device 600a is oriented in a manner angled by 30 degrees with respect to the aircraft cabin center axis 16a. The sixth aircraft seat device 600a has a lying direction. In the present case, the lying direction of the sixth aircraft seat device 600a corresponds to the sitting direction 610a of the sixth aircraft seat device 600a. The lying direction of the sixth aircraft seat device 600a has a directional component in the flight direction 24a. The lying direction of the sixth aircraft seat device 600a differs from the flight direction 24a. In the present case, the lying direction of the sixth aircraft seat device 600a is oriented in a manner angled by 30 degrees with respect to the aircraft cabin center axis 16a.

The aircraft seat arrangement 14a comprises a seventh aircraft seat device 700a of the plurality of aircraft seat devices 100a, 200a, 300a, 400a, 500a, 600a, 700a, 800a. The seventh aircraft seat device 700a is formed in mirror image to the third aircraft seat device 300a via an aircraft longitudinal axis, in particular via the aircraft cabin center axis 16a. The seventh aircraft seat device 700a has a sitting direction 710a. The sitting direction 710a of the seventh aircraft seat device 700a is oriented in the flight direction 24a. The sitting direction 710a of the seventh aircraft seat device 700a corresponds to the flight direction 24a. The sitting direction 710a of the seventh aircraft seat device 700a is oriented at least substantially parallel to the aircraft cabin center axis 16a. The seventh aircraft seat device 700a has a lying direction. In the present case, the lying direction of the seventh aircraft seat device 700a corresponds to the sitting direction 710a of the seventh aircraft seat device 700a. The lying direction of the seventh aircraft seat device 700a is oriented in the flight direction 24a. The lying direction of the seventh aircraft seat device 700a corresponds to the flight direction 24a. The lying direction of the seventh aircraft seat device 700a is oriented at least substantially parallel to the aircraft cabin center axis 16a.

The aircraft seat arrangement 14a comprises an eighth aircraft seat device 800a of the plurality of aircraft seat devices 100a, 200a, 300a, 400a, 500a, 600a, 700a, 800a. The eighth aircraft seat device 800a is formed in mirror image to the fourth aircraft seat device 400a via an aircraft longitudinal axis, in particular via the aircraft cabin center axis 16a. The eighth aircraft seat device 800a has a sitting direction 810a. The sitting direction 810a of the eighth aircraft seat device 800a has a directional component in the flight direction 24a. The sitting direction 810a of the eighth aircraft seat device 800a differs from the flight direction 24a. In the present case, the sitting direction 810a of the eighth aircraft seat device 800a is oriented in a manner angled by 30 degrees with respect to the aircraft cabin center axis 16a. The eighth aircraft seat device 800a has a lying direction. In the present case, the lying direction of the eighth aircraft seat device 800a corresponds to the sitting direction 810a of the eighth aircraft seat device 800a. The lying direction of the eighth aircraft seat device 800a has a directional component in the flight direction 24a. The lying direction of the eighth aircraft seat device 800a differs from the flight direction 24a. In the present case, the lying direction of the eighth aircraft seat device 800a is oriented in a manner angled by 30 degrees with respect to the aircraft cabin center axis 16a.

The fifth aircraft seat device 500a, the sixth aircraft seat device 600a, the seventh aircraft seat device 700a and the eighth aircraft seat device 800a are designed to be different from one another.

In the present case, the aircraft seat arrangement 14a comprises eight aircraft seat devices 100a, 200a, 300a, 400a, 500a, 600a, 700a, 800a which are designed to be different and are each present at least once in the aircraft seat arrangement 14a. The first aircraft seat device 100a, the second aircraft seat device 200a, the third aircraft seat device 300a, the fourth aircraft seat device 400a, the fifth aircraft seat device 500a, the sixth aircraft seat device 600a, the seventh aircraft seat device 700a and the eighth aircraft seat device 800a are designed to be different from one another. In the present case, eight aircraft seat devices 100a, 200a, 300a, 400a, 500a, 600a, 700a, 800a which are designed to be different from one another are arranged in the aircraft cabin section 26a.

The aircraft seat devices 100a, 200a, 300a, 400a, 500a, 600a, 700a, 800a each have an aircraft seat. The first aircraft seat device 100a has a first aircraft seat 120a. The second aircraft seat device 200a has a second aircraft seat 220a. The third aircraft seat device 300a has a third aircraft seat 320a. The fourth aircraft seat device 400a has a fourth aircraft seat 420a. The fifth aircraft seat device 500a has a fifth aircraft seat 520a. The sixth aircraft seat device 600a has a sixth aircraft seat 620a. The seventh aircraft seat device 700a has a seventh aircraft seat 720a. The eighth aircraft seat device 800a has an eighth aircraft seat 820a. The aircraft seats 120a, 220a, 320a, 420a, 520a, 620a, 720a, 820a are each configured to provide a sitting place for a passenger, not illustrated, in the aircraft 10a. The aircraft seats 120a, 220a, 320a, 420a, 520a, 620a, 720a, 820a each comprise a seat bottom. The aircraft seats 120a, 220a, 320a, 420a, 520a, 620a, 720a, 820a each comprise a backrest. The aircraft seats 120a, 220a, 320a, 420a, 520a, 620a, 720a, 820a each comprise a leg support, not illustrated specifically. The aircraft seats 120a, 220a, 320a, 420a, 520a, 620a, 720a, 820a each comprise an armrest. In FIG. 3, a seat bottom 140a, a backrest 150a and an armrest 160a of the first aircraft seat 120a are provided with a reference sign for illustrative purposes. In the present case, the aircraft seats 120a, 220a, 320a, 420a, 520a, 620a, 720a, 820a are substantially identical in design. In the present case, the aircraft seats 120a, 220a, 320a, 420a, 520a, 620a, 720a, 820a themselves differ only by an arrangement of the armrest on the aircraft seats 120a, 220a, 320a, 420a, 520a, 620a, 720a, 820a. In addition, the aircraft seats 120a, 220a, 320a, 420a, 520a, 620a, 720a, 820a can each comprise further add-on parts, not illustrated specifically, for example a headrest or at least one further armrest. The aircraft seats 120a, 220a, 320a, 420a, 520a, 620a, 720a, 820a are each designed as a full-flat seat. The aircraft seats 120a, 220a, 320a, 420a, 520a, 620a, 720a, 820a are each adjustable between a sitting position and a lying position. In FIGS. 2 and 3, the aircraft seats 120a, 220a, 320a, 420a, 520a, 620a, 720a, 820a are each illustrated in the sitting position. The aircraft seats 120a, 220a, 320a, 420a, 520a, 620a, 720a, 820a each comprise at least one adjustment unit, not illustrated specifically, which is configured to adjust the aircraft seat 120a, 220a, 320a, 420a, 520a, 620a, 720a, 820a electromechanically between the sitting position and the lying position. In principle, further positions which in particular form a combined sitting and lying position can be provided between the sitting position and the lying position. The aircraft seats 120a, 220a, 320a, 420a, 520a, 620a, 720a, 820a each form an at least substantially flat lying surface in the lying position.

The aircraft seat devices 100a, 200a, 300a, 400a, 500a, 600a, 700a, 800a each have a console. The first aircraft seat device 100a has a first console 130a. The first console 130a is arranged facing away from the aisle. The second aircraft seat device 200a has a second console 230a. The second console 230a is arranged facing away from the aisle. The third aircraft seat device 300a has a third console 330a. The third console 330a is arranged on the aisle side. The fourth aircraft seat device 400a has a fourth console 430a. The fourth console 430a is arranged on the aisle side. The fifth aircraft seat device 500a has a fifth console 530a. The fifth console 530a is arranged facing away from the aisle. The sixth aircraft seat device 600a has a sixth console 630a. The sixth console 630a is arranged facing away from the aisle. The seventh aircraft seat device 700a has a seventh console 730a. The seventh console 730a is arranged on the aisle side. The eighth aircraft seat device 800a has an eighth console 830a. The eighth console 830a is arranged on the aisle side. The consoles 130a, 230a, 330a, 430a, 530a, 630a, 730a, 830a are each usable by two aircraft seat devices 100a, 200a, 300a, 400a, 500a, 600a, 700a, 800a arranged directly adjacent to one another in an individual seat column. The consoles 130a, 230a, 330a, 430a, 530a, 630a, 730a, 830a are each usable by two aircraft seat devices 100a, 200a, 300a, 400a, 500a, 600a, 700a, 800a arranged directly one behind another. The consoles 130a, 230a, 330a, 430a, 530a, 630a, 730a, 830a each form a depositing surface. The depositing surface is configured for an aircraft seat 120a, 220a, 320a, 420a, 520a, 620a, 720a, 820a which is directly adjacent to a corresponding console 130a, 230a, 330a, 430a, 530a, 630a, 730a, 830a. In addition, the consoles 130a, 230a, 330a, 430a, 530a, 630a, 730a, 830a can each form at least one storage space, in particular for a lifejacket module, for literature and/or for personal objects.

The aircraft seat devices 100a, 200a, 300a, 400a, 500a, 600a, 700a, 800a each comprise a table unit. In the present case, the table unit is arranged on the console 130a, 230a, 330a, 430a, 530a, 630a, 730a, 830a. The table unit comprises a pivotable and/or extendable table. In at least one operating state, the table can be at least partially positioned in a region above a seat bottom.

The consoles 130a, 230a, 330a, 430a, 530a, 630a, 730a, 830a each form a foot space, not illustrated specifically. The foot spaces are each assigned to the aircraft seat device arranged, as viewed in the sitting direction 110a, 210a, 310a, 410a, 510a, 610a, 710a, 810a of the corresponding aircraft seat device 100a, 200a, 300a, 400a, 500a, 600a, 700a, 800a, directly in front of said aircraft seat device 100a, 200a, 300a, 400a, 500a, 600a, 700a, 800a. The aircraft seat devices 100a, 200a, 300a, 400a, 500a, 600a, 700a, 800a each have an ottoman, not illustrated specifically. The ottomans are each arranged inside the consoles 130a, 230a, 330a, 430a, 530a, 630a, 730a, 830a. The ottomans are each configured as a leg rest and/or footrest for a passenger. The ottomans are each assigned to the aircraft seat device arranged, as viewed in the sitting direction 110a, 210a, 310a, 410a, 510a, 610a, 710a, 810a of the corresponding aircraft seat device 100a, 200a, 300a, 400a, 500a, 600a, 700a, 800a, directly in front of said aircraft seat device 100a, 200a, 300a, 400a, 500a, 600a, 700a, 800a.

The aircraft seat devices 100a, 200a, 300a, 400a, 500a, 600a, 700a, 800a each have an enclosure. The enclosures are each designed as a shell element. The enclosures are each arranged in front of the corresponding aircraft seats 120a, 220a, 320a, 420a, 520a, 620a, 720a, 820a, as viewed in the flight direction 24a. The enclosures are configured to separate aircraft seat devices 100a, 200a, 300a, 400a, 500a, 600a, 700a, 800a arranged directly one behind another optically from one another. In the present case, the enclosures are each connected to a console 130a, 230a, 330a, 430a, 530a, 630a, 730a, 830a. In principle, enclosures of a plurality of aircraft seat devices 100a, 200a, 300a, 400a, 500a, 600a, 700a, 800a can also be formed integrally with one another.

The aircraft seat devices 100a, 200a, 300a, 400a, 500a, 600a, 700a, 800a each comprise a screen. The screens are each arranged on a rear side of the enclosures. The screens are each assigned to the aircraft seat device arranged, as viewed in the sitting direction 110a, 210a, 310a, 410a, 510a, 610a, 710a, 810a of the corresponding aircraft seat device 100a, 200a, 300a, 400a, 500a, 600a, 700a, 800a, directly in front of said aircraft seat device 100a, 200a, 300a, 400a, 500a, 600a, 700a, 800a.

The aircraft seat devices 100a, 200a, 300a, 400a, 500a, 600a, 700a, 800a each have at least one separating unit which is configured to optically shield the aircraft seat region from an environment to meet requirements. As a result, a private sphere can advantageously be increased. The at least one separating unit has at least one adjustable separating element which, for example, is designed as a sliding door.

The aircraft seat devices 100a, 200a, 300a, 400a, 500a, 600a, 700a, 800a each form an aircraft seat region. The corresponding aircraft seats 120a, 220a, 320a, 420a, 520a, 620a, 720a, 820a of the aircraft seat devices 100a, 200a, 300a, 400a, 500a, 600a, 700a, 800a are in each case arranged in the aircraft seat regions. The aircraft seat regions are each intended for a passenger to be in during a flight. The aircraft seat devices 100a, 200a, 300a, 400a, 500a, 600a, 700a, 800a have differently shaped and/or differently arranged components in the corresponding aircraft seat regions. As a result, the first aircraft seat device 100a, the second aircraft seat device 200a, the third aircraft seat device 300a and the fourth aircraft seat device 400a are designed differently from one another. Furthermore, the fifth aircraft seat device 500a, the sixth aircraft seat device 600a, the seventh aircraft seat device 700a and the eighth aircraft seat device 800a are designed differently from one another as a result. In particular, an arrangement and an orientation of the aircraft seats 120a, 220a, 320a, 420a in the respective aircraft seat regions differ in the first aircraft seat device 100a, the second aircraft seat device 200a, the third aircraft seat device 300a and the fourth aircraft seat device 400a. Furthermore, in particular an arrangement and an orientation of the aircraft seats 520a, 620a, 720a, 820a in the respective aircraft seat regions differ for the fifth aircraft seat device 500a, the sixth aircraft seat device 600a, the seventh aircraft seat device 700a and the eighth aircraft seat device 800a.

In the present case, the aircraft cabin 12a has two aircraft cabin aisles 32a, 34a in the aircraft cabin section 26a. The aircraft cabin 12a has a first aircraft cabin aisle 32a and a second aircraft cabin aisle 34a. Alternatively, it would also be conceivable for the aircraft cabin 12a to have only one aircraft cabin aisle. The aircraft cabin aisles 32a, 34a each extend at least substantially along an aircraft longitudinal axis, not illustrated specifically. Each of the plurality of aircraft seat devices 100a, 200a, 300a, 400a, 500a, 600a, 700a, 800a in each case has direct access to the first aircraft cabin aisle 32a or to the second aircraft cabin aisle 34a. The first aircraft seat device 100a has direct access to the first aircraft cabin aisle 32a. The second aircraft seat device 200a has direct access to the first aircraft cabin aisle 32a. The third aircraft seat device 300a has direct access to the first aircraft cabin aisle 32a. The fourth aircraft seat device 400a has direct access to the first aircraft cabin aisle 32a. The fifth aircraft seat device 500a has direct access to the second aircraft cabin aisle 34a. The sixth aircraft seat device 600a has direct access to the second aircraft cabin aisle 34a. The seventh aircraft seat device 700a has direct access to the second aircraft cabin aisle 34a. The eighth aircraft seat device 800a has direct access to the second aircraft cabin aisle 34a. The aircraft seat regions are in each case accessible from the first aircraft cabin aisle 32a or the second aircraft cabin aisle 34a.

In the present case, the aircraft seat arrangement 14a comprises four seat columns 36a, 38a, 40a, 42a. Alternatively, it would also be conceivable for the aircraft seat arrangement 14a to only have two or three seat columns. The aircraft seat arrangement 14a comprises a first outer seat column 36a and a first inner seat column 38a. The first outer seat column 36a and the first inner seat column 38a are spaced apart from each other by the first aircraft cabin aisle 32a. The aircraft seat arrangement 14a comprises a second inner seat column 40a and a second outer seat column 42a. The second outer seat column 42a and the second inner seat column 40a are spaced apart from each other by the second aircraft cabin aisle 34a. In the present case, the first inner seat column 38a is formed symmetrically with respect to the second inner seat column 40a via the aircraft cabin center axis 16a. In the present case, the first outer seat column 36a is formed symmetrically with respect to the second outer seat column 42a via the aircraft cabin center axis 16a. The first inner seat column 38a and the second inner seat column 40a are arranged directly next to each other. The aircraft cabin 12a has a central region 44a. The central region 44a is delimited by the two aircraft cabin aisles 32a, 34a. The first inner seat column 38a and the second inner seat column 40a are arranged in the central region 44a. The first inner seat column 38a and the second inner seat column 40a form a double seat column. The first console 130a and the fifth console 530a are arranged directly next to each other in the central region 44a and in particular are not spaced apart from each other by an aircraft seat. The first console 130a and the fifth console 530a are arranged directly next to each other in the central region 44a and in particular are not spaced apart from each other by an aircraft seat. In principle, it would also be conceivable for just one seat column to be arranged in the central region 44a. In principle, it is also conceivable for the first inner seat column 38a to be exchangeable with the second outer seat column 42a and/or for the second inner seat column 40a to be exchangeable with the first outer seat column 36a.

The first aircraft seat device 100a and the fifth aircraft seat device 500a are arranged directly next to each other. The second aircraft seat device 200a and the sixth aircraft seat device 600a are arranged directly next to each other. The third aircraft seat device 300a and the seventh aircraft seat device 700a are arranged directly next to each other. The fourth aircraft seat device 400a and the eighth aircraft seat device 800a are arranged directly next to each other.

In the present case, the aircraft seat arrangement 14a comprises a plurality of further first aircraft seat devices 100'a which are formed at least substantially identically to the first aircraft seat device 100a. In this connection, "at least substantially identically" is intended to be understood as meaning in particular that the respective further aircraft seat devices are formed identically to the corresponding aircraft seat device arranged in the central region 44a of the aircraft cabin 12a apart from a possible modified shaping of an enclosure, a console and/or an aircraft seat necessitated by a contour of an aircraft cabin outer wall 18a, 20a. The further first aircraft seat devices 100'a are in each case arranged in the first inner seat column 38a or in the second outer seat column 42a. In the present case, the aircraft seat arrangement 14a comprises a plurality of further second aircraft seat devices 200'a which are formed at least substantially identically to the second aircraft seat device 200a. The further second aircraft seat devices 200'a are in each case arranged in the first inner seat column 38a or in the second outer seat column 42a. In the present case, the aircraft seat arrangement 14a comprises a plurality of further third aircraft seat devices 300'a which are formed at least substantially identically to the third aircraft seat device 300a. The further third aircraft seat devices 300'a are in each case arranged in the first inner seat column 38a or in the second outer seat column 42a. In the present case, the aircraft seat arrangement 14a comprises a plurality of further fourth aircraft seat devices 400'a which are formed at least substantially identically to the fourth aircraft seat device 400a. The further fourth aircraft seat devices 400'a are in each case arranged in the first inner seat column 38a or in the second outer seat column 42a. In the present case, the aircraft seat arrangement 14a comprises a plurality of further fifth aircraft seat devices 500'a which are formed at least substantially identically to the fifth aircraft seat device 500a. The further fifth aircraft seat devices 500'a are in each case arranged in the second inner seat column 40a or in the first outer seat column 36a. In the present case, the aircraft seat arrangement 14a comprises a plurality of further sixth aircraft seat devices 600'a which are formed at least substantially identically to the sixth aircraft seat device 600a. The further sixth aircraft seat devices 600'a are in each case arranged in the second inner seat column 40a or in the first outer seat column 36a. In the present case, the aircraft seat arrangement 14a comprises a plurality of further seventh aircraft seat devices 700'a which are formed at least substantially identically to the seventh aircraft seat device 700a. The further seventh aircraft seat devices 700'a are in each case arranged in the second inner seat column 40a or in the first outer seat column 36a. In the present case, the aircraft seat arrangement 14a comprises a plurality of further eighth aircraft seat devices 800'a which are formed at least substantially identically to the eighth aircraft seat device 800a. The further eighth aircraft seat devices 800'a are in each case arranged in the second inner seat column 40a or in the first outer seat column 36a. For reasons of clarity, only a selection of further aircraft seat devices 100'a, 200'a, 300'a, 400'a, 500'a, 600'a, 700'a, 800'a are provided with a reference sign in FIG. 2.

In the aircraft cabin section 26a, the sitting direction 110a of the first aircraft seat device 100a of the plurality of aircraft seat devices 100a, 200a, 300a, 400a, 500a, 600a, 700a, 800a in the first inner seat column 38a is oriented at least substantially parallel to the aircraft cabin center axis 16a. The first aircraft seat 120a of the first aircraft seat device 100a of the aircraft seat devices 100a, 200a, 300a, 400a arranged in the first inner seat column 38a in the aircraft cabin section 26a is arranged on the aisle side.

In the aircraft cabin section 26a, the sitting direction 210a of the second aircraft seat device 200a of the plurality of aircraft seat devices 100a, 200a, 300a, 400a in the first inner seat column 38a is arranged in an angled manner at an angle of at least 18 degrees with respect to the aircraft cabin center axis 16a. In the present case, in the aircraft cabin section 26a, the sitting direction 210a of the second aircraft seat device 200a of the plurality of aircraft seat devices 100a, 200a, 300a, 400a, 500a, 600a, 700a, 800a in the first inner seat column 38a is arranged in an angled manner at an angle of 30 degrees with respect to the aircraft cabin center axis 16a. In the aircraft cabin section 26a, the sitting direction 210a of the second aircraft seat device 200a of the plurality of aircraft seat devices 100a, 200a, 300a, 400a, 500a, 600a, 700a, 800a in the first inner seat column 38a is directed away from the directly adjacent first aircraft cabin aisle 32a. The second aircraft seat 220a of the second aircraft seat device 200a of the aircraft seat devices 100a, 200a, 300a, 400a arranged in the first inner seat column 38a in the aircraft cabin section 26a is arranged on the aisle side.

In the aircraft cabin section 26a, the sitting direction 310a of the third aircraft seat device 300a of the plurality of aircraft seat devices 100a, 200a, 300a, 400a, 500a, 600a, 700a, 800a in the first inner seat column 38a is oriented at least substantially parallel to the aircraft cabin center axis 16a. The third aircraft seat 320a of the third aircraft seat device 300a of the aircraft seat devices 100a, 200a, 300a, 400a arranged in the first inner seat column 38a is arranged facing away from the aisle.

In the aircraft cabin section 26a, the sitting direction 410a of the fourth aircraft seat device 400a of the plurality of aircraft seat devices 100a, 200a, 300a, 400a, 500a, 600a, 700a, 800a in the first inner seat column 38a is arranged in an angled manner at an angle of at least 18 degrees with respect to the aircraft cabin center axis 16a. In the present case, in the aircraft cabin section 26a, the sitting direction 410a of the fourth aircraft seat device 400a of the plurality of aircraft seat devices 100a, 200a, 300a, 400a, 500a, 600a, 700a, 800a in the first inner seat column 38a is arranged in an angled manner at an angle of 30 degrees with respect to the aircraft cabin center axis 16a. In the aircraft cabin section 26a, the sitting direction 410a of the fourth aircraft seat device 400a of the plurality of aircraft seat devices 100a, 200a, 300a, 400a, 500a, 600a, 700a, 800a in the first inner seat column 38a is directed toward the directly adjacent first aircraft cabin aisle 32a. The fourth aircraft seat 420a of the fourth aircraft seat device 400a of the aircraft seat devices 100a, 200a, 300a, 400a arranged in the first inner seat column 38a is arranged facing away from the aisle.

The sitting directions 210a, 410a of the second aircraft seat device 200a and of the fourth aircraft seat device 400a are arranged in the first inner seat column 38a in an angled manner with respect to an aircraft longitudinal axis by an at least substantially identical angle in terms of value, wherein the sitting directions 210a, 410a of the second aircraft seat device 200a and of the fourth aircraft seat device 400a are formed in mirror image with respect to said aircraft longitudinal axis. The first aircraft seat device 100a and the third aircraft seat device 300a are spaced apart from each other by the second aircraft seat device 200a. The second aircraft seat device 200a and the fourth aircraft seat device 400a are spaced apart from each other by the third aircraft seat device 300a.

In the aircraft cabin section 26a, in the first inner seat column 38a, the first aircraft seat device 100a and the second aircraft seat device 200a each have an aircraft seat 120a, 220a which is arranged on the aisle side, and the third aircraft seat device 300a and the fourth aircraft seat device 400a, which are arranged directly behind or in front of the two aircraft seat devices 100a, 200a, as viewed in the flight direction 24a, each have an aircraft seat 320a, 420a which is arranged facing away from the aisle. The aircraft seats 120a, 320a of the aircraft seat devices 100a, 300a, the sitting directions 110a, 310a of which are arranged at least substantially parallel to the aircraft cabin center axis 16a, are at different distances from the first aircraft cabin aisle 32a. The aircraft seats 220a, 420a of the aircraft seat devices 200a, 400a, the sitting directions 210a, 410a of which are arranged in an angled manner with respect to the aircraft cabin center axis 16a, are at different distances from the first aircraft cabin aisle 32a.

In the aircraft cabin section 26a, at least three aircraft seat devices of the plurality of aircraft seat devices 100a, 200a, 300a, 400a, 500a, 600a, 700a, 800a, namely at least the first aircraft seat device 100a, the second aircraft seat device 200a and the third aircraft seat device 300a, are arranged in the first inner seat column 38a, wherein the sitting directions 110a, 310a of the first aircraft seat device 100a and of the third aircraft seat device 300a are arranged at least substantially parallel to the aircraft cabin center axis 16a, and the sitting direction 210a of the second aircraft seat device 200a is arranged in an angled manner with respect to the aircraft cabin center axis 16a. In the aircraft cabin section 26a, the at least three aircraft seat devices of the plurality of aircraft seat devices 100a, 200a, 300a, 400a, 500a, 600a, 700a, 800a, namely at least the first aircraft seat device 100a, the second aircraft seat device 200a and the third aircraft seat device 300a, are arranged directly one behind another in the first inner seat column 38a, wherein the sitting directions 110a, 310a of the first aircraft seat device 100a and of the third aircraft seat device 300a are arranged at least substantially parallel to the aircraft cabin center axis 16a, and the sitting direction 210a of the second aircraft seat device 200a is arranged in an angled manner with respect to the aircraft cabin center axis 16a.

In the aircraft cabin section 26a, at least three aircraft seat devices of the plurality of aircraft seat devices 100a, 200a, 300a, 400a, 500a, 600a, 700a, 800a, namely at least the second aircraft seat device 200a, the third aircraft seat device 300a and the fourth aircraft seat device 400a, are arranged in the first inner seat column 38a, wherein the sitting direction 310a of the third aircraft seat device 300a is arranged at least substantially parallel to the aircraft cabin center axis 16a, and sitting directions 210a, 410a of the second aircraft seat device 200a and of the fourth aircraft seat device 400a are arranged in an angled manner with respect to the aircraft cabin center axis 16a. In the aircraft cabin section 26a, the at least three aircraft seat devices of the plurality of aircraft seat devices 100a, 200a, 300a, 400a, 500a, 600a, 700a, 800a, namely at least the second aircraft seat device 200a, the third aircraft seat device 300a and the fourth aircraft seat device 400a, are arranged directly one behind another in the first inner seat column 38a, wherein the sitting direction 310a of the third aircraft seat device 300a is arranged at least substantially parallel to the aircraft cabin center axis 16a, and sitting directions 210a, 410a of the second aircraft seat device 200a and of the fourth aircraft seat device 400a are arranged in an angled manner with respect to the aircraft cabin center axis 16a.

In the aircraft cabin section 26a, at least three aircraft seat devices of the plurality of aircraft seat devices 100a, 200a, 300a, 400a, 500a, 600a, 700a, 800a, namely at least one of the further fourth aircraft seat devices 400'a, the first aircraft seat device 100a and the second aircraft seat device 200a, are arranged in the first inner seat column 38a, wherein the sitting direction 110a of the first aircraft seat device 100a is arranged at least substantially parallel to the aircraft cabin center axis 16a, and sitting directions of the second aircraft seat device 200a and of the further fourth aircraft seat device 400'a are arranged in an angled manner with respect to the aircraft cabin center axis 16a. In the aircraft cabin section 26a, the at least three aircraft seat devices of the plurality of aircraft seat devices 100a, 200a, 300a, 400a, 500a, 600a, 700a, 800a, namely at least one of the further fourth aircraft seat devices 400'a, the first aircraft seat device 100a and the second aircraft seat device 200a, are arranged directly one behind another in the first inner seat column 38a, wherein the sitting direction 110a of the first aircraft seat device 100a is arranged at least substantially parallel to the aircraft cabin center axis 16a, and sitting directions of the second aircraft seat device 200a and of the further fourth aircraft seat device 400'a are arranged in an angled manner with respect to the aircraft cabin center axis 16a.

In the aircraft cabin section 26a, at least three aircraft seat devices of the plurality of aircraft seat devices 100a, 200a, 300a, 400a, 500a, 600a, 700a, 800a, namely at least the first aircraft seat device 100a, one of the further fourth aircraft seat devices 400'a and one of the further third aircraft seat devices 300'a, are arranged in the first inner seat column 38a, wherein sitting directions of the first aircraft seat device 100a and of the further third aircraft seat device 300'a are arranged at least substantially parallel to the aircraft cabin center axis 16a, and a sitting direction of the further fourth aircraft seat device 400'a is arranged in an angled manner with respect to the aircraft cabin center axis 16a. In the aircraft cabin section 26a, the at least three aircraft seat devices of the plurality of aircraft seat devices 100a, 200a, 300a, 400a, 500a, 600a, 700a, 800a, namely at least the first aircraft seat device 100a, one of the further fourth aircraft seat devices 400'a and one of the further third aircraft seat devices 300'a, are arranged directly one behind another in the first inner seat column 38a, wherein sitting directions of the first aircraft seat device 100a and of the further third aircraft seat device 300'a are arranged at least substantially parallel to the aircraft cabin center axis 16a, and a sitting direction of the further fourth aircraft seat device 400'a is arranged in an angled manner with respect to the aircraft cabin center axis 16a.

In the aircraft cabin section 26a, four aircraft seat devices 100a, 200a, 300a, 400a, which are designed to differ from one another and are arranged directly behind one another, of the plurality of aircraft seat devices 100a, 200a, 300a, 400a, 500a, 600a, 700a, 800a are arranged in the first inner seat column 38a. The four aircraft seat devices 100a, 200a, 300a, 400a, which are designed to be different from one another and are arranged in the first inner seat column 38a, of the plurality of aircraft seat devices 100a, 200a, 300a, 400a, 500a, 600a, 700a, 800a are arranged directly consecutively in the flight direction 24a.

In the aircraft cabin section 26a, the first aircraft seat device 100a, the second aircraft seat device 200a and the third aircraft seat device 300a are arranged directly one behind another in the first inner seat column 38a. In the aircraft cabin section 26a, the second aircraft seat device 200a, the third aircraft seat device 300a and the fourth aircraft seat device 400a are arranged directly one behind another in the first inner seat column 38a. In the first inner seat column 38a in the aircraft cabin section 26a, the first aircraft seat device 100a is arranged directly behind the second aircraft seat device 200a, as viewed in the flight direction 24a. In the first inner seat column 38a in the aircraft cabin section 26a, the second aircraft seat device 200a is arranged directly behind the third aircraft seat device 300a, as viewed in the flight direction 24a. In the first inner seat column 38a in the aircraft cabin section 26a, the third aircraft seat device 300a is arranged directly behind the fourth aircraft seat device 400a, as viewed in the flight direction 24a. In principle, the fourth aircraft seat device 400a can be arranged directly behind the first aircraft seat device 100a, as viewed in the flight direction 24a, in the first inner seat column 38a in the aircraft cabin section 26a.

In the aircraft cabin section 26a, four aircraft seat devices which are designed to be different from one another, namely the first aircraft seat device 100a, the second aircraft seat device 200a, the third aircraft seat device 300a and the fourth aircraft seat device 400a, of the plurality of aircraft seat devices 100a, 100'a, 200a, 200'a, 300a, 300'a, 400a, 400'a, 500a, 500'a, 600a, 600'a, 700a, 700'a, 800a, 800'a are arranged directly behind one another in the first inner seat column 38a, wherein sitting directions 110a, 310a of two aircraft seat devices of the four aircraft seat devices 100a, 200a, 300a, 400a, namely of the first aircraft seat device 100a and of the third aircraft seat device 300a, are arranged at least substantially parallel to the aircraft cabin center axis 16a, wherein the first aircraft seat 120a of the first aircraft seat device 100a is arranged on the aisle side and the third aircraft seat 320a of the third aircraft seat device 300a is arranged facing away from the aisle, and sitting directions 210a, 410a of two further aircraft seat devices of the four aircraft seat devices 100a, 200a, 300a, 400a, namely of the second aircraft seat device 200a and of the fourth aircraft seat device 400a, are arranged in an angled manner with respect to the aircraft cabin center axis 16a, wherein the second aircraft seat 220a of the second aircraft seat device 200a is arranged on the aisle side and the fourth aircraft seat 420a of the fourth aircraft seat device 400a is arranged facing away from the aisle.

In the aircraft cabin section 26a, the sitting direction 510a of the fifth aircraft seat device 500a of the plurality of aircraft seat devices 100a, 200a, 300a, 400a, 500a, 600a, 700a, 800a in the second inner seat column 40a is oriented at least substantially parallel to the aircraft cabin center axis 16a. The fifth aircraft seat 520a of the fifth aircraft seat device 500a of the aircraft seat devices 500a, 600a, 700a, 800a which are arranged in the second inner seat column 40a in the aircraft cabin section 26a is arranged on the aisle side.

In the aircraft cabin section 26a, the sitting direction 610a of the sixth aircraft seat device 600a of the plurality of aircraft seat devices 100a, 200a, 300a, 400a, 500a, 600a, 700a, 800a is arranged in the second inner seat column 40a in a manner angled at an angle of at least 18 degrees with respect to the aircraft cabin center axis 16a. In the present case, in the second inner seat column 40a in the aircraft cabin section 26a, the sitting direction 610a of the sixth aircraft seat device 600a of the plurality of aircraft seat devices 100a, 200a, 300a, 400a, 500a, 600a, 700a, 800a is arranged in an angled manner at an angle of 30 degrees with respect to the aircraft cabin center axis 16a. In the aircraft cabin section 26a, the sitting direction 610a of the sixth aircraft seat device 600a of the plurality of aircraft seat devices 100a, 200a, 300a, 400a, 500a, 600a, 700a, 800a in the second inner seat column 40a is directed away from the directly adjacent second aircraft cabin aisle 34a. The sixth aircraft seat 620a of the sixth aircraft seat device 600a of the aircraft seat devices 500a, 600a, 700a, 800a which are arranged in the second inner seat column 40a in the aircraft cabin section 26a is arranged on the aisle side.

In the aircraft cabin section 26a, the sitting direction 710a of the seventh aircraft seat device 700a of the plurality of aircraft seat devices 100a, 200a, 300a, 400a, 500a, 600a, 700a, 800a in the second inner seat column 40a is oriented at least substantially parallel to the aircraft cabin center axis 16a. The seventh aircraft seat 720a of the seventh aircraft seat device 700a of the aircraft seat devices 500a, 600a, 700a, 800a which are arranged in the second inner seat column 40a is arranged facing away from the aisle.

In the aircraft cabin section 26a, the sitting direction 810a of the eighth aircraft seat device 800a of the plurality of aircraft seat devices 100a, 200a, 300a, 400a, 500a, 600a, 700a, 800a in the second inner seat column 40a is arranged in an angled manner at an angle of at least 18 degrees with respect to the aircraft cabin center axis 16a. In the present case, in the second inner seat column 40a in the aircraft cabin section 26a, the sitting direction 810a of the eighth aircraft seat device 800a of the plurality of aircraft seat devices 100a, 200a, 300a, 400a, 500a, 600a, 700a, 800a is arranged in an angled manner at an angle of 30 degrees with respect to the aircraft cabin center axis 16a. In the aircraft cabin section 26a, the sitting direction 810a of the eighth aircraft seat device 800a of the plurality of aircraft seat devices 100a, 200a, 300a, 400a, 500a, 600a, 700a, 800a in the second inner seat column 40a is directed toward the directly adjacent second aircraft cabin aisle 34a. The eighth aircraft seat 820a of the eighth aircraft seat device 800a of the aircraft seat devices 500a, 600a, 700a, 800a which are arranged in the second inner seat column 40a is arranged facing away from the aisle.

The sitting directions 610a, 810a of the sixth aircraft seat device 600a and of the eighth aircraft seat device 800a are arranged in the second inner seat column 40a in an angled manner with respect to an aircraft longitudinal axis by an at least substantially identical angle in terms of value, wherein the sitting directions 610a, 810a of the sixth aircraft seat device 600a and of the eighth aircraft seat device 800a are formed in mirror image with respect to said aircraft longitudinal axis. The fifth aircraft seat device 500a and the seventh aircraft seat device 700a are spaced apart from each other by the sixth aircraft seat device 600a. The sixth aircraft seat device 600a and the eighth aircraft seat device 800a are spaced apart from each other by the seventh aircraft seat device 700a.

In the aircraft cabin section 26a, in the second inner seat column 40a, the fifth aircraft seat device 500a and the sixth aircraft seat device 600a each have an aircraft seat 520a, 620a which is arranged on the aisle side, and the seventh aircraft seat device 700a and the eighth aircraft seat device 800a, which are arranged directly behind or in front of the two aircraft seat devices 500a, 600a, as viewed in the flight direction 24a, each have an aircraft seat 720a, 820a which is arranged facing away from the aisle. The aircraft seats 520a, 720a of the aircraft seat devices 500a, 700a, the sitting directions 510a, 710a of which are arranged at least substantially parallel to the aircraft cabin center axis 16a, are at different distances from the second aircraft cabin aisle 34a. The aircraft seats 620a, 820a of the aircraft seat devices 600a, 800a, the sitting directions 610a, 810a of which are arranged in an angled manner with respect to the aircraft cabin center axis 16a, are at different distances from the second aircraft cabin aisle 34a.

In the aircraft cabin section 26a, at least three aircraft seat devices of the plurality of aircraft seat devices 100a, 200a, 300a, 400a, 500a, 600a, 700a, 800a, namely at least the fifth aircraft seat device 500a, the sixth aircraft seat device 600a and the seventh aircraft seat device 700a, are arranged in the second inner seat column 40a, wherein the sitting directions 510a, 710a of the fifth aircraft seat device 500a and of the seventh aircraft seat device 700a are arranged at least substantially parallel to the aircraft cabin center axis 16a, and the sitting direction 610a of the sixth aircraft seat device 600a is arranged in an angled manner with respect to the aircraft cabin center axis 16*a*. In the aircraft cabin section 26*a*, the at least three aircraft seat devices of the plurality of aircraft seat devices 100*a*, 200*a*, 300*a*, 400*a*, 500*a*, 600*a*, 700*a*, 800*a*, namely at least the fifth aircraft seat device 500*a*, the sixth aircraft seat device 600*a* and the seventh aircraft seat device 700*a*, are arranged directly one behind another in the second inner seat column 40*a*, wherein the sitting directions 510*a*, 710*a* of the fifth aircraft seat device 500*a* and of the seventh aircraft seat device 700*a* are arranged at least substantially parallel to the aircraft cabin center axis 16*a*, and the sitting direction 610*a* of the sixth aircraft seat device 600*a* is arranged in an angled manner with respect to the aircraft cabin center axis 16*a*.

In the aircraft cabin section 26*a*, at least three aircraft seat devices of the plurality of aircraft seat devices 100*a*, 200*a*, 300*a*, 400*a*, 500*a*, 600*a*, 700*a*, 800*a*, namely at least the sixth aircraft seat device 600*a*, the seventh aircraft seat device 700*a* and the eighth aircraft seat device 800*a*, are arranged in the second inner seat column 40*a*, wherein the sitting direction 710*a* of the seventh aircraft seat device 700*a* is arranged at least substantially parallel to the aircraft cabin center axis 16*a*, and sitting directions 610*a*, 810*a* of the sixth aircraft seat device 600*a* and of the eighth aircraft seat device 800*a* are arranged in an angled manner with respect to the aircraft cabin center axis 16*a*. In the aircraft cabin section 26*a*, the at least three aircraft seat devices of the plurality of aircraft seat devices 100*a*, 200*a*, 300*a*, 400*a*, 500*a*, 600*a*, 700*a*, 800*a*, namely at least the sixth aircraft seat device 600*a*, the seventh aircraft seat device 700*a* and the eighth aircraft seat device 800*a*, are arranged directly one behind another in the second inner seat column 40*a*, wherein the sitting direction 710*a* of the seventh aircraft seat device 700*a* is arranged at least substantially parallel to the aircraft cabin center axis 16*a*, and sitting directions 610*a*, 810*a* of the sixth aircraft seat device 600*a* and of the eighth aircraft seat device 800*a* are arranged in an angled manner with respect to the aircraft cabin center axis 16*a*.

In the aircraft cabin section 26*a*, at least three aircraft seat devices of the plurality of aircraft seat devices 100*a*, 200*a*, 300*a*, 400*a*, 500*a*, 600*a*, 700*a*, 800*a*, namely at least one of the further eighth aircraft seat devices 800'*a*, the fifth aircraft seat device 500*a* and the sixth aircraft seat device 600*a*, are arranged in the second inner seat column 40*a*, wherein the sitting direction 510*a* of the fifth aircraft seat device 500*a* is arranged at least substantially parallel to the aircraft cabin center axis 16*a*, and sitting directions of the sixth aircraft seat device 600*a* and of the further eighth aircraft seat device 800'*a* are arranged in an angled manner with respect to the aircraft cabin center axis 16*a*. In the aircraft cabin section 26*a*, the at least three aircraft seat devices of the plurality of aircraft seat devices 100*a*, 200*a*, 300*a*, 400*a*, 500*a*, 600*a*, 700*a*, 800*a*, namely at least one of the further eighth aircraft seat devices 800'*a*, the fifth aircraft seat device 500*a* and the sixth aircraft seat device 600*a*, are arranged directly one behind another in the second inner seat column 40*a*, wherein the sitting direction 510*a* of the fifth aircraft seat device 500*a* is arranged at least substantially parallel to the aircraft cabin center axis 16*a*, and sitting directions of the sixth aircraft seat device 600*a* and of the further eighth aircraft seat device 800'*a* are arranged in an angled manner with respect to the aircraft cabin center axis 16*a*.

In the aircraft cabin section 26*a*, at least three aircraft seat devices of the plurality of aircraft seat devices 100*a*, 200*a*, 300*a*, 400*a*, 500*a*, 600*a*, 700*a*, 800*a*, namely at least the fifth aircraft seat device 500*a*, one of the further eighth aircraft seat devices 800'*a* and one of the further seventh aircraft seat devices 700'*a*, are arranged in the second inner seat column 40*a*, wherein sitting directions of the fifth aircraft seat device 500*a* and of the further seventh aircraft seat device 700'*a* are arranged at least substantially parallel to the aircraft cabin center axis 16*a*, and a sitting direction of the further eighth aircraft seat device 800'*a* is arranged in an angled manner with respect to the aircraft cabin center axis 16*a*. In the aircraft cabin section 26*a*, the at least three aircraft seat devices of the plurality of aircraft seat devices 100*a*, 200*a*, 300*a*, 400*a*, 500*a*, 600*a*, 700*a*, 800*a*, namely at least the fifth aircraft seat device 500*a*, one of the further eighth aircraft seat devices 800'*a* and one of the further seventh aircraft seat devices 700'*a*, are arranged directly one behind another in the second inner seat column 40*a*, wherein sitting directions of the fifth aircraft seat device 500*a* and of the further seventh aircraft seat device 700'*a* are arranged at least substantially parallel to the aircraft cabin center axis 16*a*, and a sitting direction of the further eighth aircraft seat device 800'*a* is arranged in an angled manner with respect to the aircraft cabin center axis 16*a*.

In the aircraft cabin section 26*a*, four aircraft seat devices 500*a*, 600*a*, 700*a*, 800*a*, which are designed to be different from one another and are arranged directly one behind another, of the plurality of aircraft seat devices 100*a*, 200*a*, 300*a*, 400*a*, 500*a*, 600*a*, 700*a*, 800*a* are arranged in the second inner seat column 40*a*. The four aircraft seat devices 500*a*, 600*a*, 700*a*, 800*a*, which are designed to be different from one another and are arranged in the second inner seat column 40*a*, of the plurality of aircraft seat devices 100*a*, 200*a*, 300*a*, 400*a*, 500*a*, 600*a*, 700*a*, 800*a* are arranged directly consecutively in the flight direction 24*a*.

In the aircraft cabin section 26*a*, the fifth aircraft seat device 500*a*, the sixth aircraft seat device 600*a* and the seventh aircraft seat device 700*a* are arranged directly one behind another in the second inner seat column 40*a*. In the aircraft cabin section 26*a*, the sixth aircraft seat device 600*a*, the seventh aircraft seat device 700*a* and the eighth aircraft seat device 800*a* are arranged directly one behind another in the second inner seat column 40*a*. In the second inner seat column 40*a* in the aircraft cabin section 26*a*, the fifth aircraft seat device 500*a* is arranged directly behind the sixth aircraft seat device 600*a*, as viewed in the flight direction 24*a*. In the second inner seat column 40*a* in the aircraft cabin section 26*a*, the sixth aircraft seat device 600*a* is arranged directly behind the seventh aircraft seat device 700*a*, as viewed in the flight direction 24*a*. In the second inner seat column 40*a* in the aircraft cabin section 26*a*, the seventh aircraft seat device 700*a* is arranged directly behind the eighth aircraft seat device 800*a*, as viewed in the flight direction 24*a*. In principle, the eighth aircraft seat device 800*a* can be arranged directly behind the fifth aircraft seat device 500*a*, as viewed in the flight direction 24*a*, in the second inner seat column 40*a* in the aircraft cabin section 26*a*.

In the aircraft cabin section 26*a*, four aircraft seat devices which are designed to be different from one another, namely the fifth aircraft seat device 500*a*, the sixth aircraft seat device 600*a*, the seventh aircraft seat device 700*a* and the eighth aircraft seat device 800*a*, of the plurality of aircraft seat devices 100*a*, 100'*a*, 200*a*, 200'*a*, 300*a*, 300'*a*, 400*a*, 400'*a*, 500*a*, 500'*a*, 600*a*, 600'*a*, 700*a*, 700'*a*, 800*a*, 800'*a* are arranged directly one behind another in the second inner seat column 40*a*, wherein sitting directions 510*a*, 710*a* of two aircraft seat devices of the four aircraft seat devices 500*a*, 600*a*, 700*a*, 800*a*, namely of the fifth aircraft seat device 500*a* and of the seventh aircraft seat device 700*a*, are arranged at least substantially parallel to the aircraft cabin center axis 16*a*, wherein the fifth aircraft seat 520*a* of the fifth aircraft seat device 500*a* is arranged on the aisle side, and the seventh aircraft seat 720a of the seventh aircraft seat device 700a is arranged facing away from the aisle, and sitting directions 610a, 810a of two further aircraft seat devices of the four aircraft seat devices 500a, 600a, 700a, 800a, namely of the sixth aircraft seat device 600a and of the eighth aircraft seat device 800a, are arranged in an angled manner with respect to the aircraft cabin center axis 16a, wherein the sixth aircraft seat 620a of the sixth aircraft seat device 600a is arranged on the aisle side, and the eighth aircraft seat 820a of the eighth aircraft seat device 800a is arranged facing away from the aisle.

In the aircraft cabin section 26a, four aircraft seat devices 500'a, 600'a, 700'a, 800'a, which are designed to be different from one another and are arranged directly one behind another, of the plurality of further aircraft seat devices 100'a, 200'a, 300'a, 400'a, 500'a, 600'a, 700'a, 800'a are arranged in the first outer seat column 36a. The four aircraft seat devices 500'a, 600'a, 700'a, 800'a, which are designed to be different from one another and are arranged in the first outer seat column 36a, of the plurality of further aircraft seat devices 100'a, 200'a, 300'a, 400'a, 500'a, 600'a, 700'a, 800'a are arranged directly consecutively in the flight direction 24a.

In the aircraft cabin section 26a, four aircraft seat devices 100'a, 200'a, 300'a, 400'a, which are designed to be different from one another and are arranged directly one behind another, of the plurality of further aircraft seat devices 100'a, 200'a, 300'a, 400'a, 500'a, 600'a, 700'a, 800'a are arranged in the second outer seat column 42a. The four aircraft seat devices 100'a, 200'a, 300'a, 400'a, which are designed to be different from one another and are arranged in the second outer seat column 42a, of the plurality of aircraft seat devices 100'a, 200'a, 300'a, 400'a, 500'a, 600'a, 700'a, 800'a are arranged directly consecutively in the flight direction 24a.

In principle, the previous descriptions of the first inner seat column 38a are also applicable to the second outer seat column 42a. In principle, the previous descriptions of the second inner seat column 40a are also applicable to the first outer seat column 36a.

In the aircraft cabin section 26a, two aircraft seat devices of the plurality of aircraft seat devices 100a, 200a, 300a, 400a, 500a, 600a, 700a, 800a, namely the third aircraft seat device 300a and the seventh aircraft seat device 700a, form a pair of seats 46a in two seat columns arranged directly next to each other, namely the first inner seat column 38a and the second inner seat column 40a, wherein sitting directions 310a, 710a of the two aircraft seat devices 300a, 700a are arranged at least substantially parallel to the aircraft cabin center axis 16a, and the aircraft seats 320a, 720a of the two aircraft seat devices 300a, 700a are arranged facing away from the aisle, wherein at least two of the pairs of seats 46a are arranged in the two seat columns 38a, 40a which are arranged directly adjacent to each other (FIG. 4). As a result, regions for passengers traveling in pairs can advantageously be created in the aircraft cabin section 26a. The two aircraft seat devices arranged directly next to each other, namely the third aircraft seat device 300a and the seventh aircraft seat device 700a, are formed in mirror image with respect to each other via the aircraft cabin center axis 16a. The two aircraft seat devices 300a, 700a of the plurality of aircraft seat devices 100a, 200a, 300a, 400a, 500a, 600a, 700a, 800a that form the pair of seats 46a are arranged flush with respect to each other in the flight direction 24a, as viewed in a plane parallel to the aircraft cabin floor 22a. The two aircraft seat devices 300a, 700a of the plurality of aircraft seat devices 100a, 200a, 300a, 400a, 500a, 600a, 700a, 800a that form the pair of seats 46a are arranged in the central region 44a of the aircraft cabin 12a. In principle, it is conceivable for the third aircraft seat device 300a and the seventh aircraft seat device 700a that form the pair of seats 46a to have a common mattress, in particular in the lying position of the third aircraft seat 320a and of the seventh aircraft seat 720a.

In the first inner seat column 38a, the second aircraft seat 220a has a second axis 48a which is oriented parallel to the aircraft cabin floor 22a, and which intersects a seat bottom of the second aircraft seat 220a of the second aircraft seat device 200a and which is oriented parallel to the sitting direction 210a of the second aircraft seat device 200a, wherein the second axis 48a intersects a seat bottom of a further eighth aircraft seat of one of the further eighth aircraft seat devices 800'a in the second inner seat column 40a, wherein the further eighth aircraft seat has a further eighth axis 50a which is oriented parallel to a sitting direction of said further eighth aircraft seat device 800'a and parallel to the second axis 48a (FIG. 4).

The aircraft seat arrangement 14a has a first seat grouping 52a of four aircraft seat devices arranged directly one behind another in the first inner seat column 38a in the aircraft cabin section 26a, namely the first aircraft seat device 100a, the second aircraft seat device 200a, the third aircraft seat device 300a and the fourth aircraft seat device 400a, which each have different sitting directions 110a, 210a, 310a, 410a and the aircraft seats 120a, 220a, 320a, 420a of which are arranged on the aisle side or facing away from the aisle (FIGS. 3 and 4). The sitting directions 110a, 210a, 310a, 410a of the aircraft seat devices 100a, 200a, 300a, 400a which are arranged directly one behind another are arranged within the first seat grouping 52a in an alternating manner at least substantially parallel to and in an angled manner with respect to the aircraft cabin center axis 16a. The first seat grouping 52a forms a periodically repetitive sequence. A plurality of identical first seat groupings 52a can be arranged directly one behind another here along an aircraft longitudinal axis.

As viewed in the flight direction 24a, in front of and behind the first aircraft seat device 100a, the sitting direction 110a of which is arranged at least substantially parallel to the aircraft cabin center axis 16a, there is in each case arranged an aircraft seat device, the sitting direction of which is arranged in an angled manner with respect to the aircraft cabin center axis 16a. As viewed in the flight direction 24a, in front of and behind the second aircraft seat device 200a, the sitting direction 210a of which is arranged in an angled manner with respect to the aircraft cabin center axis 16a, there is in each case arranged an aircraft seat device, the sitting direction of which is arranged at least substantially parallel to the aircraft cabin center axis 16a. As viewed in the flight direction 24a, in front of and behind the third aircraft seat device 300a, the sitting direction 310a of which is arranged at least substantially parallel to the aircraft cabin center axis 16a, there is in each case arranged an aircraft seat device, the sitting direction of which is arranged in an angled manner with respect to the aircraft cabin center axis 16a. As viewed in the flight direction 24a, behind the fourth aircraft seat device 400a, the sitting direction 410a of which is arranged in an angled manner with respect to the aircraft cabin center axis 16a, there is in each case arranged an aircraft seat device, the sitting direction of which is arranged at least substantially parallel to the aircraft cabin center axis 16a. In principle, as viewed in the flight direction 24a, in front of and behind the fourth aircraft seat device 400a, the sitting direction 410a of which is arranged in an angled manner with respect to the aircraft cabin center axis 16a, there can in each case be arranged an aircraft seat device, the sitting direction of which is arranged at least substantially parallel to the aircraft cabin center axis 16a.

The aircraft seat arrangement 14a has a second seat grouping 54a of four aircraft seat devices arranged directly one behind another in the second inner seat column 40a in the aircraft cabin section 26a, namely the fifth aircraft seat device 500a, the sixth aircraft seat device 600a, the seventh aircraft seat device 700a and the eighth aircraft seat device 800a, which each have different sitting directions 510a, 610a, 710a, 810a and the aircraft seats 520a, 620a, 720a, 820a of which are arranged on the aisle side or facing away from the aisle (FIG. 4). The sitting directions 510a, 610a, 710a, 810a of the aircraft seat devices 500a, 600a, 700a, 800a, arranged directly one behind another, are arranged within the second seat grouping 54a in an alternating manner at least substantially parallel to and in an angled manner with respect to the aircraft cabin center axis 16a. The second seat grouping 54a forms a periodically repeatable sequence. A plurality of identical second seat groupings 54a can be arranged here directly one behind another along the aircraft cabin center axis 16a.

As viewed in the flight direction 24a, in front of and behind the fifth aircraft seat device 500a, the sitting direction 510a of which is arranged at least substantially parallel to the aircraft cabin center axis 16a, there is in each case arranged an aircraft seat device, the sitting direction of which is arranged in an angled manner with respect to the aircraft cabin center axis 16a. As viewed in the flight direction 24a, in front of and behind the sixth aircraft seat device 600a, the sitting direction 610a of which is arranged in an angled manner with respect to the aircraft cabin center axis 16a, there is in each case arranged an aircraft seat device, the sitting direction of which is arranged at least substantially parallel to the aircraft cabin center axis 16a. As viewed in the flight direction 24a, in front of and behind the seventh aircraft seat device 700a, the sitting direction 710a of which is arranged at least substantially parallel to the aircraft cabin center axis 16a, there is in each case arranged an aircraft seat device, the sitting direction of which is arranged in an angled manner with respect to the aircraft cabin center axis 16a. As viewed in the flight direction 24a, behind the eighth aircraft seat device 800a, the sitting direction 810a of which is arranged in an angled manner with respect to the aircraft cabin center axis 16a, there is in each case arranged an aircraft seat device, the sitting direction of which is arranged at least substantially parallel to the aircraft cabin center axis 16a. In principle, as viewed in the flight direction 24a, in front of and behind the eighth aircraft seat device 800a, the sitting direction 810a of which is arranged in an angled manner with respect to the aircraft cabin center axis 16a, there can in each case be arranged an aircraft seat device, the sitting direction of which is arranged at least substantially parallel to the aircraft cabin center axis 16a.

The first aircraft seat device 100a, the second aircraft seat device 200a, the third aircraft seat device 300a and the fourth aircraft seat device 400a in the aircraft cabin section 26a differ in at least one comfort category, wherein the aircraft seat devices 100a, 200a, 300a, 400a have, for the at least one comfort category, in each case a mutually different value which is caused by a different arrangement of the aircraft seats 120a, 220a, 320a, 420a and by the at least partially different design of the aircraft seat devices 100a, 200a, 300a, 400a. The fifth aircraft seat device 500a, the sixth aircraft seat device 600a, the seventh aircraft seat device 700a and the eighth aircraft seat device 800a in the aircraft cabin section 26a differ in at least one comfort category, wherein the aircraft seat devices 500a, 600a, 700a, 800a for the at least one comfort category each have a mutually different value which is caused by a different arrangement of the aircraft seats 520a, 620a, 720a, 820a and by the at least partially different design of the aircraft seat devices 500a, 600a, 700a, 800a.

In principle, at least two aircraft seat devices of the first aircraft seat device 100a, of the second aircraft seat device 200a, of the third aircraft seat device 300a, of the fourth aircraft seat device 400a, of the fifth aircraft seat device 500a, of the sixth aircraft seat device 600a, of the seventh aircraft seat device 700a and of the eighth aircraft seat device 800a, but in particular not all of the aircraft seat devices, in the aircraft cabin section 26a have to differ in at least one comfort category. In principle, the aircraft seat devices 100a, 200a, 300a, 400a, 500a, 600a, 700a, 800a do not have to differ from one another in all of the values, in particular for a plurality of comfort categories.

The at least one comfort category describes a living space.

In the present case, a first comfort category is in the form of a maximum bed length of an aircraft seat in the lying position. The greater a value is for the maximum bed length, the higher is the comfort for a passenger. The value for the maximum bed length is in the form of one length. The second aircraft seat device 200a has, for a maximum bed length of the second aircraft seat 220a, a value which is greater than a value of the first aircraft seat device 100a for a maximum bed length of the first aircraft seat 120a. In the present case, the value of the second aircraft seat device 200a for the maximum bed length of the second aircraft seat 220a is 5% larger than the value of the first aircraft seat device 100a for the maximum bed length of the first aircraft seat 120a. The first aircraft seat device 100a and the second aircraft seat device 200a differ in their maximum bed lengths. The fourth aircraft seat device 400a has, for a maximum bed length of the fourth aircraft seat 420a, a value which is greater than a value of the third aircraft seat device 300a for a maximum bed length of the third aircraft seat 320a. In the present case, the value of the fourth aircraft seat device 400a for the maximum bed length of the fourth aircraft seat 420a is 5% greater than the value of the third aircraft seat device 300a for the maximum bed length of the third aircraft seat 320a. The third aircraft seat device 300a and the fourth aircraft seat device 400a differ in their maximum bed lengths.

In the present case, a second comfort category is in the form of a minimum passage width in at least one region of an aircraft seat region. The passage width is in the form of a minimum width of the direct access in a region between the first aircraft cabin aisle 32a or the second aircraft cabin aisle 34a and a region which, as viewed in the sitting direction of the corresponding aircraft seat device, is arranged directly behind a seat bottom of an aircraft seat of said aircraft seat device. The greater a value is for the minimum passage width, the higher is the comfort for a passenger. The value for the minimum passage width in at least one region of an aircraft seat region is in the form of one length. The first aircraft seat device 100a has, for a minimum passage width in at least one region of an aircraft seat region of the first aircraft seat device 100a, a value which is greater than a value for a minimum passage width in at least one region of an aircraft seat region of the second aircraft seat device 200a. The third aircraft seat device 300a has, for a minimum passage width in at least one region of an aircraft seat region of the third aircraft seat device 300a, a value which is greater than the value for the minimum passage width in the at least one region of the aircraft seat region of the first aircraft seat device 100*a*. The fourth aircraft seat device 400*a* has, for a minimum passage width in at least one region of an aircraft seat region of the fourth aircraft seat device 400*a*, a value which is greater than the value for the minimum passage width in the at least one region of the aircraft seat region of the third aircraft seat device 300*a*.

In principle, at least one further comfort category can be in the form of a basic area of an aircraft seat device, in the form of a depositing surface of an aircraft seat device, in particular a console, in the form of a table surface of an aircraft seat device, in the form of, in particular minimum or maximum, arm freedom for a passenger, in particular a limiting maximum angle of movement starting from the sitting direction in the sitting position, in the form of an, in particular maximum, supporting surface of an aircraft seat for a passenger, in particular in the sitting position or in the lying position, in the form of an, in particular maximum, bed width of the aircraft seat in the lying position, and/or in the form of an, in particular maximum, foot space volume.

In principle, the at least one comfort category can also describe a quality, a noise and/or an illumination. The quality can describe in particular a seat upholstery, for example a foam core or a spring core, or a contact material, for example fabric or leather. The noise can describe in particular shielding of the aircraft seat from ambient noises from the aircraft cabin. The illumination can describe in particular a number of illuminating means and a property of the illuminating means.

In the first inner seat column 38*a*, one of the further second aircraft seat devices 200'*a* is arranged in a first seat row of the aircraft cabin section 26*a*, as viewed counter to the flight direction 24*a* (FIG. 4). As viewed in the flight direction 24*a*, one of the plurality of aircraft cabin modules 30*a* is arranged in the central region 44*a* directly behind the further second aircraft seat device 200'*a* arranged in the first seat row of the aircraft cabin section 26*a*. As a result, a higher degree of comfort can be achieved in the first seat row compared with the second aircraft seat device 200*a* since more space is available in the first seat row. The further second aircraft seat device 200'*a* arranged in the first seat row in the aircraft cabin section 26*a* can in principle differ in at least one comfort category from at least one aircraft seat device of the plurality of aircraft seat devices 100*a*, 200*a*, 300*a*, 400*a*, 500*a*, 600*a*, 700*a*, 800*a*. In the present case, the aircraft cabin module 30*a* arranged in the central region 44*a* can be designed as a front row monument. In principle, the aircraft cabin module 30*a* can also be part of the further second aircraft seat device 200'*a*.

In the second inner seat column 40*a*, one of the further sixth aircraft seat devices 600'*a* is arranged in the first seat row of the aircraft cabin section 26*a*, as viewed counter to the flight direction 24*a* (FIG. 4). As viewed in the flight direction 24*a*, the previously mentioned aircraft cabin module 30*a* is arranged in the central region 44*a* directly behind the further sixth aircraft seat device 600'*a* arranged in the first seat row of the aircraft cabin section 26*a*. The further sixth aircraft seat device 600'*a* arranged in the first seat row in the aircraft cabin section 26*a* can in principle differ in at least one comfort category from at least one aircraft seat device of the plurality of aircraft seat devices 100*a*, 200*a*, 300*a*, 400*a*, 500*a*, 600*a*, 700*a*, 800*a*. In principle, the aircraft cabin module 30*a* can also be part of the further sixth aircraft seat device 600'*a*.

In the first outer seat column 36*a*, one of the further fifth aircraft seat devices 500'*a* is arranged in the first seat row of the aircraft cabin section 26*a*, as viewed counter to the flight direction 24*a* (FIG. 4). As viewed in the flight direction 24*a*, a further of the aircraft cabin modules 30*a* is arranged directly behind the further fifth aircraft seat device 500'*a*, arranged in the first seat row of the aircraft cabin section 26*a*, in the first outer seat column 36*a*. The further fifth aircraft seat device 500'*a* arranged in the first seat row in the first seat column 36*a* in the aircraft cabin section 26*a* can in principle differ in at least one comfort category from at least one aircraft seat device of the plurality of aircraft seat devices 100*a*, 200*a*, 300*a*, 400*a*, 500*a*, 600*a*, 700*a*, 800*a*. In principle, the further aircraft cabin module 30*a* can also be part of the further sixth aircraft seat device 600'*a*.

In the second outer seat column 42*a*, one of the further first aircraft seat devices 100'*a* is arranged in the first seat row of the aircraft cabin section 26*a*, as viewed counter to the flight direction 24*a* (FIG. 4). As viewed in the flight direction 24*a*, another of the aircraft cabin modules 30*a* is arranged directly behind the further first aircraft seat device 100'*a*, arranged in the first seat row of the aircraft cabin section 26*a*, in the second outer seat column 42*a*. The further first aircraft seat device 100'*a* arranged in the first seat row in the second outer seat column 42*a* in the aircraft cabin section 26*a* can in principle differ in at least one comfort category from at least one aircraft seat device of the plurality of aircraft seat devices 100*a*, 200*a*, 300*a*, 400*a*, 500*a*, 600*a*, 700*a*, 800*a*. In principle, the other aircraft cabin module 30*a* can also be part of the further first aircraft seat device 100'*a*.

In principle, the aircraft seat arrangement 14*a* which is illustrated in FIGS. 2 and 3 is not restricted to the number of aircraft seat devices shown. The aircraft seat arrangement 14*a* can have fewer or more than the aircraft seat devices 100*a*, 100'*a*, 200*a*, 200'*a*, 300*a*, 300'*a*, 400*a*, 400'*a*, 500*a*, 500'*a*, 600*a*, 600'*a*, 700*a*, 700'*a*, 800*a*, 800'*a* illustrated. In principle, it would also be conceivable for the aircraft seat arrangement 14*a* shown in FIGS. 2 to 4 overall or partially, in particular at least one of the seat columns 36*a*, 38*a*, 40*a*, 42*a*, to be arranged in the aircraft cabin 12*a* in mirror form about an axis, wherein the axis is oriented perpendicularly to the aircraft cabin center axis 16*a* and parallel to the aircraft cabin floor 22*a*.

FIGS. 5 to 10 show six further exemplary embodiments of the invention. The following descriptions and the drawings are restricted substantially to the differences between the exemplary embodiments, wherein, with regard to components with identical designation, in particular with regard to components with the same reference signs, reference may basically also be made to the drawings and/or to the description of the other exemplary embodiments, in particular of FIGS. 1 to 4. To distinguish between the exemplary embodiments, the alphabetic character a has been added as a suffix to the reference signs of the exemplary embodiment in FIGS. 1 to 4. In the exemplary embodiments of FIGS. 5 to 10, the alphabetic character a has been replaced by the alphabetic characters b to g.

FIG. 5 shows an aircraft seat arrangement 14*b* in a second exemplary embodiment. The aircraft seat arrangement 14*b* is configured for use in an aircraft cabin 12*b*, partially illustrated, of an aircraft. The aircraft cabin 12*b* has an aircraft cabin center axis 16*b*. The aircraft cabin center axis 16*b* is in the form of an aircraft longitudinal axis. The aircraft cabin 12*b* has two opposite aircraft cabin outer walls 18*b*, 20*b*. The aircraft cabin center axis 16*b* is oriented parallel to an aircraft cabin floor 22*b* of the aircraft cabin 12*b*. In at least one operating state, the aircraft has a flight direction 24*b*. In the present case, the flight direction 24*b* is oriented in idealized form parallel to the aircraft cabin center axis 16b. The aircraft cabin 12b has an aircraft cabin section 26b along the aircraft cabin center axis 16b. In the present case, the aircraft cabin section 26b is delimited by a plurality of aircraft cabin modules 30b, illustrated schematically, along the aircraft cabin center axis 16b. The aircraft cabin 12b has a first aircraft cabin aisle 32b and a second aircraft cabin aisle 34b in the aircraft cabin section 26b. The aircraft seat arrangement 14b comprises a first outer seat column 36b. The aircraft seat arrangement 14b comprises a first inner seat column 38b. The aircraft seat arrangement 14b comprises a second inner seat column 40b. The aircraft seat arrangement 14b comprises a second outer seat column 42b. In the present case, the first inner seat column 38b is formed symmetrically with respect to the second inner seat column 40b via the aircraft cabin center axis 16b. In the present case, the first outer seat column 36b is formed symmetrically with respect to the second outer seat column 42b via the aircraft cabin center axis 16b. The first inner seat column 38b and the second inner seat column 40b are arranged directly next to each other. The aircraft cabin 12b has a central region 44b.

The aircraft seat arrangement 14b comprises a plurality of aircraft seat devices 100b, 200b, 300b, 500b, 600b, 700b arranged in the aircraft cabin section 26b. The plurality of aircraft seat devices 100b, 200b, 300b, 500b, 600b, 700b are designed to be different from one another. The aircraft seat devices 100b, 200b, 300b, 500b, 600b, 700b each have an aircraft seat. The aircraft seat devices 100b, 200b, 300b, 500b, 600b, 700b each have a console. The aircraft seat arrangement 14b comprises a first aircraft seat device 100b of the plurality of aircraft seat devices 100b, 200b, 300b, 500b, 600b, 700b. The first aircraft seat device 100b has a sitting direction 110b. The sitting direction 110b of the first aircraft seat device 100b corresponds to the flight direction 24b. The first aircraft seat device 100b has a first aircraft seat 120b. The first aircraft seat device 100b has a first console 130b. The first aircraft seat device 100b has direct access to the first aircraft cabin aisle 32b. The aircraft seat arrangement 14b comprises a second aircraft seat device 200b of the plurality of aircraft seat devices 100b, 200b, 300b, 500b, 600b, 700b. The second aircraft seat device 200b has a sitting direction 210b. The sitting direction 210b of the second aircraft seat device 200b differs from the flight direction 24b. The second aircraft seat device 200b has a second aircraft seat 220b. The second aircraft seat device 200b has a second console 230b. The second aircraft seat device 200b has direct access to the first aircraft cabin aisle 32b. The aircraft seat arrangement 14b comprises a third aircraft seat device 300b of the plurality of aircraft seat devices 100b, 200b, 300b, 500b, 600b, 700b. The third aircraft seat device 300b has a sitting direction 310b. The sitting direction 310b of the third aircraft seat device 300b corresponds to the flight direction 24b. The third aircraft seat device 300b has a third aircraft seat 320b. The third aircraft seat device 300b has a third console 330b. The third aircraft seat device 300b has direct access to the first aircraft cabin aisle 32b. The first aircraft seat device 100b, the second aircraft seat device 200b and the third aircraft seat device 300b are designed to be different from one another. The aircraft seat arrangement 14b comprises a fifth aircraft seat device 500b of the plurality of aircraft seat devices 100b, 200b, 300b, 500b, 600b, 700b. The fifth aircraft seat device 500b is formed in mirror image with respect to the first aircraft seat device 100b via an aircraft longitudinal axis, in particular via the aircraft cabin center axis 16b. The fifth aircraft seat device 500b has a sitting direction 510b. The sitting direction 510b of the fifth aircraft seat device 500b corresponds to the flight direction 24b.

The fifth aircraft seat device 500b has a fifth aircraft seat 520b. The fifth aircraft seat device 500b has a fifth console 530b. The fifth aircraft seat device 500b has direct access to the second aircraft cabin aisle 34b. The aircraft seat arrangement 14b comprises a sixth aircraft seat device 600b of the plurality of aircraft seat devices 100b, 200b, 300b, 400b, 500b, 600b, 700b, 800b. The sixth aircraft seat device 600b is formed in mirror image with respect to the second aircraft seat device 200b via an aircraft longitudinal axis, in particular via the aircraft cabin center axis 16b. The sixth aircraft seat device 600b has a sitting direction 610b. The sitting direction 610b of the sixth aircraft seat device 600b differs from the flight direction 24b. The sixth aircraft seat device 600b has a sixth aircraft seat 620b. The sixth aircraft seat device 600b has a sixth console 630b. The sixth aircraft seat device 600b has direct access to the second aircraft cabin aisle 34b. The aircraft seat arrangement 14b comprises a seventh aircraft seat device 700b of the plurality of aircraft seat devices 100b, 200b, 300b, 500b, 600b, 700b. The seventh aircraft seat device 700b is formed in mirror image with respect to the third aircraft seat device 300b via an aircraft longitudinal axis, in particular via the aircraft cabin center axis 16b. The seventh aircraft seat device 700b has a sitting direction 710b. The sitting direction 710b of the seventh aircraft seat device 700b corresponds to the flight direction 24b. The seventh aircraft seat device 700b has a seventh aircraft seat 720b. The seventh aircraft seat device 700b has a seventh console 730b. The seventh aircraft seat device 700b has direct access to the second aircraft cabin aisle 34b. The fifth aircraft seat device 500b, the sixth aircraft seat device 600b and the seventh aircraft seat device 700b are designed to be different from one another. The aircraft seats 120b, 220b, 320b, 520b, 620b, 720b are each designed as a full-flat seat. The aircraft seats 120b, 220b, 320b, 520b, 620b, 720b are each adjustable between a sitting position and a lying position. In the present case, the aircraft seat arrangement 14b comprises six differently designed aircraft seat devices 100b, 200b, 300b, 500b, 600b, 700b which are in each case present at least once in the aircraft seat arrangement 14b. The first aircraft seat device 100b, the second aircraft seat device 200b, the third aircraft seat device 300b, the fifth aircraft seat device 500b, the sixth aircraft seat device 600b and the seventh aircraft seat device 700b are designed to be different from one another. In the present case, six aircraft seat devices 100b, 200b, 300b, 500b, 600b, 700b designed to be different from one another are arranged in the aircraft cabin section 26b. The aircraft seat devices 100b, 200b, 300b, 500b, 600b, 700b each form an aircraft seat region. The aircraft seat devices 100b, 200b, 300b, 500b, 600b, 700b have differently shaped and/or differently arranged components in the corresponding aircraft seat regions.

In particular, an arrangement and an orientation of the aircraft seats 120b, 220b, 320b in the respective aircraft seat regions differ for the first aircraft seat device 100b, the second aircraft seat device 200b and the third aircraft seat device 300b. Furthermore, in particular an arrangement and an orientation of the aircraft seats 520b, 620b, 720b in the respective aircraft seat regions differ for the fifth aircraft seat device 500b, the sixth aircraft seat device 600b and the seventh aircraft seat device 700b. The first aircraft seat device 100b and the fifth aircraft seat device 500b are arranged directly next to each other. The second aircraft seat device 200b and the sixth aircraft seat device 600b are arranged directly next to each other. The third aircraft seat device 300b and the seventh aircraft seat device 700b are arranged directly next to each other.

In the present case, the aircraft seat arrangement 14b comprises a plurality of further first aircraft seat devices 100'b which are formed at least substantially identically to the first aircraft seat device 100b. The further first aircraft seat devices 100'b are each arranged in the first inner seat column 38b or in the second outer seat column 42b. In the present case, the aircraft seat arrangement 14b comprises a plurality of further second aircraft seat devices 200'b which are formed at least substantially identically to the second aircraft seat device 200b. The further second aircraft seat devices 200'b are each arranged in the first inner seat column 38b or in the second outer seat column 42b. In the present case, the aircraft seat arrangement 14b comprises a plurality of further third aircraft seat devices 300'b which are formed at least substantially identically to the third aircraft seat device 300b. The further third aircraft seat devices 300'b are each arranged in the first inner seat column 38b or in the second outer seat column 42b. In the present case, the aircraft seat arrangement 14b comprises a plurality of further fifth aircraft seat devices 500'b which are formed at least substantially identically to the fifth aircraft seat device 500b. The further fifth aircraft seat devices 500'b are each arranged in the second inner seat column 40b or in the first outer seat column 36b. In the present case, the aircraft seat arrangement 14b comprises a plurality of further sixth aircraft seat devices 600'b which are formed at least substantially identically to the sixth aircraft seat device 600b. The further sixth aircraft seat devices 600'b are each arranged in the second inner seat column 40b or in the first outer seat column 36b. In the present case, the aircraft seat arrangement 14b comprises a plurality of further seventh aircraft seat devices 700'b which are formed at least substantially identically to the seventh aircraft seat device 700b. The further seventh aircraft seat devices 700'b are each arranged in the second inner seat column 40b or in the first outer seat column 36b. For clarity reasons, only a selection of further aircraft seat devices 100'a, 200'a, 300'a, 500'a, 600'a, 700'a are provided with a reference sign in FIG. 5.

In the aircraft cabin section 26b, the sitting direction 110b of the first aircraft seat device 100b of the plurality of aircraft seat devices 100b, 200b, 300b, 500b, 600b, 700b in the first inner seat column 38b is oriented at least substantially parallel to the aircraft cabin center axis 16b. The first aircraft seat 120b of the first aircraft seat device 100b of the aircraft seat devices 100b, 200b, 300b arranged in the first inner seat column 38b in the aircraft cabin section 26b is arranged on the aisle side. In the aircraft cabin section 26b, the sitting direction 210b of the second aircraft seat device 200b of the plurality of aircraft seat devices 100b, 200b, 300b in the first inner seat column 38b is arranged in an angled manner at an angle of at least 18 degrees with respect to the aircraft cabin center axis 16b. In the present case, in the first inner seat column 38b in the aircraft cabin section 26b, the sitting direction 210b of the second aircraft seat device 200b of the plurality of aircraft seat devices 100b, 200b, 300b, 500b, 600b, 700b is arranged in an angled manner at an angle of 30 degrees with respect to the aircraft cabin center axis 16b. In the aircraft cabin section 26b, the sitting direction 210b of the second aircraft seat device 200b of the plurality of aircraft seat devices 100b, 200b, 300b, 500b, 600b, 700b in the first inner seat column 38b is directed away from the directly adjacent first aircraft cabin aisle 32b. The second aircraft seat 220b of the second aircraft seat device 200b of the aircraft seat devices 100b, 200b, 300b arranged in the first inner seat column 38b in the aircraft cabin section 26b is arranged on the aisle side. In the aircraft cabin section 26b, the sitting direction 310b of the third aircraft seat device 300b of the plurality of aircraft seat devices 100b, 200b, 300b, 500b, 600b, 700b in the first inner seat column 38b is oriented at least substantially parallel to the aircraft cabin center axis 16b. The third aircraft seat 320b of the third aircraft seat device 300b of the aircraft seat devices 100b, 200b, 300b arranged in the first inner seat column 38b is arranged facing away from the aisle. The first aircraft seat device 100b and the third aircraft seat device 300b are spaced apart from each other by the second aircraft seat device 200b. In the aircraft cabin section 26b, the first aircraft seat device 100b and the second aircraft seat device 200b in the first inner seat column 38b each have an aircraft seat 120b, 220b which is arranged on the aisle side, and the third aircraft seat device 300b, which is arranged behind or in front of the two aircraft seat devices 100b, 200b, as viewed in the flight direction 24b, has the aircraft seat 320b, which is arranged facing away from the aisle. The aircraft seats 120b, 320b of the aircraft seat devices 100b, 300b, the sitting directions 110b, 310b of which are arranged at least substantially parallel to the aircraft cabin center axis 16b, are at different distances from the first aircraft cabin aisle 32b. In the aircraft cabin section 26b, three aircraft seat devices of the plurality of aircraft seat devices 100b, 200b, 300b, 500b, 600b, 700b, namely the first aircraft seat device 100b, the second aircraft seat device 200b and the third aircraft seat device 300b, are arranged in the first inner seat column 38b, wherein the sitting directions 110b, 310b of the first aircraft seat device 100b and of the third aircraft seat device 300b are arranged at least substantially parallel to the aircraft cabin center axis 16b, and the sitting direction 210b of the second aircraft seat device 200b is arranged in an angled manner with respect to the aircraft cabin center axis 16b. In the aircraft cabin section 26b, the three aircraft seat devices of the plurality of aircraft seat devices 100b, 200b, 300b, 500b, 600b, 700b, namely the first aircraft seat device 100b, the second aircraft seat device 200b and the third aircraft seat device 300b, are arranged directly one behind another in the first inner seat column 38b, wherein the sitting directions 110b, 310b of the first aircraft seat device 100b and of the third aircraft seat device 300b are arranged at least substantially parallel to the aircraft cabin center axis 16b, and the sitting direction 210b of the second aircraft seat device 200b is arranged in an angled manner with respect to the aircraft cabin center axis 16b. In the aircraft cabin section 26b, three aircraft seat devices of the plurality of aircraft seat devices 100b, 200b, 300b, 500b, 600b, 700b, namely at least one of the further third aircraft seat devices 300'b, the first aircraft seat device 100b and the second aircraft seat device 200b, are arranged in the first inner seat column 38b, wherein sitting directions of the first aircraft seat device 100b and of the further third aircraft seat device 300'b are arranged at least substantially parallel to the aircraft cabin center axis 16b, and the sitting direction 210b of the second aircraft seat device 200b is arranged in an angled manner with respect to the aircraft cabin center axis 16b. In the aircraft cabin section 26b, the three aircraft seat devices of the plurality of aircraft seat devices 100b, 200b, 300b, 500b, 600b, 700b, namely at least one of the further third aircraft seat devices 300'b, the first aircraft seat device 100b and the second aircraft seat device 200b, are arranged directly one behind another in the first inner seat column 38b, wherein sitting directions of the first aircraft seat device 100b and of the further third aircraft seat device 300'b are arranged at least substantially parallel to the aircraft cabin center axis 16b, and the sitting direction 210b of the second aircraft seat device 200b is arranged in an angled manner with respect to the aircraft cabin center axis 16b. In the aircraft cabin section 26b, three aircraft seat devices 100b, 200b, 300b, which are designed to be different from one another and are arranged directly one behind another, of the plurality of aircraft seat devices 100b, 200b, 300b, 500b, 600b, 700b are arranged in the first inner seat column 38b. The three aircraft seat devices 100b, 200b, 300b, which are designed to be different from one another and are arranged in the first inner seat column 38b, of the plurality of aircraft seat devices 100b, 200b, 300b, 500b, 600b, 700b are arranged directly consecutively in the flight direction 24b. In the aircraft cabin section 26b, the first aircraft seat device 100b, the second aircraft seat device 200b and the third aircraft seat device 300b are arranged directly one behind another in the first inner seat column 38b. In the first inner seat column 38b in the aircraft cabin section 26b, the first aircraft seat device 100b is arranged directly behind the second aircraft seat device 200b, as viewed in the flight direction 24b. In the first inner seat column 38b in the aircraft cabin section 26b, the second aircraft seat device 200b is arranged directly behind the third aircraft seat device 300b, as viewed in the flight direction 24b. In principle, the third aircraft seat device 300b in the first inner seat column 38b in the aircraft cabin section 26b can be arranged directly behind the first aircraft seat device 100b, as viewed in the flight direction 24b.

In the aircraft cabin section 26b, the sitting direction 510b of the fifth aircraft seat device 500b of the plurality of aircraft seat devices 100b, 200b, 300b, 500b, 600b, 700b in the second inner seat column 40b is oriented at least substantially parallel to the aircraft cabin center axis 16b. The fifth aircraft seat 520b of the fifth aircraft seat device 500b of the aircraft seat devices 500b, 600b, 700b arranged in the second inner seat column 40b in the aircraft cabin section 26b is arranged on the aisle side. In the aircraft cabin section 26b, the sitting direction 610b of the sixth aircraft seat device 600b of the plurality of aircraft seat devices 100b, 200b, 300b, 500b, 600b, 700b is arranged in the second inner seat column 40b in an angled manner at an angle of at least 18 degrees with respect to the aircraft cabin center axis 16b. In the present case, in the second inner seat column 40b in the aircraft cabin section 26b, the sitting direction 610b of the sixth aircraft seat device 600b of the plurality of aircraft seat devices 100b, 200b, 300b, 500b, 600b, 700b is arranged in an angled manner at an angle of 30 degrees with respect to the aircraft cabin center axis 16b. In the aircraft cabin section 26b, the sitting direction 610b of the sixth aircraft seat device 600b of the plurality of aircraft seat devices 100b, 200b, 300b, 500b, 600b, 700b in the second inner seat column 40b is directed away from the directly adjacent second aircraft cabin aisle 34b. The sixth aircraft seat 620b of the sixth aircraft seat device 600b of the aircraft seat devices 500b, 600b, 700b arranged in the second inner seat column 40b in the aircraft cabin section 26b is arranged on the aisle side. In the aircraft cabin section 26b, the sitting direction 710b of the seventh aircraft seat device 700b of the plurality of aircraft seat devices 100b, 200b, 300b, 500b, 600b, 700b in the second inner seat column 40b is oriented at least substantially parallel to the aircraft cabin center axis 16b. The seventh aircraft seat 720b of the seventh aircraft seat device 700b of the aircraft seat devices 500b, 600b, 700b arranged in the second inner seat column 40b is arranged facing away from the aisle. The fifth aircraft seat device 500b and the seventh aircraft seat device 700b are spaced apart from each other by the sixth aircraft seat device 600b. In the aircraft cabin section 26b, the fifth aircraft seat device 500b and the sixth aircraft seat device 600b in the second inner seat column 40b each have an aircraft seat 520b, 620b, which is arranged on the aisle side, and the seventh aircraft seat device 700b, which is arranged directly behind or in front of the two aircraft seat devices 500b, 600b, as viewed in the flight direction 24b, has the aircraft seat 720b, which is arranged facing away from the aisle. The aircraft seats 520b, 720b of the aircraft seat devices 500b, 700b, the sitting directions 510b, 710b of which are arranged at least substantially parallel to the aircraft cabin center axis 16b, are at different distances from the second aircraft cabin aisle 34b. In the aircraft cabin section 26b, three aircraft seat devices of the plurality of aircraft seat devices 100b, 200b, 300b, 500b, 600b, 700b, namely the fifth aircraft seat device 500b, the sixth aircraft seat device 600b and the seventh aircraft seat device 700b, are arranged in the second inner seat column 40b, wherein the sitting directions 510b, 710b of the fifth aircraft seat device 500b and of the seventh aircraft seat device 700b are arranged at least substantially parallel to the aircraft cabin center axis 16b, and the sitting direction 610b of the sixth aircraft seat device 600b is arranged in an angled manner with respect to the aircraft cabin center axis 16b. In the aircraft cabin section 26b, the three aircraft seat devices of the plurality of aircraft seat devices 100b, 200b, 300b, 500b, 600b, 700b, namely the fifth aircraft seat device 500b, the sixth aircraft seat device 600b and the seventh aircraft seat device 700b, are arranged directly one behind another in the second inner seat column 40b, wherein the sitting directions 510b, 710b of the fifth aircraft seat device 500b and of the seventh aircraft seat device 700b are arranged at least substantially parallel to the aircraft cabin center axis 16b, and the sitting direction 610b of the sixth aircraft seat device 600b is arranged in an angled manner with respect to the aircraft cabin center axis 16b. In the aircraft cabin section 26b, three aircraft seat devices of the plurality of aircraft seat devices 100b, 200b, 300b, 500b, 600b, 700b, namely one of the further seventh aircraft seat devices 700'b, the fifth aircraft seat device 500b and the sixth aircraft seat device 600b, are arranged in the second inner seat column 40b, wherein sitting directions of the fifth aircraft seat device 500b are arranged at least substantially parallel to the aircraft cabin center axis 16b, and the sitting direction 610b of the sixth aircraft seat device 600b is arranged in an angled manner with respect to the aircraft cabin center axis 16b. In the aircraft cabin section 26b, the three aircraft seat devices of the plurality of aircraft seat devices 100b, 200b, 300b, 500b, 600b, 700b, namely one of the further seventh aircraft seat devices 700'b, the fifth aircraft seat device 500b and the sixth aircraft seat device 600b, are arranged directly one behind another in the second inner seat column 40b, wherein the sitting directions of the fifth aircraft seat device 500b and of the further seventh aircraft seat device 700'b are arranged at least substantially parallel to the aircraft cabin center axis 16b, and the sitting direction of the sixth aircraft seat device 600b is arranged in an angled manner with respect to the aircraft cabin center axis 16b. In the aircraft cabin section 26b, three aircraft seat devices 500b, 600b, 700b, which are designed to be different from one another and are arranged directly one behind another, of the plurality of aircraft seat devices 100b, 200b, 300b, 500b, 600b, 700b are arranged in the second inner seat column 40b. The three aircraft seat devices 500b, 600b, 700b, which are designed to be different from one another and are arranged in the second inner seat column 40b, of the plurality of aircraft seat devices 100b, 200b, 300b, 500b, 600b, 700b are arranged directly consecutively in the flight direction 24b. In the aircraft cabin section 26b, the fifth aircraft seat device 500b, the sixth aircraft seat device 600b and the seventh aircraft seat device 700b are arranged directly one behind another in the second inner seat column 40*b*. In the second inner seat column 40*b* in the aircraft cabin section 26*b*, the fifth aircraft seat device 500*b* is arranged directly behind the sixth aircraft seat device 600*b*, as viewed in the flight direction 24*b*. In the second inner seat column 40*b* in the aircraft cabin section 26*b*, the sixth aircraft seat device 600*b* is arranged directly behind the seventh aircraft seat device 700*b*, as viewed in the flight direction 24*b*. In principle, the seventh aircraft seat device 700*b* in the second inner seat column 40*b* in the aircraft cabin section 26*b* can be arranged directly behind the fifth aircraft seat device 500*b*, as viewed in the flight direction 24*b*.

In the aircraft cabin section 26*b*, three aircraft seat devices 500'*b*, 600'*b*, 700'*b*, which are designed to be different from one another and are arranged directly one behind another, of the plurality of further aircraft seat devices 100'*b*, 200'*b*, 300'*b*, 500'*b*, 600'*b*, 700'*b* are arranged in the first outer seat column 36*b*. The three aircraft seat devices 500'*b*, 600'*b*, 700'*b*, which are designed to be different from one another and are arranged in the first outer seat column 36*b*, of the plurality of further aircraft seat devices 100'*b*, 200'*b*, 300'*b*, 500'*b*, 600'*b*, 700'*b* are arranged directly consecutively in the flight direction 24*b*. In the present case, a further third aircraft seat device 300'*b* is arranged in front of a further second aircraft seat device 200'*b* in the second outer seat column 42*b*, as viewed in the flight direction 24*b*, wherein three additional further second aircraft seat devices 200'*b* are arranged behind the further second aircraft seat device 200'*b* in the second outer seat column 42*b*, as viewed in the flight direction 24*b*.

In the aircraft cabin section 26*b*, three aircraft seat devices 100'*b*, 200'*b*, 300'*b*, which are designed to be different from one another and are arranged directly one behind another, of the plurality of further aircraft seat devices 100'*b*, 200'*b*, 300'*b*, 500'*b*, 600'*b*, 700'*b* are arranged in the second outer seat column 42*b*. The three aircraft seat devices 100'*b*, 200'*b*, 300'*b*, which are designed to be different from one another and are arranged in the second outer seat column 42*b*, of the plurality of aircraft seat devices 100'*b*, 200'*b*, 300'*b*, 500'*b*, 600'*b*, 700'*b* are arranged directly consecutively in the flight direction 24*b*. In the present case, a further seventh aircraft seat device 700'*b* is arranged in front of a further sixth aircraft seat device 600'*b* in the first outer seat column 36*b*, as viewed in the flight direction 24*b*, wherein three additional further sixth aircraft seat devices 600'*b* are arranged behind the further sixth aircraft seat device 600'*b* in the first outer seat column 36*b*, as viewed in the flight direction 24*b*.

In principle, the previous descriptions of the first inner seat column 38*b* are also applicable to the second outer seat column 42*b*. In principle, the previous descriptions of the second inner seat column 40*b* are also applicable to the first outer seat column 36*b*.

In the aircraft cabin section 26*b*, two aircraft seat devices of the plurality of aircraft seat devices 100*b*, 200*b*, 300*b*, 500*b*, 600*b*, 700*b*, namely the third aircraft seat device 300*b* and the seventh aircraft seat device 700*b*, form a pair of seats 46*b* in two seat columns arranged directly next to each other, namely the first inner seat column 38*b* and the second inner seat column 40*b*, wherein the sitting directions 310*b*, 710*b* of the two aircraft seat devices 300*b*, 700*b* are arranged at least substantially parallel to the aircraft cabin center axis 16*b*, and the aircraft seats 320*b*, 720*b* of the two aircraft seat devices 300*b*, 700*b* are arranged facing away from the aisle, wherein at least two of the pairs of seats 46*b* are arranged in the two seat columns 38*b*, 40*b* arranged directly next to each other.

The aircraft seat arrangement 14*b* has a first seat grouping 52*b* of three aircraft seat devices arranged directly one behind another in the first inner seat column 38*b* in the aircraft cabin section 26*b*, namely the first aircraft seat device 100*b*, the second aircraft seat device 200*b* and the third aircraft seat device 300*b*, which each have different sitting directions 110*b*, 210*b*, 310*b* and the aircraft seats 120*b*, 220*b*, 320*b* of which are arranged on the aisle side or facing away from the aisle. The sitting directions 110*b*, 210*b*, 310*b* of the aircraft seat devices 100*b*, 200*b*, 300*b* arranged directly one behind another are arranged within the first seat grouping 52*b* in an alternating manner at least substantially parallel to and in an angled manner with respect to the aircraft cabin center axis 16*b*. The first seat grouping 52*b* forms a periodically repeatable sequence. A plurality of identical first seat groupings 52*b* can be arranged directly one behind another along an aircraft longitudinal axis. Behind the first aircraft seat device 100*b*, as viewed in the flight direction 24*b*, the sitting direction 110*b* of which is arranged at least substantially parallel to the aircraft cabin center axis 16*b*, there is arranged an aircraft seat device, the sitting direction of which is arranged at least substantially parallel to the aircraft cabin center axis 16*b*. In front of the first aircraft seat device 100*b*, as viewed in the flight direction 24*b*, the sitting direction 110*b* of which is arranged at least substantially parallel to the aircraft cabin center axis 16*b*, there is arranged an aircraft seat device, the sitting direction of which is arranged in an angled manner with respect to the aircraft cabin center axis 16*a*. In front of and behind the second aircraft seat device 200*b*, as viewed in the flight direction 24*b*, the sitting direction 210*b* of which is arranged in an angled manner with respect to the aircraft cabin center axis 16*b*, there is in each case arranged an aircraft seat device, the sitting direction of which is arranged at least substantially parallel to the aircraft cabin center axis 16*b*. Behind the third aircraft seat device 300*b*, as viewed in the flight direction 24*b*, the sitting direction 310*b* of which is arranged at least substantially parallel to the aircraft cabin center axis 16*b*, there is arranged an aircraft seat device, the sitting direction of which is arranged in an angled manner with respect to the aircraft cabin center axis 16*b*. In front of the third aircraft seat device 300*b*, as viewed in the flight direction 24*b*, the sitting direction 310*b* of which is arranged at least substantially parallel to the aircraft cabin center axis 16*b*, there is arranged an aircraft seat device, the sitting direction of which is arranged at least substantially parallel to the aircraft cabin center axis 16*b*.

The aircraft seat arrangement 14*b* has a second seat grouping 54*b* of three aircraft seat devices arranged directly one behind another in the second inner seat column 40*b* in the aircraft cabin section 26*b*, namely the fifth aircraft seat device 500*b*, the sixth aircraft seat device 600*b* and the seventh aircraft seat device 700*b*, which each have different sitting directions 510*b*, 610*b*, 710*b* and the aircraft seats 520*b*, 620*b*, 720*b* of which are arranged on the aisle side or facing away from the aisle. The sitting directions 510*b*, 610*b*, 710*b* of the aircraft seat devices 500*b*, 600*b*, 700*b* arranged directly one behind another are arranged within the second seat grouping 54*b* in an alternating manner at least substantially parallel to and in an angled manner with respect to the aircraft cabin center axis 16*b*. The second seat grouping 54*b* forms a periodically repeatable sequence. A plurality of identical second seat groupings 54*b* can be arranged directly one behind another along the aircraft cabin center axis 16*b*. Behind the fifth aircraft seat device 500*b*, as viewed in the flight direction 24*b*, the sitting direction 510*b* of which is arranged at least substantially parallel to the aircraft cabin center axis 16*b*, there is arranged an aircraft seat device, the sitting direction of which is arranged at least substantially parallel to the aircraft cabin center axis 16*b*. In front of the fifth aircraft seat device 500*b*, as viewed in the flight direction 24*b*, the sitting direction 510*b* of which is arranged at least substantially parallel to the aircraft cabin center axis 16*b*, there is arranged an aircraft seat device, the sitting direction of which is arranged in an angled manner with respect to the aircraft cabin center axis 16*b*. In front of and behind the sixth aircraft seat device 600*b*, as viewed in the flight direction 24*b*, the sitting direction 610*b* of which is arranged in an angled manner with respect to the aircraft cabin center axis 16*b*, there is in each case arranged an aircraft seat device, the sitting direction of which is arranged at least substantially parallel to the aircraft cabin center axis 16*b*. Behind the seventh aircraft seat device 700*b*, as viewed in the flight direction 24*b*, the sitting direction 710*b* of which is arranged at least substantially parallel to the aircraft cabin center axis 16*b*, there is arranged an aircraft seat device, the sitting direction of which is arranged in an angled manner with respect to the aircraft cabin center axis 16*b*. In front of the seventh aircraft seat device 700*b*, as viewed in the flight direction 24*b*, the sitting direction 710*b* of which is arranged at least substantially parallel to the aircraft cabin center axis 16*b*, there is arranged an aircraft seat device, the sitting direction of which is arranged at least substantially parallel to the aircraft cabin center axis 16*b*.

The first aircraft seat device 100*b*, the second aircraft seat device 200*b* and the third aircraft seat device 300*b* in the aircraft cabin section 26*b* differ in at least one comfort category, wherein the aircraft seat devices 100*b*, 200*b*, 300*b* for the at least one comfort category each have a different value from one another which is caused by a different arrangement of the aircraft seats 120*b*, 220*b*, 320*b* and by the at least partially different design of the aircraft seat devices 100*b*, 200*b*, 300*b*. The fifth aircraft seat device 500*b*, the sixth aircraft seat device 600*b* and the seventh aircraft seat device 700*b* in the aircraft cabin section 26*b* differ in at least one comfort category, wherein the aircraft seat devices 500*b*, 600*b*, 700*b* for the at least one comfort category each have a value which is different from one another and is caused by a different arrangement of the aircraft seats 520*b*, 620*b*, 720*b* and by the at least partially different design of the aircraft seat devices 500*b*, 600*b*, 700*b*. The at least one comfort category describes a living space.

In the first inner seat column 38*b*, one of the further second aircraft seat devices 200'*b* is arranged in a first seat row of the aircraft cabin section 26*b*, as viewed counter to the flight direction 24*b*. As viewed in the flight direction 24*b*, a further aircraft cabin module can be arranged in the central region 44*b* directly behind the further second aircraft seat device 200'*b* arranged in the first seat row of the aircraft cabin section 26*b*. The further aircraft cabin module can be designed here in particular as a front row monument. As a result, a higher degree of comfort can be achieved in the first seat row compared to the second aircraft seat device 200*b* since more space is available in the first seat row. The further second aircraft seat device 200'*b* which is arranged in the first seat row in the aircraft cabin section 26*b* can in principle differ in at least one comfort category from at least one aircraft seat device of the plurality of aircraft seat devices 100*b*, 200*b*, 300*b*, 500*b*, 600*b*, 700*b*.

In the second inner seat column 40*b*, one of the further sixth aircraft seat devices 600'*b* is arranged in the first seat row of the aircraft cabin section 26*b*, as viewed counter to the flight direction 24*b*. As viewed in the flight direction 24*b*, a further aircraft cabin module can be arranged in the central region 44*b* directly behind the further sixth aircraft seat device 600'*b* arranged in the first seat row of the aircraft cabin section 26*b*. The further sixth aircraft seat device 600'*b* arranged in the first seat row in the aircraft cabin section 26*b* can in principle differ in at least one comfort category from at least one aircraft seat device of the plurality of aircraft seat devices 100*b*, 200*b*, 300*b*, 500*b*, 600*b*, 700*b*.

FIG. 6 shows an aircraft seat arrangement 14*c* in a third exemplary embodiment. The aircraft seat arrangement 14*c* is configured for use in an aircraft cabin 12*c*, partially illustrated, of an aircraft. The aircraft cabin 12*c* has an aircraft cabin center axis 16*c*. The aircraft cabin center axis 16*c* is in the form of an aircraft longitudinal axis. The aircraft cabin 12*c* has two opposite aircraft cabin outer walls 18*c*, 20*c*. The aircraft cabin 12*c* has an aircraft cabin floor 22*c*. In at least one operating state, the aircraft has a flight direction 24*c*. The aircraft cabin 12*c* has an aircraft cabin section 26*c* along the aircraft cabin center axis 16*c*. In the present case, the aircraft cabin section 26*c* is delimited by a plurality of aircraft cabin modules 30*c*, illustrated schematically, along the aircraft cabin center axis 16*c*. The aircraft cabin 12*c* has a first aircraft cabin aisle 32*c* and a second aircraft cabin aisle 34*c* in the aircraft cabin section 26*c*. The aircraft seat arrangement 14*c* comprises a first outer seat column 36*c*. The aircraft seat arrangement 14*c* comprises a first inner seat column 38*c*. The aircraft seat arrangement 14*c* comprises a second inner seat column 40*c*. The aircraft seat arrangement 14*c* comprises a second outer seat column 42*c*. The aircraft cabin 12*c* has a central region 44*c*.

The aircraft seat arrangement 14*c* comprises a plurality of aircraft seat devices 100*c*, 200*c*, 300*c*, 500*c*, 600*c*, 700*c* arranged in the aircraft cabin section 26*c*. The plurality of aircraft seat devices 100*c*, 200*c*, 300*c*, 500*c*, 600*c*, 700*c* are designed to be different from one another. In the present case, six aircraft seat devices 100*c*, 200*c*, 300*c*, 500*c*, 600*c*, 700*c* which are designed to be different from one another are arranged in the aircraft cabin section 26*c*. The aircraft seat devices 100*c*, 200*c*, 300*c*, 500*c*, 600*c*, 700*c* each have an aircraft seat. The aircraft seat devices 100*c*, 200*c*, 300*c*, 500*c*, 600*c*, 700*c* each have a console. The aircraft seat arrangement 14*c* comprises a first aircraft seat device 100*c* of the plurality of aircraft seat devices 100*c*, 200*c*, 300*c*, 500*c*, 600*c*, 700*c*. The first aircraft seat device 100*c* has a sitting direction 110*c*. The first aircraft seat device 100*c* has a first aircraft seat 120*c*. The first aircraft seat device 100*c* has a first console 130*c*. The aircraft seat arrangement 14*c* comprises a second aircraft seat device 200*c* of the plurality of aircraft seat devices 100*c*, 200*c*, 300*c*, 500*c*, 600*c*, 700*c*. The second aircraft seat device 200*c* has a sitting direction 210*c*. The second aircraft seat device 200*c* has a second aircraft seat 220*c*. The second aircraft seat device 200*c* has a second console 230*c*. The aircraft seat arrangement 14*c* comprises a third aircraft seat device 300*c* of the plurality of aircraft seat devices 100*c*, 200*c*, 300*c*, 500*c*, 600*c*, 700*c*. The third aircraft seat device 300*c* has a sitting direction 310*c*. The third aircraft seat device 300*c* has a third aircraft seat 320*c*. The third aircraft seat device 300*c* has a third console 330*c*. The aircraft seat arrangement 14*c* comprises a fifth aircraft seat device 500*c* of the plurality of aircraft seat devices 100*c*, 200*c*, 300*c*, 500*c*, 600*c*, 700*c*. The fifth aircraft seat device 500*c* has a sitting direction 510*c*. The fifth aircraft seat device 500*c* has a fifth aircraft seat 520*c*. The fifth aircraft seat device 500*c* has a fifth console 530*c*. The aircraft seat arrangement 14*c* comprises a sixth aircraft seat device 600*c* of the plurality of aircraft seat devices 100*c*, 200*c*, 300*c*, 500*c*, 600*c*, 700*c*. The sixth aircraft seat device 600*c* has a sitting direction 610*c*. The sixth aircraft seat device 600*c* has a sixth aircraft seat 620*c*. The sixth aircraft seat device 600*c* has a sixth console 630*c*. The aircraft seat arrangement 14*c* comprises a seventh aircraft seat device 700*c* of the plurality of aircraft seat devices 100*c*, 200*c*, 300*c*, 500*c*, 600*c*, 700*c*. The seventh aircraft seat device 700*c* has a sitting direction 710*c*. The seventh aircraft seat device 700*c* has a seventh aircraft seat 720*c*. The seventh aircraft seat device 700*c* has a seventh console 730*c*. The aircraft seat arrangement 14*c* comprises a plurality of further first aircraft seat devices 100'*c* which are formed at least substantially identically to the first aircraft seat device 100*c*. The aircraft seat arrangement 14*c* comprises a plurality of further second aircraft seat devices 200'*c* which are formed at least substantially identically to the second aircraft seat device 200*c*. The aircraft seat arrangement 14*c* comprises a plurality of further third aircraft seat devices 300'*c* which are formed at least substantially identically to the third aircraft seat device 300*c*. The aircraft seat arrangement 14*c* comprises a plurality of further fifth aircraft seat devices 500'*c* which are formed at least substantially identically to the fifth aircraft seat device 500*c*. The aircraft seat arrangement 14*c* comprises a plurality of further sixth aircraft seat devices 600'*c* which are formed at least substantially identically to the sixth aircraft seat device 600*c*. The aircraft seat arrangement 14*c* comprises a plurality of further seventh aircraft seat devices 700'*c* which are formed at least substantially identically to the seventh aircraft seat device 700*c*.

In the aircraft cabin section 26*c*, two aircraft seat devices of the plurality of aircraft seat devices 100*c*, 200*c*, 300*c*, 500*c*, 600*c*, 700*c*, namely the third aircraft seat device 300*c* and the seventh aircraft seat device 700*c*, form a pair of seats 46*c* in two seat columns arranged directly next to each other, namely the first inner seat column 38*c* and the second inner seat column 40*c*, wherein the sitting directions 310*c*, 710*c* of the two aircraft seat devices 300*c*, 700*c* are arranged at least substantially parallel to the aircraft cabin center axis 16*c*, and the aircraft seats 320*c*, 720*c* of the two aircraft seat devices 300*c*, 700*c* are arranged facing away from the aisle, wherein at least two of the pairs of seats 46*c* are arranged in the two seat columns 38*c*, 40*c* arranged directly next to each other. The aircraft seat arrangement 14*c* has a first seat grouping 52*c* of three aircraft seat devices arranged directly one behind another in the first inner seat column 38*c* in the aircraft cabin section 26*c*, namely the first aircraft seat device 100*c*, the second aircraft seat device 200*c* and the third aircraft seat device 300*c*, which each have different sitting directions 110*c*, 210*c*, 310*c* and the aircraft seats 120*c*, 220*c*, 320*c* of which are arranged on the aisle side or facing away from the aisle. The aircraft seat arrangement 14*c* has a second seat grouping 54*c* of three aircraft seat devices arranged directly one behind another in the second inner seat column 40*c* in the aircraft cabin section 26*c*, namely the fifth aircraft seat device 500*c*, the sixth aircraft seat device 600*c* and the seventh aircraft seat device 700*c*, which each have different sitting directions 510*c*, 610*c*, 710*c* and the aircraft seats 520*c*, 620*c*, 720*c* of which are arranged on the aisle side or facing away from the aisle.

The first aircraft seat device 100*c*, the second aircraft seat device 200*c* and the third aircraft seat device 300*c* in the aircraft cabin section 26*c* differ in at least one comfort category, wherein the aircraft seat devices 100*c*, 200*c*, 300*c* for the at least one comfort category each have a value which is different from one another and is caused by a different arrangement of the aircraft seats 120*c*, 220*c*, 320*c* and by the at least partially different design of the aircraft seat devices 100*c*, 200*c*, 300*c*. The fifth aircraft seat device 500*c*, the sixth aircraft seat device 600*c* and the seventh aircraft seat device 700*c* in the aircraft cabin section 26*c* differ in at least one comfort category, wherein the aircraft seat devices 500*c*, 600*c*, 700*c* for the at least one comfort category in each case have a value which is different from one another and is caused by a different arrangement of the aircraft seats 520*c*, 620*c*, 720*c* and by the at least partially different design of the aircraft seat devices 500*c*, 600*c*, 700*c*.

In contrast to the second exemplary embodiment, a further of the third aircraft seat devices 300'*c* is arranged in the first inner seat column 38*c*, as viewed in the flight direction 24*c*, and a further of the seventh aircraft seat devices 700'*c* is arranged in the second inner seat column 40*c*, in a final seat row, as viewed counter to the flight direction 24*c*, in the central region 44*c* of the aircraft cabin section 26*c*. In the first inner seat column 38*c*, two aircraft seat devices are arranged directly behind the further third aircraft seat device 300'*c*, as viewed in the flight direction 24*c*, the sitting directions of which two aircraft seat devices are arranged at least substantially parallel to the aircraft cabin center axis 16*c*. In the second inner seat column 40*c*, two aircraft seat devices are arranged directly behind the further seventh aircraft seat device 700'*c*, as viewed in the flight direction 24*c*, the sitting directions of which are arranged at least substantially parallel to the aircraft cabin center axis 16*c*.

FIG. 7 shows an aircraft seat arrangement 14*d* in a fourth exemplary embodiment. The aircraft seat arrangement 14*d* is configured for use in an aircraft cabin 12*d*, partially illustrated, of an aircraft. The aircraft cabin 12*d* has an aircraft cabin center axis 16*d*. The aircraft cabin center axis 16*d* is in the form of an aircraft longitudinal axis. The aircraft cabin 12*d* has two opposite aircraft cabin outer walls 18*d*, 20*d*. The aircraft cabin 12*d* has an aircraft cabin floor 22*d*. In at least one operating state, the aircraft has a flight direction 24*d*. The aircraft cabin 12*d* has an aircraft cabin section 26*d* along the aircraft cabin center axis 16*d*. In the present case, the aircraft cabin section 26*d* is delimited by a plurality of aircraft cabin modules 30*d*, illustrated schematically, along the aircraft cabin center axis 16*d*. The aircraft cabin 12*d* has a first aircraft cabin aisle 32*d* and a second aircraft cabin aisle 34*d* in the aircraft cabin section 26*d*. The aircraft seat arrangement 14*d* comprises a first outer seat column 36*d*. The aircraft seat arrangement 14*d* comprises a first inner seat column 38*d*. The aircraft seat arrangement 14*d* comprises a second inner seat column 40*d*. The aircraft seat arrangement 14*d* comprises a second outer seat column 42*d*. The aircraft cabin 12*d* has a central region 44*d*.

The aircraft seat arrangement 14*d* comprises a plurality of aircraft seat devices 100*d*, 200*d*, 300*d*, 500*d*, 600*d*, 700*d* arranged in the aircraft cabin section 26*d*. The plurality of aircraft seat devices 100*d*, 200*d*, 300*d*, 500*d*, 600*d*, 700*d* are designed to be different from one another. In the present case, six aircraft seat devices 100*d*, 200*d*, 300*d*, 500*d*, 600*d*, 700*d* which are designed to be different from one another are arranged in the aircraft cabin section 26*d*. The aircraft seat devices 100*d*, 200*d*, 300*d*, 500*d*, 600*d*, 700*d* each have an aircraft seat. The aircraft seat devices 100*d*, 200*d*, 300*d*, 500*d*, 600*d*, 700*d* each have a console. The aircraft seat arrangement 14*d* comprises a first aircraft seat device 100*d* of the plurality of aircraft seat devices 100*d*, 200*d*, 300*d*, 500*d*, 600*d*, 700*d*. The first aircraft seat device 100*d* has a sitting direction 110*d*. The first aircraft seat device 100*d* has a first aircraft seat 120*d*. The first aircraft seat device 100*d* has a first console 130*d*. The aircraft seat arrangement 14*d* comprises a second aircraft seat device 200*d* of the plurality of aircraft seat devices 100*d*, 200*d*, 300*d*, 500*d*, 600*d*, 700*d*. The second aircraft seat device 200*d* has a sitting direction 210*d*. The second aircraft seat device 200*d* has a second aircraft seat 220*d*. The second aircraft seat device 200*d* has a second console 230*d*. The aircraft seat arrangement 14*d* comprises a third aircraft seat device 300*d* of the plurality of aircraft seat devices 100*d*, 200*d*, 300*d*, 500*d*, 600*d*, 700*d*. The third aircraft seat device 300*d* has a sitting direction 310*d*. The third aircraft seat device 300*d* has a third aircraft seat 320*d*. The third aircraft seat device 300*d* has a third console 330*d*. The aircraft seat arrangement 14*d* comprises a fifth aircraft seat device 500*d* of the plurality of aircraft seat devices 100*d*, 200*d*, 300*d*, 500*d*, 600*d*, 700*d*. The fifth aircraft seat device 500*d* has a sitting direction 510*d*. The fifth aircraft seat device 500*d* has a fifth aircraft seat 520*d*. The fifth aircraft seat device 500*d* has a fifth console 530*d*. The aircraft seat arrangement 14*d* comprises a sixth aircraft seat device 600*d* of the plurality of aircraft seat devices 100*d*, 200*d*, 300*d*, 500*d*, 600*d*, 700*d*. The sixth aircraft seat device 600*d* has a sitting direction 610*d*. The sixth aircraft seat device 600*d* has a sixth aircraft seat 620*d*. The sixth aircraft seat device 600*d* has a sixth console 630*d*. The aircraft seat arrangement 14*d* comprises a seventh aircraft seat device 700*d* of the plurality of aircraft seat devices 100*d*, 200*d*, 300*d*, 500*d*, 600*d*, 700*d*. The seventh aircraft seat device 700*d* has a sitting direction 710*d*. The seventh aircraft seat device 700*d* has a seventh aircraft seat 720*d*. The seventh aircraft seat device 700*d* has a seventh console 730*d*. The aircraft seat arrangement 14*d* comprises a plurality of further first aircraft seat devices 100'*d* which are formed at least substantially identically to the first aircraft seat device 100*d*. The aircraft seat arrangement 14*d* comprises a plurality of further second aircraft seat devices 200'*d* which are formed at least substantially identically to the second aircraft seat device 200*d*. The aircraft seat arrangement 14*d* comprises a plurality of further third aircraft seat devices 300'*d* which are formed at least substantially identically to the third aircraft seat device 300*d*. The aircraft seat arrangement 14*d* comprises a plurality of further fourth aircraft seat devices 400'*d* which are formed at least substantially identically to the fourth aircraft seat device 400*a* from the first exemplary embodiment. The aircraft seat arrangement 14*d* comprises a plurality of further fifth aircraft seat devices 500'*d* which are formed at least substantially identically to the fifth aircraft seat device 500*d*. The aircraft seat arrangement 14*d* comprises a plurality of further sixth aircraft seat devices 600'*d* which are formed at least substantially identically to the sixth aircraft seat device 600*d*. The aircraft seat arrangement 14*d* comprises a plurality of further seventh aircraft seat devices 700'*d* which are formed at least substantially identically to the seventh aircraft seat device 700*d*. The aircraft seat arrangement 14*d* comprises a plurality of further eighth aircraft seat devices 800'*d* which are formed at least substantially identically to the eighth aircraft seat device 800*a* from the first exemplary embodiment.

In the aircraft cabin section 26*d*, two aircraft seat devices of the plurality of aircraft seat devices 100*d*, 200*d*, 300*d*, 500*d*, 600*d*, 700*d*, namely the third aircraft seat device 300*d* and the seventh aircraft seat device 700*d*, form a pair of seats 46*d* in two seat columns arranged directly next to each other, namely the first inner seat column 38*d* and the second inner seat column 40*d*, wherein the sitting directions 310*d*, 710*d* of the two aircraft seat devices 300*d*, 700*d* are arranged at least substantially parallel to the aircraft cabin center axis 16*d*, and the aircraft seats 320*d*, 720*d* of the two aircraft seat devices 300*d*, 700*d* are arranged facing away from the aisle, wherein at least two of the pairs of seats 46*d* are arranged in the two seat columns 38*d*, 40*d* which are arranged directly next to each other. The aircraft seat arrangement 14*d* has a first seat grouping 52*d* of three aircraft seat devices arranged directly one behind another in the first inner seat column 38*d* in the aircraft cabin section 26*d*, namely the first aircraft seat device 100*d*, the second aircraft seat device 200*d* and the third aircraft seat device 300*d*, which each have different sitting directions 110*d*, 210*d*, 310*d* and the aircraft seats 120*d*, 220*d*, 320*d* of which are arranged on the aisle side or facing away from the aisle. The aircraft seat arrangement 14*d* has a second seat grouping 54*d* of three aircraft seat devices arranged directly one behind another in the second inner seat column 40*d* in the aircraft cabin section 26*d*, namely the fifth aircraft seat device 500*d*, the sixth aircraft seat device 600*d* and the seventh aircraft seat device 700*d*, which each have different sitting directions 510*d*, 610*d*, 710*d* and the aircraft seats 520*d*, 620*d*, 720*d* of which are arranged on the aisle side or facing away from the aisle.

The first aircraft seat device 100*d*, the second aircraft seat device 200*d* and the third aircraft seat device 300*d* in the aircraft cabin section 26*d* differ in at least one comfort category, wherein the aircraft seat devices 100*d*, 200*d*, 300*d* for the at least one comfort category in each case have a value which is different from one another and is caused by a different arrangement of the aircraft seats 120*d*, 220*d*, 320*d* and by the at least partially different design of the aircraft seat devices 100*d*, 200*d*, 300*d*. The fifth aircraft seat device 500*d*, the sixth aircraft seat device 600*d* and the seventh aircraft seat device 700*d* in the aircraft cabin section 26*d* differ in at least one comfort category, wherein the aircraft seat devices 500*d*, 600*d*, 700*d* for the at least one comfort category in each case have a value which is different from one another and is caused by a different arrangement of the aircraft seats 520*d*, 620*d*, 720*d* and by the at least partially different design of the aircraft seat devices 500*d*, 600*d*, 700*d*.

In contrast to the third exemplary embodiment, four aircraft seat devices 500'*d*, 600'*d*, 700'*d*, 800'*d*, which are designed to be different from one another, of the plurality of further aircraft seat devices 100'*d*, 200'*d*, 300'*d*, 400'*d*, 500'*d*, 600'*d*, 700'*d*, 800'*d* are arranged in the first outer seat column 36*d* in the aircraft cabin section 26*d*. A further fifth aircraft seat device 500'*d*, a further seventh aircraft seat device 700'*d* and a further eighth aircraft seat device 800'*d* are arranged directly one behind another in the first outer seat column 36*d*. In the first outer seat column 36*d*, a further eighth aircraft seat device 800'*d*, a further fifth aircraft seat device 500'*d* and a further sixth aircraft seat device 600'*d* are arranged directly behind one another. Between a further seventh aircraft seat device 700'*d* and a further fifth aircraft seat device 500'*d*, two further eighth aircraft seat devices 800'*d* are arranged in the first outer seat column 36*d*. Between the further fifth aircraft seat device 500'*d* and a further seventh aircraft seat device 700'*d*, two further sixth aircraft seat devices 600'*d* are arranged in the first outer seat column 36*d*.

In contrast to the third exemplary embodiment, four aircraft seat devices 100'*d*, 200'*d*, 300'*d*, 400'*d*, which are designed to be different from one another, of the plurality of further aircraft seat devices 100'*d*, 200'*d*, 300'*d*, 400'*d*, 500'*d*, 600'*d*, 700'*d*, 800'*d* are arranged in the second outer seat column 42*d* in the aircraft cabin section 26*d*. A further first aircraft seat device 100'*d*, a further third aircraft seat device 300'*d* and a further fourth aircraft seat device 400'*d* are arranged directly one behind another in the second outer seat column 42*d*. A further fourth aircraft seat device 400'*d*, a further first aircraft seat device 100'*d* and a further second aircraft seat device 200'*d* are arranged directly one behind another in the second outer seat column 42*d*. Between a further third aircraft seat device 300'*d* and a further first aircraft seat device 100'*d*, two further fourth aircraft seat devices 400'*d* are arranged in the second outer seat column 42*d*. Between the further first aircraft seat device 100'*d* and a further third aircraft seat device 300'*d*, two further second aircraft seat devices 200'*d* are arranged in the second outer seat column 42*d*.

FIG. 8 shows an aircraft seat arrangement 14*e* in a fifth exemplary embodiment. The aircraft seat arrangement 14*e* is configured for use in an aircraft cabin 12*e*, partially illustrated, of an aircraft. The aircraft cabin 12*e* has an aircraft cabin center axis 16*e*. The aircraft cabin center axis 16*e* is in the form of an aircraft longitudinal axis. The aircraft cabin 12*e* has two opposite aircraft cabin outer walls 18*e*, 20*e*. In at least one operating state, the aircraft has a flight direction 24*e*. The aircraft cabin 12*e* has an aircraft cabin section 26*e* along the aircraft cabin center axis 16*e*. In the present case, the aircraft cabin section 26*e* is delimited by a plurality of separating elements 28*e* along the aircraft cabin center axis 16*e*. The aircraft cabin 12*e* has a first aircraft cabin aisle 32*e* and a second aircraft cabin aisle 34*e* in the aircraft cabin section 26*d*. The aircraft seat arrangement 14*e* comprises a first outer seat column 36*e*. The aircraft seat arrangement 14*e* comprises a first inner seat column 38*e*. The aircraft seat arrangement 14*e* comprises a second inner seat column 40*e*. The aircraft seat arrangement 14*e* comprises a second outer seat column 42*e*. The aircraft cabin 12*e* has a central region 44*e*. The aircraft cabin 12*e* comprises a first aircraft cabin side 56*e* and a second aircraft cabin side 58*e*.

The aircraft seat arrangement 14*e* comprises a plurality of aircraft seat devices 100*e*, 200*e*, 300*e*, 500*e*, 600*e*, 700*e*, 800*e* arranged in the aircraft cabin section 26*e*. The plurality of aircraft seat devices 100*e*, 200*e*, 300*e*, 500*e*, 600*e*, 700*e*, 800*e* are designed to be different from one another. In the present case, seven aircraft seat devices 100*e*, 200*e*, 300*e*, 500*e*, 600*e*, 700*e*, 800*e*, which are designed to be different from one another, are arranged in the aircraft cabin section 26*e*. The aircraft seat devices 100*e*, 200*e*, 300*e*, 500*e*, 600*e*, 700*e*, 800*e* each have an aircraft seat. The aircraft seat devices 100*e*, 200*e*, 300*e*, 500*e*, 600*e*, 700*e*, 800*e* each have a console. The aircraft seat arrangement 14*e* comprises a first aircraft seat device 100*e* of the plurality of aircraft seat devices 100*e*, 200*e*, 300*e*, 500*e*, 600*e*, 700*e*, 800*e*. The first aircraft seat device 100*e* has a sitting direction 110*e*. The first aircraft seat device 100*e* has a first aircraft seat 120*e*. The first aircraft seat device 100*e* has a first console 130*e*. The aircraft seat arrangement 14*e* comprises a second aircraft seat device 200*e* of the plurality of aircraft seat devices 100*e*, 200*e*, 300*e*, 500*e*, 600*e*, 700*e*, 800*e*. The second aircraft seat device 200*e* has a sitting direction 210*e*. The second aircraft seat device 200*e* has a second aircraft seat 220*e*. The second aircraft seat device 200*e* has a second console 230*e*. The aircraft seat arrangement 14*e* comprises a third aircraft seat device 300*e* of the plurality of aircraft seat devices 100*e*, 200*e*, 300*e*, 500*e*, 600*e*, 700*e*, 800*e*. The third aircraft seat device 300*e* has a sitting direction 310*e*. The third aircraft seat device 300*e* has a third aircraft seat 320*e*. The third aircraft seat device 300*e* has a third console 330*e*. The aircraft seat arrangement 14*e* comprises a fifth aircraft seat device 500*e* of the plurality of aircraft seat devices 100*e*, 200*e*, 300*e*, 500*e*, 600*e*, 700*e*, 800*e*. The fifth aircraft seat device 500*e* has a sitting direction 510*e*. The fifth aircraft seat device 500*e* has a fifth aircraft seat 520*e*. The fifth aircraft seat device 500*e* has a fifth console 530*e*. The aircraft seat arrangement 14*e* comprises a sixth aircraft seat device 600*e* of the plurality of aircraft seat devices 100*e*, 200*e*, 300*e*, 500*e*, 600*e*, 700*e*, 800*e*. The sixth aircraft seat device 600*e* has a sitting direction 610*e*. The sixth aircraft seat device 600*e* has a sixth aircraft seat 620*e*. The sixth aircraft seat device 600*e* has a sixth console 630*e*. The aircraft seat arrangement 14*e* comprises a seventh aircraft seat device 700*e* of the plurality of aircraft seat devices 100*e*, 200*e*, 300*e*, 500*e*, 600*e*, 700*e*, 800*e*. The seventh aircraft seat device 700*e* has a sitting direction 710*e*. The seventh aircraft seat device 700*e* has a seventh aircraft seat 720*e*. The seventh aircraft seat device 700*e* has a seventh console 730*e*. The aircraft seat arrangement 14*e* comprises an eighth aircraft seat device 800*e* of the plurality of aircraft seat devices 100*e*, 200*e*, 300*e*, 500*e*, 600*e*, 700*e*, 800*e*. The eighth aircraft seat device 800*e* has a sitting direction 810*e*. The eighth aircraft seat device 800*e* has an eighth aircraft seat 820*e*. The eighth aircraft seat device 800*e* has an eighth console 830*e*. The aircraft seat arrangement 14*e* can comprise a plurality of further first aircraft seat devices which are formed at least substantially identically to the first aircraft seat device 100*e*. The aircraft seat arrangement 14*e* comprises a plurality of further second aircraft seat devices 200'*e* which are formed at least substantially identically to the second aircraft seat device 200*e*. The aircraft seat arrangement 14*e* comprises at least one further third aircraft seat device 300'*e* which is formed at least substantially identically to the third aircraft seat device 300*e*. The aircraft seat arrangement 14*e* can comprise a plurality of further fifth aircraft seat devices which are formed at least substantially identically to the fifth aircraft seat device 500*e*. The aircraft seat arrangement 14*e* comprises a plurality of further sixth aircraft seat devices 600'*e* which are formed at least substantially identically to the sixth aircraft seat device 600*e*. The aircraft seat arrangement 14*e* comprises at least one further seventh aircraft seat device 700'*e* which is formed at least substantially identically to the seventh aircraft seat device 700*e*. The aircraft seat arrangement 14*e* can comprise a plurality of further eighth aircraft seat devices which are formed at least substantially identically to the eighth aircraft seat device 800*e*.

In contrast to the first exemplary embodiment, an arrangement of aircraft seat devices 200*e*, 600*e*, 800*e* of the plurality of aircraft seat devices 100*e*, 200*e*, 300*e*, 500*e*, 600*e*, 700*e*, 800*e* in the aircraft cabin section 26*e* in the first outer seat column 36*e* and the first inner seat column 38*e* on the first aircraft cabin side 56*e* is formed asymmetrically with respect to an arrangement of aircraft seat devices 100*e*, 300*e*, 500*e*, 700*e* of the plurality of aircraft seat devices 100*e*, 200*e*, 300*e*, 500*e*, 600*e*, 700*e*, 800*e* in the second inner seat column 38*e* and the second outer seat column 42*e* on the second aircraft cabin side 58*e*. The first aircraft cabin side 56*e* is separated from the second aircraft cabin side 58*e* by an imaginary aircraft cabin center plane which is oriented along the aircraft cabin center axis 16*e* perpendicularly to an aircraft cabin floor 22*e* of the aircraft cabin 12*e*. An arrangement of aircraft seat devices 200*e*, 200'*e* of the plurality of aircraft seat devices 100*e*, 200*e*, 300*e*, 500*e*, 600*e*, 700*e*, 800*e* in the first inner seat column 38*e* on the first aircraft cabin side 56*e* is formed asymmetrically, with reference to the aircraft cabin center axis 16*e*, to an arrangement of aircraft seat devices 500*e*, 700*e*, 700'*e* of the plurality of aircraft seat devices 100*e*, 200*e*, 300*e*, 500*e*, 600*e*, 700*e*, 800*e* in the second inner seat column 38*e* on the second aircraft cabin side 58*e*. An arrangement of aircraft seat devices 500*e*, 700*e*, 700'*e* of the plurality of aircraft seat devices 100*e*, 200*e*, 300*e*, 500*e*, 600*e*, 700*e*, 800*e* in the second inner seat column 40*e* on the second aircraft cabin side 58*e* is formed symmetrically to an arrangement of aircraft seat devices 100e, 300e, 300'e of the plurality of aircraft seat devices 100e, 200e, 300e, 500e, 600e, 700e, 800e in the second outer seat column 42e on the second aircraft cabin side 58e.

The first aircraft cabin side 56e and the second aircraft cabin side 58e each have precisely one of the aircraft cabin aisles 32e, 34e. The first aircraft cabin aisle 32e is arranged on the first aircraft cabin side 56e. The second aircraft cabin aisle 34e is arranged on the second aircraft cabin side 58e. In principle, it is conceivable for the aircraft cabin 12e to have, in the aircraft cabin section 26e, at least one partition along the aircraft cabin center axis 16e that separates the first aircraft cabin side 56e from the second aircraft cabin side 58e. As a result, a private sphere in a large-capacity aircraft can advantageously be increased.

There is an exclusive arrangement of aircraft seat devices 600e, 800e of the plurality of aircraft seat devices 100e, 200e, 300e, 500e, 600e, 700e, 800e, the sitting directions 610e, 810e of which are arranged in an angled manner with respect to the aircraft cabin center axis 16e, in the first outer seat column 36e. There is an exclusive arrangement of aircraft seat devices 200e, 200'e of the plurality of aircraft seat devices 100e, 200e, 300e, 500e, 600e, 700e, 800e, the sitting directions 210e of which are arranged in an angled manner with respect to the aircraft cabin center axis 16e, in the first inner seat column 38e. There is an exclusive arrangement of aircraft seat devices 200e of the plurality of aircraft seat devices 100e, 200e, 300e, 500e, 600e, 700e, 800e, the aircraft seats 220e of which are arranged on the aisle side, in the first inner seat column 38e. The first outer seat column 36e is formed partially in mirror image to the first inner seat column 38e via the first aircraft cabin aisle 32e.

There is an exclusive arrangement of aircraft seat devices 500e, 700e of the plurality of aircraft seat devices 100e, 200e, 300e, 500e, 600e, 700e, 800e, the sitting directions 510e, 710e of which are arranged at least substantially parallel to the aircraft cabin center axis 16e, in the second inner seat column 40e. There is an exclusive arrangement of aircraft seat devices 100e, 300e of the plurality of aircraft seat devices 100e, 200e, 300e, 500e, 600e, 700e, 800e, the sitting directions 110e, 310e of which are arranged at least substantially parallel to the aircraft cabin center axis 16e, in the second outer seat column 42e. There is an exclusive arrangement of aircraft seat devices 500e, 700e of the plurality of aircraft seat devices 100e, 200e, 300e, 500e, 600e, 700e, 800e, the aircraft seats 220e, 520e of which are arranged in an alternating manner on the aisle side or facing away from the aisle, in the second inner seat column 40e. There is an exclusive arrangement of aircraft seat devices 100e, 300e of the plurality of aircraft seat devices 100e, 200e, 300e, 500e, 600e, 700e, 800e, the aircraft seats 120e, 320e of which are arranged in an alternating manner on the aisle side or facing away from the aisle, in the second outer seat column 42e. The second outer seat column 42e is formed in mirror image to the second inner seat column 40e via the second aircraft cabin aisle 34e.

The aircraft seat arrangement 14e comprises an interspace unit 60e. The interspace unit 60e is arranged in the first outer seat column 36e. The interspace unit 60e is arranged along an aircraft longitudinal axis between the sixth aircraft seat device 600e and the eighth aircraft seat device 800e. The interspace unit 60e is configured to make functional use of a free space provided and/or produced between two aircraft seat devices. The interspace unit 60e can be designed as a storage space for, for example, jackets, coats, blankets and/or amenity kits. Alternatively, the interspace unit 60e can be designed as a storage space for items of hand luggage. The interspace unit 60e can in principle also be designed as a bar, as a vending machine and/or as a presentation space for inflight shopping products. Furthermore, the interspace unit 60e can be designed as a server cabinet which is connected electronically to at least some of the plurality of aircraft seat devices 100e, 200e, 300e, 500e, 600e, 700e, 800e in the aircraft cabin section 26e. In principle, the interspace unit 60e can also be designed as a console or as a cabin monument.

In the aircraft cabin section 26e, the first aircraft seat device 100e, the second aircraft seat device 200e, the third aircraft seat device 300e, the fifth aircraft seat device 500e, the sixth aircraft seat device 600e, the seventh aircraft seat device 700e and the eighth aircraft seat device 800e differ in at least one comfort category, wherein the aircraft seat devices 100e, 200e, 300e, 500e, 600e, 700e, 800e for the at least one comfort category in each case have a value which is different from one another and is caused by a different arrangement of the aircraft seats 120e, 220e, 320e, 520e, 620e, 720e, 820e and by the at least partially different design of the aircraft seat devices 100e, 200e, 300e, 500e, 600e, 700e, 800e.

The aircraft seat arrangement 14e illustrated in FIG. 8 is in principle extendable by further aircraft seat devices 100'e, 200'e, 300'e, 500'e, 600'e, 700'e, 800'e, as viewed in the flight direction 24e.

FIG. 9 shows an aircraft seat arrangement 14f in a sixth exemplary embodiment. The aircraft seat arrangement 14f is configured for use in an aircraft cabin 12f, partially illustrated, of an aircraft. The aircraft cabin 12f has an aircraft cabin center axis 16f. The aircraft cabin center axis 16f is in the form of an aircraft longitudinal axis. The aircraft cabin 12f has two opposite aircraft cabin outer walls 18f, 20f. In at least one operating state, the aircraft has a flight direction 24f. The aircraft cabin 12f has an aircraft cabin section 26f along the aircraft cabin center axis 16f. The aircraft cabin 12f has a first aircraft cabin aisle 32f and a second aircraft cabin aisle 34f in the aircraft cabin section 26f. The aircraft seat arrangement 14f comprises a first outer seat column 36f. The aircraft seat arrangement 14f comprises a first inner seat column 38f. The aircraft seat arrangement 14f comprises a second inner seat column 40f. The aircraft seat arrangement 14f comprises a second outer seat column 42f. The aircraft cabin 12f has a central region 44f. The aircraft cabin 12f comprises a first aircraft cabin side 56f and a second aircraft cabin side 58f.

The aircraft seat arrangement 14f comprises a plurality of aircraft seat devices 100f, 300f, 400f, 500f, 700f arranged in the aircraft cabin section 26f. The plurality of aircraft seat devices 100f, 300f, 400f, 500f, 700f are designed to be different from one another. The aircraft seat devices 100f, 300f, 400f, 500f, 700f each have an aircraft seat. The aircraft seat devices 100f, 300f, 400f, 500f, 700f each have a console. The aircraft seat arrangement 14f comprises a first aircraft seat device 100f of the plurality of aircraft seat devices 100f, 300f, 400f, 500f, 700f. The first aircraft seat device 100f has a sitting direction 110f. The first aircraft seat device 100f has a first aircraft seat 120f. The first aircraft seat device 100f has a first console 130f. The aircraft seat arrangement 14f comprises a third aircraft seat device 300f of the plurality of aircraft seat devices 100f, 300f, 400f, 500f, 700f. The third aircraft seat device 300f has a sitting direction 310f. The third aircraft seat device 300f has a third aircraft seat 320f. The third aircraft seat device 300f has a third console 330f. The aircraft seat arrangement 14f comprises a fourth aircraft seat device 400f of the plurality of aircraft seat devices 100f, 300*f*, 400*f*, 500*f*, 700*f*. The fourth aircraft seat device 400*f* has a sitting direction 410*f*. The fourth aircraft seat device 400*f* has a fourth aircraft seat 420*f*. The fourth aircraft seat device 400*f* has a fourth console 430*f*. The aircraft seat arrangement 14*f* comprises a fifth aircraft seat device 500*f* of the plurality of aircraft seat devices 100*f*, 300*f*, 400*f*, 500*f*, 700*f*. The fifth aircraft seat device 500*f* has a sitting direction 510*f*. The fifth aircraft seat device 500*f* has a fifth aircraft seat 520*f*. The fifth aircraft seat device 500*f* has a fifth console 530*f*. The aircraft seat arrangement 14*f* comprises a seventh aircraft seat device 700*f* of the plurality of aircraft seat devices 100*f*, 300*f*, 400*f*, 500*f*, 700*f*. The seventh aircraft seat device 700*f* has a sitting direction 710*f*. The seventh aircraft seat device 700*f* has a seventh aircraft seat 720*f*. The seventh aircraft seat device 700*f* has a seventh console 730*f*. The aircraft seat arrangement 14*f* comprises at least one further first aircraft seat device 100'*f* which is formed at least substantially identically to the first aircraft seat device 100*f*. The aircraft seat arrangement 14*f* can comprise a plurality of further third aircraft seat devices which are formed at least substantially identically to the third aircraft seat device 300*f*. The aircraft seat arrangement 14*f* comprises a plurality of further fourth aircraft seat devices 400'*f* which are formed at least substantially identically to the fourth aircraft seat device 400*f*. The aircraft seat arrangement 14*f* comprises at least one further fifth aircraft seat device 500'*f* which is formed at least substantially identically to the fifth aircraft seat device 500*f*. The aircraft seat arrangement 14*f* comprises a plurality of further seventh aircraft seat devices 700'*f* which are formed at least substantially identically to the seventh aircraft seat device 700*f*.

In contrast to the fifth exemplary embodiment, the aircraft seat arrangement 14*f* comprises a plurality of alternative aircraft seat devices 1000*f*, 3000*f*, 5000*f*, 7000*f* which are arranged in the aircraft cabin section 26*f*. The aircraft seat arrangement 14*f* comprises an alternative first aircraft seat device 1000*f*. The alternative first aircraft seat device 1000*f* has a sitting direction 1100*f*. The sitting direction 1100*f* of the alternative first aircraft seat device 1000*f* is oriented counter to the flight direction 24*f*. The sitting direction 1100*f* of the alternative first aircraft seat device 1000*f* is oriented at least substantially parallel to the aircraft cabin center axis 16*f*. The alternative first aircraft seat device 1000*f* has an alternative first aircraft seat 1200*f*. The alternative first aircraft seat device 1000*f* has an alternative first console 1300*f*. The alternative first aircraft seat device 1000*f* is formed in mirror image to the first aircraft seat device 100*f* about an axis, wherein the axis is oriented perpendicularly to the aircraft cabin center axis 16*f* and parallel to an aircraft cabin floor 22*f* of the aircraft cabin 12*f*. The aircraft seat arrangement 14*f* can comprise at least one further alternative first aircraft seat device which is formed at least substantially identically to the alternative first aircraft seat device 1000*f*. The aircraft seat arrangement 14*f* comprises an alternative third aircraft seat device 3000*f*. The alternative third aircraft seat device 3000*f* has a sitting direction 3100*f*. The sitting direction 3100*f* of the alternative third aircraft seat device 3000*f* is oriented counter to the flight direction 24*f*. The sitting direction 3100*f* of the alternative third aircraft seat device 3000*f* is oriented at least substantially parallel to the aircraft cabin center axis 16*f*. The alternative third aircraft seat device 3000*f* has an alternative third aircraft seat 3200*f*. The alternative third aircraft seat device 3000*f* has an alternative third console 3300*f*. The alternative third aircraft seat device 3000*f* is formed in mirror image to the third aircraft seat device 300*f* about an axis, wherein the axis is oriented perpendicularly to the aircraft cabin center axis 16*f* and parallel to the aircraft cabin floor 22*f*. The aircraft seat arrangement 14*f* comprises a plurality of further alternative third aircraft seat devices 3000'*f* which are formed at least substantially identically to the alternative third aircraft seat device 3000*f*. The aircraft seat arrangement 14*f* comprises an alternative fifth aircraft seat device 5000*f*. The alternative fifth aircraft seat device 5000*f* has a sitting direction 5100*f*. The sitting direction 5100*f* of the alternative fifth aircraft seat device 5000*f* is oriented counter to the flight direction 24*f*. The sitting direction 5100*f* of the alternative fifth aircraft seat device 5000*f* is oriented at least substantially parallel to the aircraft cabin center axis 16*f*. The alternative fifth aircraft seat device 5000*f* has an alternative fifth aircraft seat 5200*f*. The alternative fifth aircraft seat device 5000*f* has an alternative fifth console 5300*f*. The alternative fifth aircraft seat device 5000*f* is formed in mirror image to the fifth aircraft seat device 500*f* about an axis, wherein the axis is oriented perpendicularly to the aircraft cabin center axis 16*f* and parallel to the aircraft cabin floor 22*f*. The aircraft seat arrangement 14*f* comprises a plurality of further alternative fifth aircraft seat devices 5000'*f* which are formed at least substantially identically to the alternative fifth aircraft seat device 5000*f*. The aircraft seat arrangement 14*f* comprises an alternative seventh aircraft seat device 7000*f*. The alternative seventh aircraft seat device 7000*f* has a sitting direction 7100*f*. The sitting direction 7100*f* of the alternative seventh aircraft seat device 7000*f* is oriented counter to the flight direction 24*f*. The sitting direction 7100*f* of the alternative seventh aircraft seat device 7000*f* is oriented at least substantially parallel to the aircraft cabin center axis 16*f*. The alternative seventh aircraft seat device 7000*f* has an alternative seventh aircraft seat 7200*f*. The alternative seventh aircraft seat device 7000*f* has an alternative seventh console 7300*f*. The alternative seventh aircraft seat device 7000*f* is formed in mirror image to the seventh aircraft seat device 700*f* about an axis, wherein the axis is oriented perpendicularly to the aircraft cabin center axis 16*f* and parallel to the aircraft cabin floor 22*f*. The aircraft seat arrangement 14*f* comprises a plurality of further alternative seventh aircraft seat devices 7000'*f* which are formed at least substantially identically to the alternative seventh aircraft seat device 7000*f*. In contrast to the preceding exemplary embodiments, sitting directions 3100*f*, 5100*f*, 7100*f* of some of the plurality of aircraft seat devices 100*f*, 300*f*, 400*f*, 500*f*, 700*f*, 1000*f*, 3000*f*, 5000*f*, 7000*f* in the aircraft cabin section 26*f* are oriented at least substantially in the opposite direction to the flight direction 24*f*. In the present case, nine aircraft seat devices 100*f*, 300*f*, 400*f*, 500*f*, 700*f*, 1000*f*, 3000*f*, 5000*f*, 7000*f* which are designed to be different from one another are arranged in the aircraft cabin section 26*f*.

An arrangement of aircraft seat devices 100*f*, 300*f*, 3000*f*, 700*f*, 7000*f* of the plurality of aircraft seat devices 100*f*, 300*f*, 400*f*, 500*f*, 700*f*, 3000*f*, 5000*f*, 7000*f* in the aircraft cabin section 26*f* in the first outer seat column 36*f* and the first inner seat column 38*f* on the first aircraft cabin side 56*f* is formed asymmetrically to an arrangement of aircraft seat devices 400*f*, 500*f*, 700*f*, 5000*f*, 7000*f* of the plurality of aircraft seat devices 100*f*, 300*f*, 400*f*, 500*f*, 700*f*, 3000*f*, 5000*f*, 7000*f* in the second inner seat column 38*f* and the second outer seat column 42*f* on the second aircraft cabin side 58*f*.

There is an exclusive arrangement of aircraft seat devices 500*f*, 700*f*, 5000*f*, 7000*f* of the plurality of aircraft seat devices 100*f*, 300*f*, 400*f*, 500*f*, 700*f*, the sitting directions 510*f*, 710*f*, 5100*f*, 7100*f* of which are arranged at least substantially parallel to the aircraft cabin center axis 16*f*, in the first outer seat column 36*f*. In the first outer seat column, the sitting directions of the seventh aircraft seat device 700f, of the alternative fifth aircraft seat device 5000f, of one of the further seventh aircraft seat devices 700'f, of one of the further alternative fifth aircraft seat devices 5000'f and one of the further alternative seventh aircraft seat devices 7000'f are oriented along an aircraft longitudinal axis in an alternating manner in the flight direction 24f and in the opposite direction to the flight direction 24f.

The aircraft seat arrangement 14f comprises a plurality of additional consoles 62f, 64f, 66f. In each case two foot spaces for two aircraft seat devices 1000f, 3000f, 500f, 7000f, 700f, 5000f arranged directly adjacent to the corresponding additional consoles 62f, 64f, 66f are arranged in the additional consoles 62f, 64f, 66f. The additional console 62f is arranged in the first outer seat column 36f, as viewed along an aircraft longitudinal axis, between the seventh aircraft seat device 700f and the alternative fifth aircraft seat device 5000f. The additional console 62f spaces the seventh aircraft seat device 700f apart from the alternative fifth aircraft seat device 5000f. The sitting directions 710f, 5100f of the aircraft seat devices 700f, 5000f, which are spaced apart from each other by the additional console 62f, are oriented in an opposite direction to each other.

The seventh aircraft seat device 700f, the additional console 62f and the alternative fifth aircraft seat device 5000f form a seat grouping 68f of the aircraft seat arrangement 14f in the first outer seat column 36f. The seat grouping 68f has an at least substantially rectangular basic area. The seat grouping 68f forms a periodically repeatable sequence. A plurality of identical seat groupings 68f can be arranged directly one behind another along an aircraft longitudinal axis.

In the first inner seat column 38f, there is an exclusive arrangement of aircraft seat devices 100f, 300f, 1000f, 3000f of the plurality of aircraft seat devices 100f, 300f, 400f, 500f, 700f, the sitting directions 110f, 310f, 1100f, 3100f of which are arranged at least substantially parallel to the aircraft cabin center axis 16f. In the first inner seat column 38f, there is an exclusive arrangement of aircraft seat devices 100f, 300f, 1000f, 3000f of the plurality of aircraft seat devices 100f, 300f, 400f, 500f, 700f, the aircraft seats 120f, 320f, 1200f, 3200f of which are arranged in an alternating manner on the aisle side or facing away from the aisle. The first aircraft seat device 100f, the third aircraft seat device 300f and the further first aircraft seat device 100'f are arranged directly one behind another. The third aircraft seat device 300f spaces apart the first aircraft seat device 100f from the further first aircraft seat device 100'f. The additional console 64f is arranged in the first inner seat column 38f, as viewed along an aircraft longitudinal axis, between the first aircraft seat device 100f and the alternative third aircraft seat device 3000f. The additional console 64f spaces apart the first aircraft seat device 100f from the alternative third aircraft seat device 3000f. The sitting directions 110f, 3100f of the aircraft seat devices 100f, 3000f which are spaced apart from each other by the additional console 64f are oriented in an opposite direction to each other.

In the second inner seat column 40f, there is an exclusive arrangement of aircraft seat devices 500f, 700'f, 5000'f, 7000f of the plurality of aircraft seat devices 100f, 300f, 400f, 500f, 700f, the sitting directions 510f, 710f, 5100f, 7100f of which are arranged at least substantially parallel to the aircraft cabin center axis 16f. In the second inner seat column 40f, there is an exclusive arrangement of aircraft seat devices 500f, 700'f, 5000'f, 7000f of the plurality of aircraft seat devices 100f, 300f, 400f, 500f, 700f, the aircraft seats 520f, 720f, 5200f, 7200f of which are arranged in an alternating manner on the aisle side or facing away from the aisle.

The fifth aircraft seat device 500f, one of the further seventh aircraft seat devices 700'f and the further fifth aircraft seat device 500'f are arranged directly one behind another. The further seventh aircraft seat device 700'f spaces apart the fifth aircraft seat device 500f from the further fifth aircraft seat device 500'f. The additional console 66f is arranged in the second inner seat column 40f, as viewed along an aircraft longitudinal axis, between the fifth aircraft seat device 500f and the alternative seventh aircraft seat device 7000f. The additional console 66f spaces apart the fifth aircraft seat device 500f from the alternative seventh aircraft seat device 7000f. The sitting directions 510f, 7100f of the aircraft seat devices 500f, 7000f which are spaced apart from each other by the additional console 66f are oriented in an opposite direction to each other. The first inner seat column 38f is formed in mirror image to the second inner seat column 40f via the aircraft cabin center axis 16f.

In the second outer seat column 42e, there is an exclusive arrangement of aircraft seat devices 400f, 400'f of the plurality of aircraft seat devices 100f, 300f, 400f, 500f, 700f, the aircraft seats 420f of which are arranged facing away from the aisle. In the second outer seat column 42e, there is an exclusive arrangement of aircraft seat devices 400f, 400'f of the plurality of aircraft seat devices 100f, 300f, 400f, 500f, 700f, the sitting directions of which are arranged in an angled manner with respect to the aircraft cabin center axis 16f.

The aircraft seat arrangement 14f illustrated in FIG. 9 is in principle extendable by further aircraft seat devices 100'f, 300'f, 400'f, 500'f, 700'f, 3000'f, 5000'f, 7000'f, as viewed in the flight direction 24f.

In the aircraft cabin section 26f, the first aircraft seat device 100f, the third aircraft seat device 300f, the fourth aircraft seat device 400f, the fifth aircraft seat device 500f, the seventh aircraft seat device 700f, the alternative first aircraft seat device 1000f, the alternative third aircraft seat device 3000f, the alternative fifth aircraft seat device and the alternative seventh aircraft seat device 7000f differ in at least one comfort category, wherein the aircraft seat devices 100f, 300f, 400f, 500f, 700f, 1000f, 3000f, 5000f, 7000f for the at least one comfort category in each case have a different value from one another which is caused by a different arrangement of the aircraft seats 120f, 320f, 420f, 520f, 720f, 1200f, 3200f, 5200f, 7200f and by the at least partially different design of the aircraft seat devices 100f, 300f, 400f, 500f, 700f, 1000f, 3000f, 5000f, 7000f.

In the present case, one comfort category is in the form of an aircraft seat orientation. A value for the aircraft seat orientation describes an angular deviation of the sitting direction from an aircraft longitudinal axis. The value for the aircraft seat device is in the form of an angle. The first aircraft seat device 100f, the third aircraft seat device 300f, the fifth aircraft seat device 500f, the seventh aircraft seat device 700f, the alternative first aircraft seat device 1000f, the alternative third aircraft seat device 3000f, the alternative fifth aircraft seat device 5000f and the alternative seventh aircraft seat device 7000f each have the same value for the aircraft seat orientation. For the aircraft seat orientation, the fourth aircraft seat device 400f has a value which is greater than the value for the aircraft seat orientation of the first aircraft seat device 100f. A further value for the aircraft seat orientation describes whether the sitting direction or a directional component of the sitting direction is directed in the flight direction 24f or counter to the flight direction 24f.

The further value is in the form of "0" or "1" of a pair of values of a Boolean variable. The further value "0" corresponds to an orientation of the sitting direction or to a directional component of the sitting direction in the flight direction 24f. The further value "1" corresponds to an orientation of the sitting direction or of a directional component of the sitting direction counter to the flight direction 24f. In the present case, the first aircraft seat device 100f, the third aircraft seat device 300f, the fifth aircraft seat device 500f and the seventh aircraft seat device 700f each have a further value "0" for the aircraft seat orientation. The alternative first aircraft seat device 1000f, the alternative third aircraft seat device 3000f, the alternative fifth aircraft seat device 5000f and the alternative seventh aircraft seat device 7000f each have a further value "1" for the aircraft seat orientation.

FIG. 10 shows an aircraft seat arrangement 14g in a seventh exemplary embodiment. The aircraft seat arrangement 14g is configured for use in an aircraft cabin 12g, partially illustrated, of an aircraft. The aircraft cabin 12g has an aircraft cabin center axis 16g. The aircraft cabin center axis 16g is in the form of an aircraft longitudinal axis. The aircraft cabin 12g has two opposite aircraft cabin outer walls 18g, 20g. In at least one operating state, the aircraft has a flight direction 24g. The aircraft cabin 12g has an aircraft cabin section 26g along the aircraft cabin center axis 16g. The aircraft cabin 12g has a first aircraft cabin aisle 32g and a second aircraft cabin aisle 34g in the aircraft cabin section 26g. The aircraft seat arrangement 14g comprises a first outer seat column 36g. The aircraft seat arrangement 14g comprises a first inner seat column 38g. The aircraft seat arrangement 14g comprises a second inner seat column 40g. The aircraft seat arrangement 14g comprises a second outer seat column 42g. The aircraft cabin 12g has a central region 44g.

The aircraft seat arrangement 14g comprises a plurality of aircraft seat devices 100g, 200g, 300g, 400g, 500g, 600g, 700g, 800g which are arranged in the aircraft cabin section 26g. The plurality of aircraft seat devices 100g, 200g, 300g, 400g, 500g, 600g, 700g, 800g are designed to be different from one another. The aircraft seat devices 100g, 200g, 300g, 400g, 500g, 600g, 700g, 800g each have an aircraft seat. The aircraft seat devices 100g, 200g, 300g, 400g, 500g, 600g, 700g, 800g each have a console. The aircraft seat arrangement 14g comprises a first aircraft seat device 100g of the plurality of aircraft seat devices 100g, 200g, 300g, 400g, 500g, 600g, 700g, 800g. The first aircraft seat device 100g has a sitting direction 110g. The first aircraft seat device 100g has a first aircraft seat 120g. The first aircraft seat device 100g has a first console 130g. The aircraft seat arrangement 14g comprises a second aircraft seat device 200g of the plurality of aircraft seat devices 100g, 200g, 300g, 400g, 500g, 600g, 700g, 800g. The second aircraft seat device 200g has a sitting direction 210g. The second aircraft seat device 200g has a second aircraft seat 220g. The second aircraft seat device 200g has a second console 230g. The aircraft seat arrangement 14g comprises a third aircraft seat device 300g of the plurality of aircraft seat devices 100g, 200g, 300g, 400g, 500g, 600g, 700g, 800g. The third aircraft seat device 300g has a sitting direction 310g. The third aircraft seat device 300g has a third aircraft seat 320g. The third aircraft seat device 300g has a third console 330g. The aircraft seat arrangement 14g comprises a fourth aircraft seat device 400g of the plurality of aircraft seat devices 100g, 200g, 300g, 400g, 500g, 600g, 700g, 800g. The fourth aircraft seat device 400g has a sitting direction 410g. The fourth aircraft seat device 400g has a fourth aircraft seat 420g. The fourth aircraft seat device 400g has a fourth console 430g. The aircraft seat arrangement 14g comprises a fifth aircraft seat device 500g of the plurality of aircraft seat devices 100g, 200g, 300g, 400g, 500g, 600g, 700g, 800g. The fifth aircraft seat device 500g has a sitting direction 510g. The fifth aircraft seat device 500g has a fifth aircraft seat 520g. The fifth aircraft seat device 500g has a fifth console 530g. The aircraft seat arrangement 14g comprises a sixth aircraft seat device 600g of the plurality of aircraft seat devices 100g, 200g, 300g, 400g, 500g, 600g, 700g, 800g. The sixth aircraft seat device 600g has a sitting direction 610g. The sixth aircraft seat device 600g has a sixth aircraft seat 620g. The sixth aircraft seat device 600g has a sixth console 630g. The aircraft seat arrangement 14g comprises a seventh aircraft seat device 700g of the plurality of aircraft seat devices 100g, 200g, 300g, 400g, 500g, 600g, 700g, 800g. The seventh aircraft seat device 700g has a sitting direction 710g. The seventh aircraft seat device 700g has a seventh aircraft seat 720g. The seventh aircraft seat device 700g has a seventh console 730g. The aircraft seat arrangement 14g comprises an eighth aircraft seat device 800g of the plurality of aircraft seat devices 100g, 200g, 300g, 400g, 500g, 600g, 700g, 800g. The eighth aircraft seat device 800g has a sitting direction 810g. The eighth aircraft seat device 800g has an eighth aircraft seat 820g. The eighth aircraft seat device 800g has an eighth console 830g.

The aircraft seat arrangement 14g comprises at least one further first aircraft seat device 100'g which is formed at least substantially identically to the first aircraft seat device 100g. The aircraft seat arrangement 14g comprises a plurality of further second aircraft seat devices 200'g which are formed at least substantially identically to the second aircraft seat device 200g. The aircraft seat arrangement 14g comprises a plurality of further third aircraft seat devices 300'g which are formed at least substantially identically to the third aircraft seat device 300g. The aircraft seat arrangement 14g comprises at least one further fourth aircraft seat device 400'g which is formed at least substantially identically to the fourth aircraft seat device 400g. The aircraft seat arrangement 14g comprises at least one further fifth aircraft seat device 500'g which is formed at least substantially identically to the fifth aircraft seat device 500g. The aircraft seat arrangement 14g comprises a plurality of further sixth aircraft seat devices 600'g which are formed at least substantially identically to the sixth aircraft seat device 600g. The aircraft seat arrangement 14g comprises a plurality of further seventh aircraft seat devices 700'g which are formed at least substantially identically to the seventh aircraft seat device 700g. The aircraft seat arrangement 14g comprises at least one further eighth aircraft seat device 800'g which is formed at least substantially identically to the eighth aircraft seat device 800g.

In contrast to the first exemplary embodiment, the aircraft seat arrangement 14g comprises a plurality of alternative aircraft seat devices 4000g, 8000g which are arranged in the aircraft cabin section 26g. The aircraft seat arrangement 14g comprises an alternative fourth aircraft seat device 4000g. The alternative fourth aircraft seat device 4000g has a sitting direction 4100g. The sitting direction 4100g of the alternative fourth aircraft seat device 4000g has a directional component counter to the flight direction 24g. The sitting direction 4100g of the alternative fourth aircraft seat device 4000g deviates from the flight direction 24g. In the present case, the sitting direction 4100g of the alternative fourth aircraft seat device 4000g is oriented in an angled manner by 30 degrees with respect to the aircraft cabin center axis 16g. The alternative fourth aircraft seat device 4000g has an alternative fourth aircraft seat 4200g. The alternative fourth aircraft seat device 4000g has an alternative fourth console 4300g. The alternative fourth aircraft seat device 4000g is formed in mirror image to the fourth aircraft seat device 400g about an axis, wherein the axis is oriented perpendicularly to the aircraft cabin center axis 16g and parallel to an aircraft cabin floor 22g of the aircraft cabin 12g. The aircraft seat arrangement 14g comprises at least one further alternative fourth aircraft seat device 4000'g which is formed at least substantially identically to the alternative fourth aircraft seat device 4000g. The aircraft seat arrangement 14g comprises an alternative eighth aircraft seat device 8000g. The alternative eighth aircraft seat device 8000g has a sitting direction 8100g. The sitting direction 8100g of the alternative eighth aircraft seat device 8000g has a directional component counter to the flight direction 24g. The sitting direction 8100g of the alternative eighth aircraft seat device 8000g deviates from the flight direction 24g. In the present case, the sitting direction 8100g of the alternative eighth aircraft seat device 8000g is oriented in an angled manner by 30 degrees with respect to the aircraft cabin center axis 16g. The alternative eighth aircraft seat device 8000g has an alternative eighth aircraft seat 8200g. The alternative eighth aircraft seat device 8000g has an alternative eighth console 8300g. The alternative eighth aircraft seat device 8000g is formed in mirror image to the eighth aircraft seat device 800g about an axis, wherein the axis is oriented perpendicularly to the aircraft cabin center axis 16g and parallel to the aircraft cabin floor 22g. The aircraft seat arrangement 14g comprises at least one further alternative eighth aircraft seat device 8000'g which is formed at least substantially identically to the alternative eighth aircraft seat device 8000g.

In the present case, the first inner seat column 38g is formed symmetrically to the second inner seat column 40g via the aircraft cabin center axis 16g. In the present case, the first outer seat column 36g is formed symmetrically to the second outer seat column 42g via the aircraft cabin center axis 16g. Sitting directions 4100g, 8100g of some of the plurality of aircraft seat devices 100g, 200g, 300g, 400g, 500g, 600g, 700g, 800g, 4000g, 8000g are oriented in the aircraft cabin section 26g at least substantially in the opposite direction to the flight direction 24g. In the present case, ten aircraft seat devices 100g, 200g, 300g, 400g, 500g, 600g, 700g, 800g, 4000g, 8000g which are designed to be different from one another are arranged in the aircraft cabin section 26g.

In the aircraft cabin section 26g, four aircraft seat devices of the plurality of aircraft seat devices 100g, 200g, 300g, 400g, 500g, 600g, 700g, 800g, 4000g, 8000g, namely at least the first aircraft seat device 100g, the third aircraft seat device 300g, the fourth aircraft seat device 400g and the alternative fourth aircraft seat device 4000g, are arranged in the first inner seat column 38g. In contrast to the first exemplary embodiment, the second aircraft seat device 200a from the first exemplary embodiment is replaced in the seventh exemplary embodiment by the alternative fourth aircraft seat device 4000g. The aircraft seat arrangement 14g comprises at least one additional console 62g. In the first inner seat column 38g, as viewed along an aircraft longitudinal axis, the additional console 62g is arranged between the third aircraft seat device 300g and the alternative fourth aircraft seat device 4000g. The additional console 62g spaces apart the third aircraft seat device 300g from the alternative fourth aircraft seat device 4000g. The sitting directions 310g, 4100g of the aircraft seat devices 300g, 4000g which are spaced apart from each other by the additional console 62g are oriented in an opposite direction to each other. The aircraft seat arrangement 14g has a first seat grouping 52g of four aircraft seat devices arranged directly one behind another in the first inner seat column 38g in the aircraft cabin section 26g, namely the first aircraft seat device 100g, the alternative fourth aircraft seat device 4000g, the third aircraft seat device 300g and the fourth aircraft seat device 400g.

In the aircraft cabin section 26g, four aircraft seat devices of the plurality of aircraft seat devices 100g, 200g, 300g, 400g, 500g, 600g, 700g, 800g, 4000g, 8000g, namely at least the fifth aircraft seat device 500g, the seventh aircraft seat device 700g, the eighth aircraft seat device 800g and the alternative eighth aircraft seat device 8000g, are arranged in the second inner seat column 40g. In contrast to the first exemplary embodiment, the sixth aircraft seat device 600a from the first exemplary embodiment is replaced in the seventh exemplary embodiment by the alternative eighth aircraft seat device 8000g. The aircraft seat arrangement 14g comprises at least one additional console 64g. The additional console 64g is arranged in the second inner seat column 40g, as viewed along an aircraft longitudinal axis, between the seventh aircraft seat device 700g and the alternative eighth aircraft seat device 8000g. The additional console 64g spaces apart the seventh aircraft seat device 700g from the alternative eighth aircraft seat device 8000g. The sitting directions 710g, 8100g of the aircraft seat devices 700g, 8000g which are spaced apart from each other by the additional console 64g are oriented in an opposite manner to each other. The aircraft seat arrangement 14g has a second seat grouping 54g of four aircraft seat devices arranged directly one behind another in the second inner seat column 40g in the aircraft cabin section 26g, namely the fifth aircraft seat device 500g, the alternative eighth aircraft seat device 8000g, the seventh aircraft seat device 700g and the eighth aircraft seat device 800g.

In the aircraft cabin section 26g, three aircraft seat devices differing in design, namely the further fifth aircraft seat device 500'g, the sixth aircraft seat device 600g and a further of the seventh aircraft seat devices 700'g, are arranged in the first outer seat column 36g. In the aircraft cabin section 26g, the sixth aircraft seat device 600g, the further seventh aircraft seat device 700'g and the further fifth aircraft seat device 500'g are arranged directly one behind another in the first outer seat column 36g. In the first outer seat column 36g, the further fifth aircraft seat device 500'g and the sixth aircraft seat device 600g are spaced apart from each other by the further seventh aircraft seat device 700'g. In the aircraft cabin section 26g, directly behind the sixth aircraft seat device 600g, as viewed in the flight direction 24g, a further of the sixth aircraft seat devices 600'g is arranged.

In the aircraft cabin section 26g, three aircraft seat devices of differing design, namely the further first aircraft seat device 100'g, the second aircraft seat device 200g and a further of the third aircraft seat devices 300'g, are arranged in the second outer seat column 42g. In the aircraft cabin section 26g, the second aircraft seat device 200g, the further third aircraft seat device 300'g and the further first aircraft seat device 100'g are arranged directly one behind another in the second outer seat column 42g. In the second outer seat column 42g, the further first aircraft seat device 100'g and the second aircraft seat device 200g are spaced apart from each other by the further third aircraft seat device 300'g. In the aircraft cabin section 26g, directly behind the second aircraft seat device 200g, as viewed in the flight direction 24g, a further of the second aircraft seat devices 200'g is arranged.

In the aircraft cabin section 26g, the first aircraft seat device 100g, the second aircraft seat device 200g, the third aircraft seat device 300g, the fourth aircraft seat device 400g, the fifth aircraft seat device 500g, the sixth aircraft seat device 600g, the seventh aircraft seat device 700g, the eighth aircraft seat device 800g, the alternative fourth aircraft seat device 4000g and the alternative eighth aircraft seat device 8000g differ in at least one comfort category, wherein the aircraft seat devices 100g, 200g, 300g, 400g, 500g, 600g, 700g, 800g, 4000g, 8000g for the at least one comfort category in each case have a value which is different from one another and is caused by a different arrangement of the aircraft seats 120g, 220g, 320g, 420g, 520g, 620g, 720g, 820g, 4200g, 8200g and by the at least partially different design of the aircraft seat devices 100g, 200g, 300g, 400g, 500g, 600g, 700g, 800g, 4000g, 8000g.

The invention claimed is:

1. An aircraft seat arrangement comprising a plurality of aircraft seat devices which are arranged in an aircraft cabin section and are designed to be at least partially different from one another and each have an aircraft seat which is designed as a full-flat seat, wherein the aircraft seat devices in the aircraft cabin section differ in at least one comfort category, wherein the aircraft seat devices for the at least one comfort category each have a mutually different value which is caused by a different arrangement of the aircraft seats and by the at least partially different design of the aircraft seat devices,
   wherein in one seat column in the aircraft cabin section at least three aircraft seat devices of the plurality of aircraft seat devices are arranged in directly consecutive rows in a flight direction, the directly consecutive rows including a first row, a second row, and a third row, in the first row, a sitting direction of at least one of the at least three aircraft seat devices is arranged angled with respect to an aircraft longitudinal axis,
   in the second row and the third row, a sitting direction of at least two of the at least three aircraft seat devices is arranged substantially parallel to the aircraft longitudinal axis,
   a comfort category of the at least one of the at least three aircraft seat devices in the first row is configured to differ from a comfort category of the at least two of the at least three aircraft seat devices,
   wherein the comfort category in which the aircraft seat devices differ is one or more of living space size, bed width and/or length of a bed of the aircraft seat, delimited angle of movement from sitting position and/or lying position, maximum bed length in the lying position, and maximum foot space volume delimited by a console.

2. The aircraft seat arrangement as claimed in claim 1, wherein each of the plurality of aircraft seat devices in each case has a direct access to an aircraft cabin aisle.

3. The aircraft seat arrangement as claimed in claim 1, the comfort category further includes one or more of a base area, a foot space volume and/or a passage width, in at least one region.

4. The aircraft seat arrangement as claimed in claim 1, wherein in the first row the sitting direction of the at least one of the at least three aircraft seat devices is arranged angled with respect to the aircraft longitudinal axis, at an angle of at least 18 degrees.

5. The aircraft seat arrangement as claimed in claim 1, wherein in the aircraft cabin section, in the first row the sitting direction of the at least one of the at least three aircraft seat devices is directed away from a directly adjacent aircraft cabin aisle.

6. The aircraft seat arrangement as claimed in claim 1, wherein in the aircraft cabin section, in the first row the sitting direction of the at least one of the at least three aircraft seat devices is directed toward a directly adjacent aircraft cabin aisle.

7. The aircraft seat arrangement as claimed in claim 6, wherein an aircraft seat of an aircraft seat device of the aircraft seat devices which are arranged in the one seat column in the aircraft cabin section is arranged on an aisle side, wherein an aircraft seat of a further aircraft seat device of the aircraft seat devices which are arranged in the one seat column is arranged facing away from the aisle.

8. The aircraft seat arrangement as claimed in claim 6, further comprising at least one seat grouping of at least four aircraft seat devices of the plurality of aircraft seat devices, the at least four aircraft seat devices are arranged directly one behind another in the one seat column in the aircraft cabin section and each have different sitting directions and/or whose aircraft seats are arranged on an aisle side or facing away from the aisle.

9. The aircraft seat arrangement as claimed in claim 8, wherein in the one seat column in the aircraft cabin section, two aircraft seat devices of the plurality of aircraft seat devices each have an aircraft seat which is arranged on an aisle side, and two further aircraft seat devices of the plurality of aircraft seat devices which, as viewed in the flight direction, are arranged directly behind or in front of the two aircraft seat devices each have an aircraft seat which is arranged facing away from the aisle.

10. The aircraft seat arrangement as claimed in claim 8, wherein in the one seat column, the at least four aircraft seat devices are arranged directly one behind another, wherein one aircraft seat of one aircraft seat device of two aircraft seat devices of the at least four aircraft seat devices is arranged on an aisle side and a further aircraft seat of a further aircraft seat device of the two aircraft seat devices is arranged facing away from the aisle, and sitting directions of two further aircraft seat devices of the four aircraft seat devices including the at least one of the at least three aircraft seat devices are arranged in an angled manner with respect to the aircraft longitudinal axis, wherein one aircraft seat of one aircraft seat device of the two further aircraft seat devices is arranged on an aisle side and a further aircraft seat of a further aircraft seat device of the two further aircraft seat devices is arranged facing away from the aisle.

11. The aircraft seat arrangement as claimed in claim 8, wherein in the aircraft cabin section, two aircraft seat devices of the plurality of aircraft seat devices form a pair of seats in two seat columns which are arranged directly next to each other, wherein sitting directions of the two aircraft seat devices are arranged at least substantially parallel to the aircraft longitudinal axis, and aircraft seats of the two aircraft seat devices are arranged facing away from an aisle, wherein at least two of the pairs of seats are arranged in the two seat columns which are arranged directly next to each other.

12. The aircraft seat arrangement as claimed in claim 8, wherein an arrangement of aircraft seat devices of the plurality of aircraft seat devices in the aircraft cabin section in at least one seat column on a first aircraft cabin side is formed asymmetrically to an arrangement of aircraft seat devices of the plurality of aircraft seat devices in at least one seat column on a second aircraft cabin side, wherein the first aircraft cabin side is separated from the second aircraft cabin side by an imaginary aircraft cabin center plane which is oriented along the aircraft longitudinal axis perpendicular to an aircraft cabin floor.

13. The aircraft seat arrangement as claimed in claim 12, wherein in the at least one seat column on the first aircraft cabin side or the at least one seat column on the second aircraft cabin side, only such aircraft seat devices of the plurality of aircraft seat devices are arranged whose sitting directions are arranged in an angled manner with respect to the aircraft longitudinal axis.

14. The aircraft seat arrangement as claimed in claim 12, wherein in the at least one seat column on the first aircraft cabin side or the at least one seat column on the second aircraft cabin side, only such aircraft seat devices of the plurality of aircraft seat devices are arranged whose sitting directions are arranged at least substantially parallel to the aircraft longitudinal axis.

15. The aircraft seat arrangement as claimed in claim 12, wherein sitting directions in the aircraft cabin section are oriented at least substantially in an opposite direction to the flight direction.

16. An aircraft seat device of an aircraft seat arrangement according to claim 1.

17. An aircraft having an aircraft seat arrangement according to claim 1.

18. The aircraft seat arrangement as claimed in claim 1, wherein the sitting directions of the at least three aircraft seat devices arranged in the directly consecutive rows further are oriented so as to face at least substantially in a same direction with respect to the flight direction.

19. The aircraft seat arrangement as claimed in claim 1, wherein in the directly consecutive rows, four adjacent rows each having two aircraft seats are disposed along an aircraft cabin center axis of the aircraft cabin section, the four adjacent rows are arranged so that the two aircraft seats of the first row are each respectively placed directly adjacent to a respective aircraft cabin aisle and the sitting direction of the two aircraft seats of the first row is directed diagonally to the aircraft cabin center axis, the two aircraft seats of the second row are each located directly adjacent to each other and the sitting direction of the two aircraft seats of the second row is identical with the flight direction, the two aircraft seats of the third row are located directly adjacent to each other and the sitting direction of the two aircraft seats of the third row is each respectively directed diagonally to the adjacent respective aircraft cabin aisle, the two aircraft seats of a fourth row of the directly consecutive rows are each respectively placed directly adjacent to the respective aircraft cabin aisle and the sitting direction of the two aircraft seats of the fourth row is identical with the flight direction.

* * * * *